(12) United States Patent
Ryu et al.

(10) Patent No.: US 11,765,797 B2
(45) Date of Patent: Sep. 19, 2023

(54) TERMINAL DEVICE AND COOKING APPARATUS CONTROL SYSTEM

(71) Applicant: Samsung Electronics Co., Ltd., Suwon-si (KR)

(72) Inventors: Hohyun Ryu, Suwon-si (KR); Hyosuk Kim, Suwon-si (KR); Hyunsoo Jeong, Suwon-si (KR); Kyumin Koh, Suwon-si (KR); Sanggyun Ye, Suwon-si (KR); Kwangryul Kim, Suwon-si (KR); Mukyong Kim, Suwon-si (KR); Jangwoo Lee, Suwon-si (KR); Sungkoo Cho, Suwon-si (KR); Kwangyoun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/054,680

(22) Filed: Nov. 11, 2022

(65) Prior Publication Data
US 2023/0067540 A1 Mar. 2, 2023

Related U.S. Application Data

(63) Continuation of application No. PCT/KR2021/005595, filed on May 4, 2021.

(30) Foreign Application Priority Data

May 12, 2020 (KR) .................. 10-2020-0056267
Apr. 9, 2021 (KR) .................. 10-2021-0046671

(51) Int. Cl.
*H05B 6/64* (2006.01)
*G06F 3/0482* (2013.01)
*G06T 19/00* (2011.01)

(52) U.S. Cl.
CPC ......... *H05B 6/6435* (2013.01); *G06F 3/0482* (2013.01); *G06T 19/006* (2013.01); *G06T 2200/24* (2013.01); *H05B 6/647* (2013.01)

(58) Field of Classification Search
CPC ..... H05B 6/6435; H05B 6/647; G06F 3/0482; G06T 19/006; G06T 2200/24; G06T 11/00
See application file for complete search history.

(56) References Cited

U.S. PATENT DOCUMENTS

| | | | |
|---|---|---|---|
| 10,559,019 B1* | 2/2020 | Beauvais | G06T 19/006 |
| 2018/0187954 A1* | 7/2018 | Yang | G06F 3/0488 |

(Continued)

FOREIGN PATENT DOCUMENTS

| | | |
|---|---|---|
| JP | 2017-015383 A | 1/2017 |
| JP | 2017-211097 A | 11/2017 |

(Continued)

OTHER PUBLICATIONS

International Search Report and Written Opinion of the International Searching Authority dated Aug. 26, 2021, in connection with International Application No. PCT/KR2021/005595, 4 pages.

*Primary Examiner* — Haoshian Shih

(57) ABSTRACT

Disclosed herein is a terminal device and a cooking apparatus capable of guiding an arrangement of a food item in the cooking apparatus comprising a plurality of heat sources to form a plurality of cooking zones having different heating characteristics. The terminal device comprises an imaging device, a user interface provided to display an image captured through the imaging device and provided to receive an input from a user, and a controller configured, in response to determining that the captured image corresponds to an image of a cooking apparatus and in response to obtaining food item information from the user, to control the user interface to display an augmented reality (AR) image of the (Continued)

food item superimposed on a recommended cooking zone among a plurality of cooking zones of the cooking apparatus.

18 Claims, 31 Drawing Sheets

(56) References Cited

U.S. PATENT DOCUMENTS

| | | | | |
|---|---|---|---|---|
| 2019/0053332 A1* | 2/2019 | Cheng | ................. | H05B 6/6435 |
| 2019/0066239 A1* | 2/2019 | Touchette | ............. | G06T 19/006 |
| 2019/0200797 A1 | 7/2019 | Diao et al. | | |
| 2020/0065757 A1* | 2/2020 | Lee | ...................... | G06Q 10/087 |
| 2020/0217513 A1* | 7/2020 | Clayton | ................. | G06V 40/20 |
| 2020/0226659 A1* | 7/2020 | Shimoirisa | ............ | G06F 16/285 |

FOREIGN PATENT DOCUMENTS

| | | |
|---|---|---|
| KR | 10-2017-0106143 A | 9/2017 |
| KR | 10-2019-0096851 A | 8/2019 |

\* cited by examiner

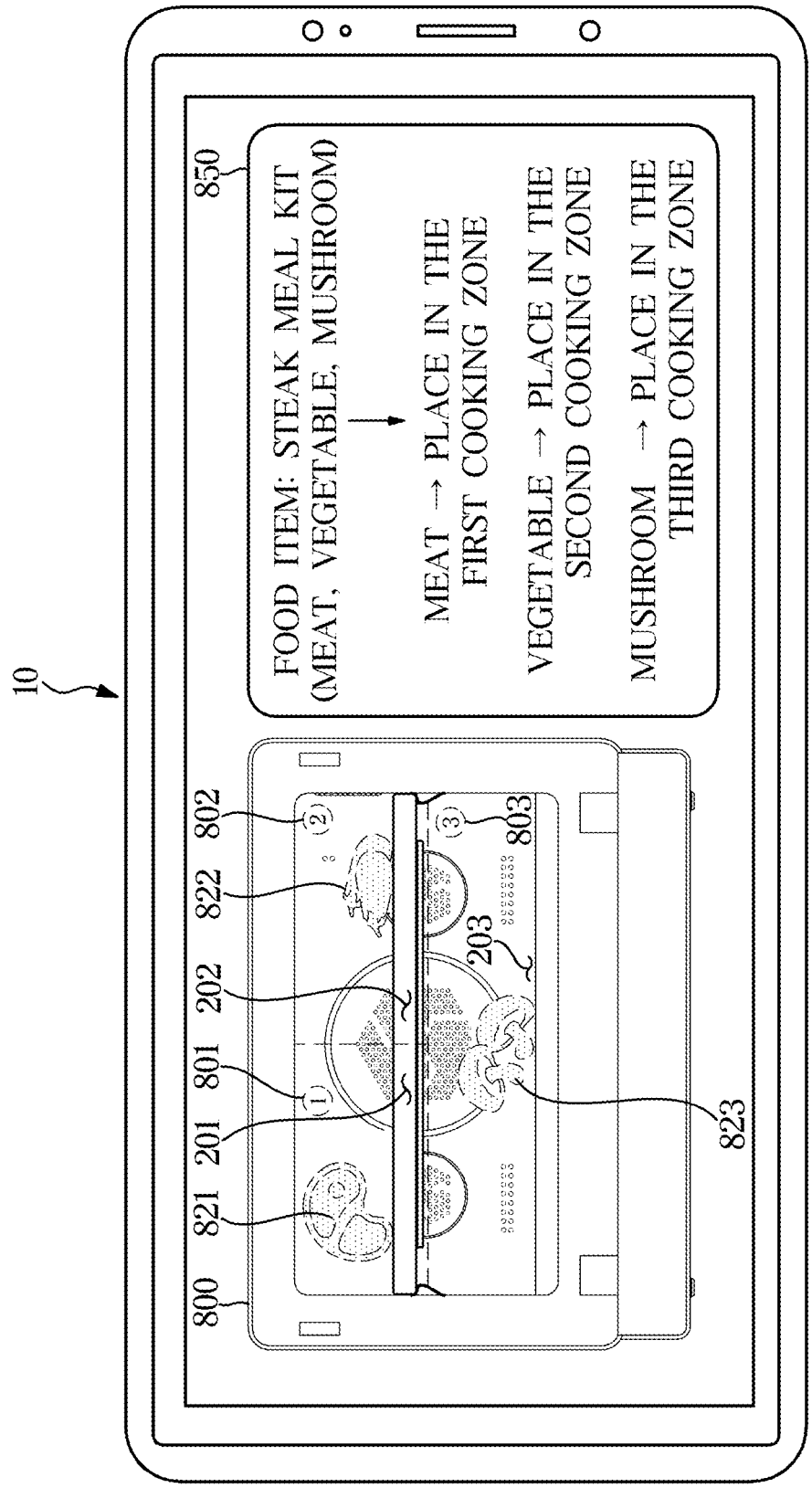

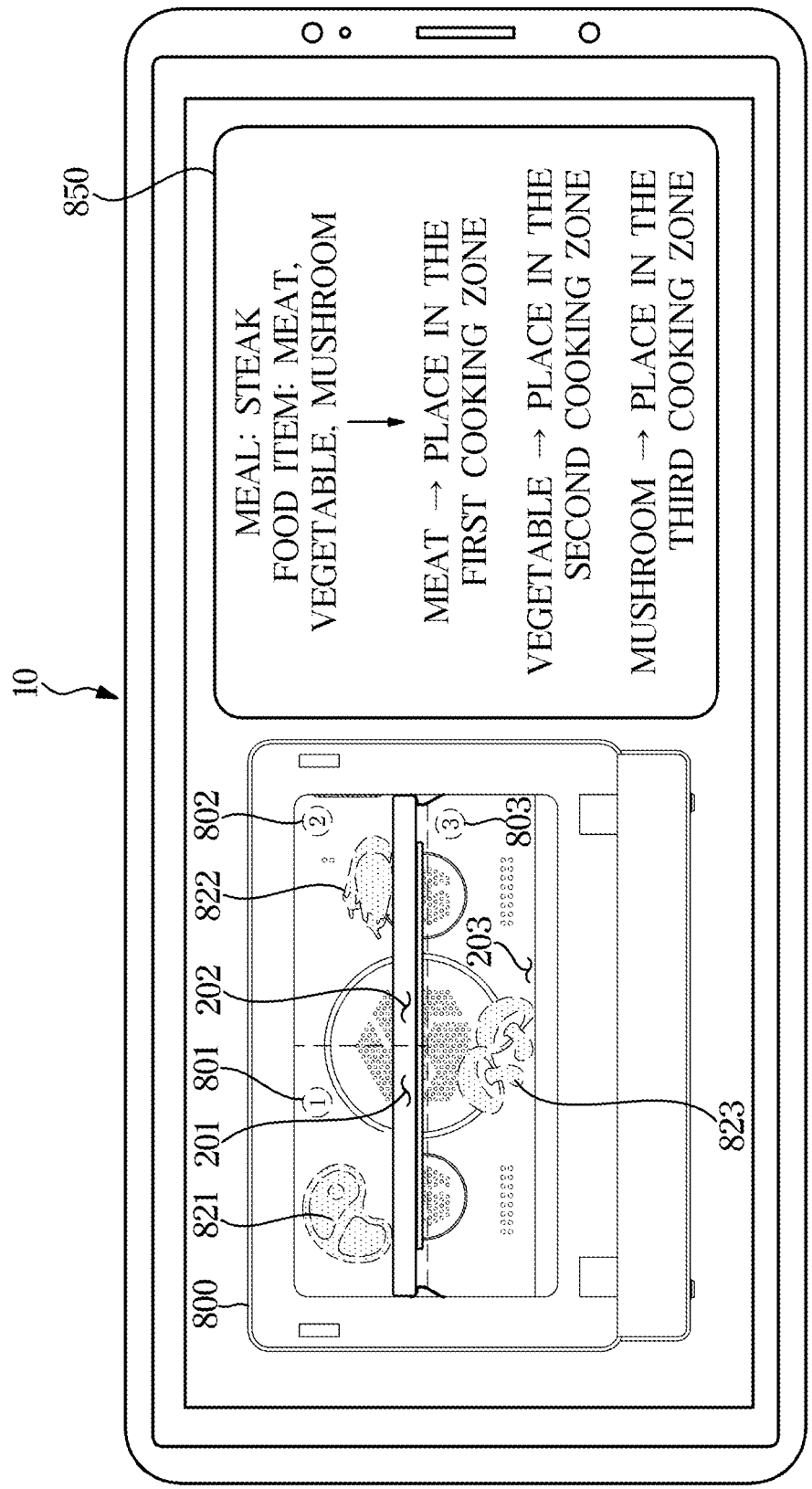

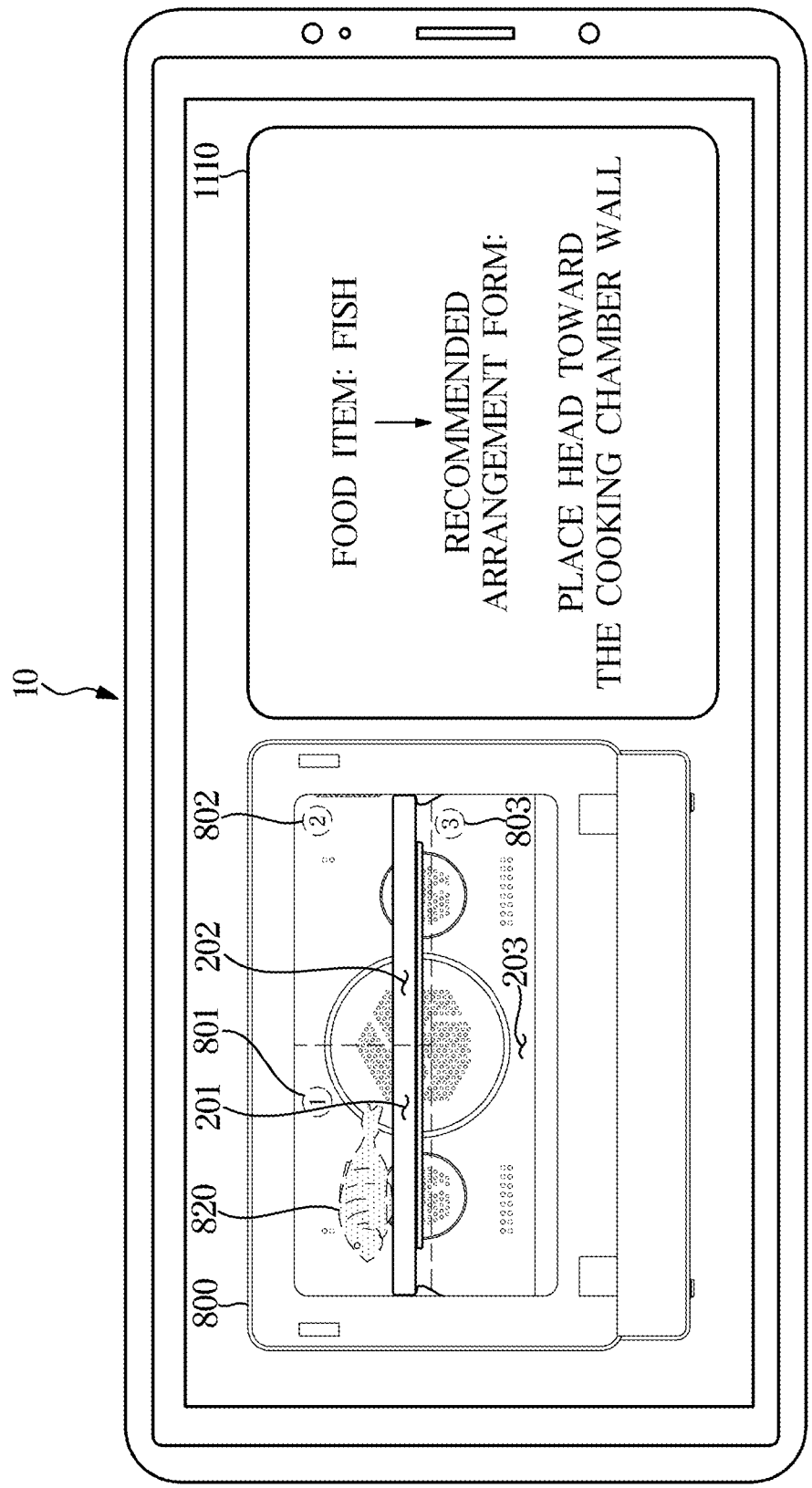

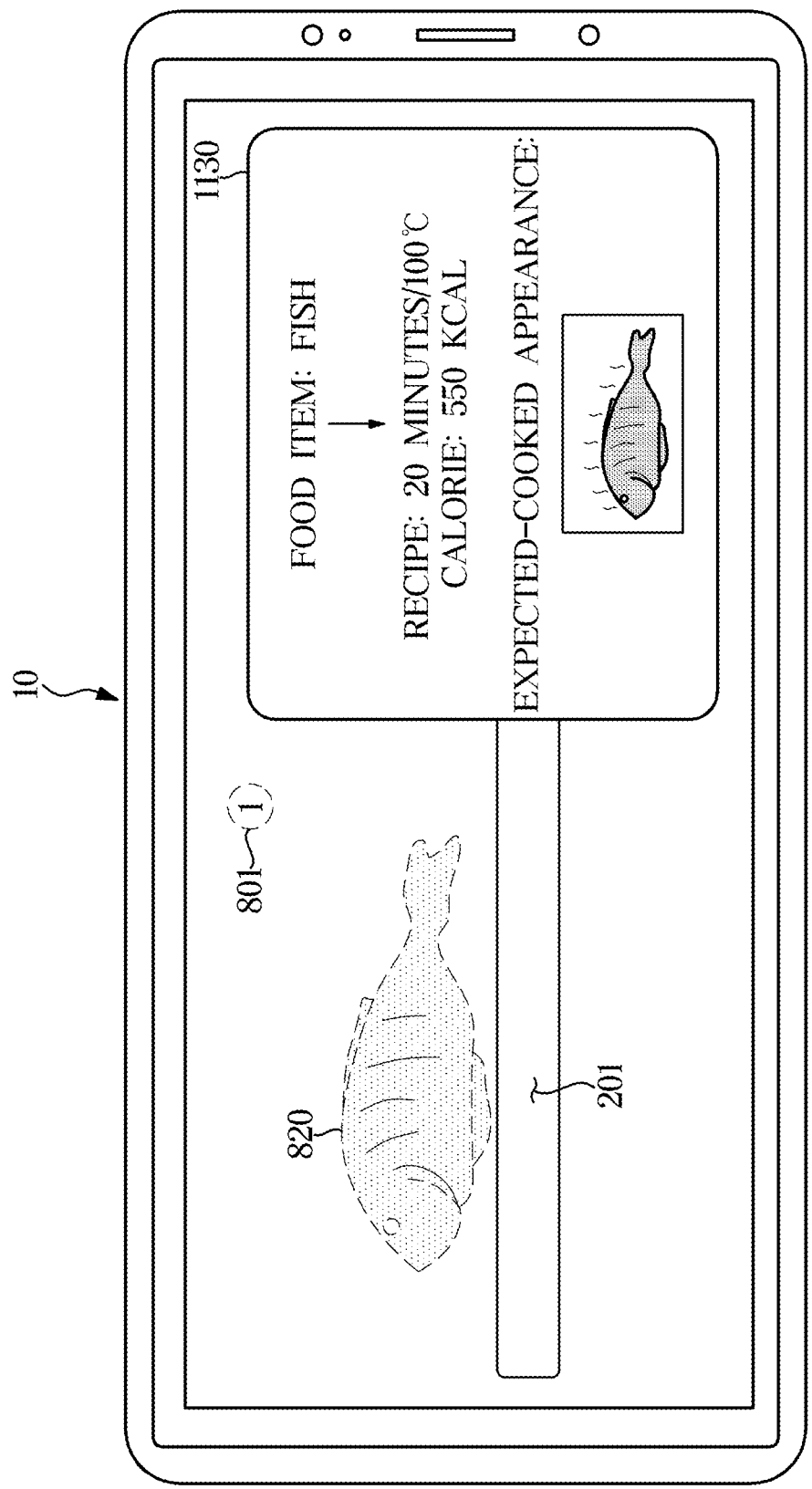

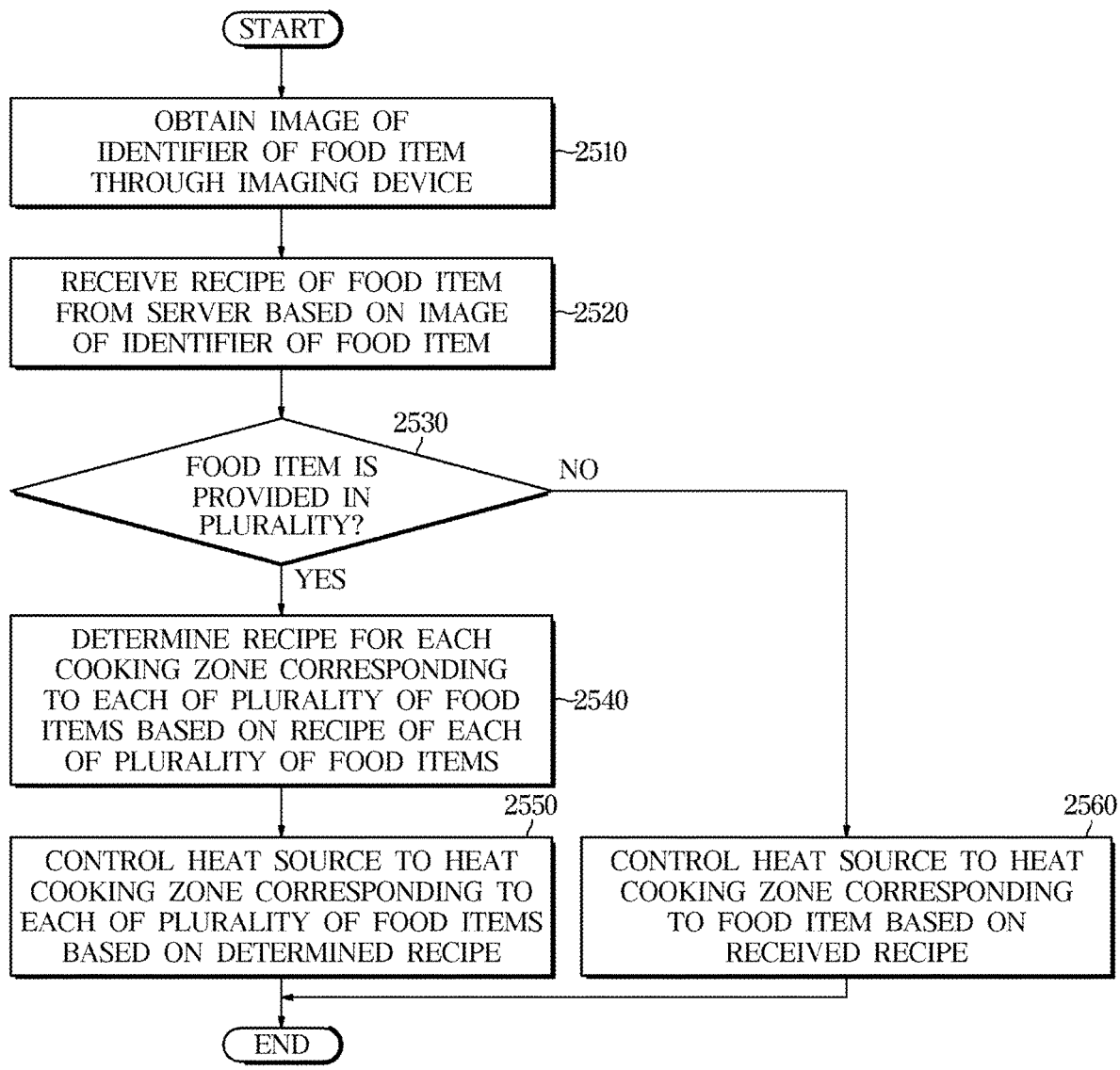

TERMINAL DEVICE AND COOKING APPARATUS CONTROL SYSTEM

CROSS-REFERENCE TO RELATED APPLICATIONS

This application is a Bypass Continuation of International Application No. PCT/KR2021/005595, filed May 4, 2021, which claims priority to Korean Patent Application No. 10-2020-0056267, filed May 12, 2020, and Korean Patent Application No. 10-2021-0046671, filed Apr. 9, 2021, the disclosures of which are herein incorporated by reference in their entirety.

BACKGROUND

1. Field

The present disclosure relates to a terminal device and a cooking apparatus configured to guide an arrangement of a food item corresponding to a cooking object in the cooking apparatus including a plurality of cooking zones.

2. Description of Related Art

A cooking apparatus is an appliance for heating and cooking a food item, such as a food material, and refers to a device capable of providing various functions related to cooking, such as heating, defrosting, drying, and sterilizing of the food item.

The cooking apparatus includes an oven that cooks a food item by transferring heat directly to the food item through a heat source such as a heater or heating an inside of a cooking chamber, and a microwave oven that cooks a food item by intermolecular frictional heat that is generated by disturbing a molecular arrangement of a cooking object with a high frequency by using a magnetron as a heat source.

Recently, a cooking apparatus configured to simultaneously cook a plurality of food items by including a plurality of heat sources, such as including both a heater and a magnetron, has emerged.

SUMMARY

The present disclosure is directed to providing a terminal device and a cooking apparatus capable of guiding an arrangement of a food item in the cooking apparatus including a plurality of heat sources to form a plurality of cooking zones having different heating characteristics.

One aspect of the present disclosure provides a terminal device including an imaging device, a user interface provided to display an image captured through the imaging device and provided to receive an input from a user, and a controller configured, in response to determining that the captured image corresponds to an image of a cooking apparatus and in response to obtaining food item information from the user, to control the user interface to display an augmented reality (AR) image of the food item superimposed on a recommended cooking zone among a plurality of cooking zones of the cooking apparatus.

In response to the food item including a plurality of ingredients, the controller may be configured to control the user interface to display an AR image of each of the plurality of ingredients superimposed on a corresponding recommended cooking zone with the image of the cooking apparatus.

The controller may be configured to determine an AR image of the food item to display a recommended cooking amount of the food item.

The controller may be configured to determine an AR image of the food item to display a recommended arrangement form of the food item.

The controller may be configured to control the user interface to display an AR image representing each of the plurality of cooking zones superimposed on the image of the cooking apparatus.

The image of the cooking apparatus may be an image of a cooking chamber or an image of a shelf mounted to the cooking chamber.

The controller may be configured to control the user interface to output a notification in response to determining that the food item is arranged in a cooking zone other than the recommended cooking zone.

In response to obtaining the food item information, the controller may be configured to determine a recommended food item that may be cooked in a cooking zone other than the recommended cooking zone, and configured to control the user interface to display an AR image of the recommended food item superimposed on a corresponding cooking zone with the image of the cooking apparatus.

In response to obtaining the food item information, the controller may be configured to determine a recommended meal that uses the food item as an ingredient, configured to determine other food item that is required for making the recommended meal, and configured to control the user interface to display an AR image of the other food item superimposed on a corresponding cooking zone with the image of the cooking apparatus.

Based on receiving a list of food items stored in a refrigerator, the controller may be configured to control the user interface to display the list of food items and based on a user selection for at least one food item in the list of food items, configured to obtain information on the food item.

The controller may be configured to obtain the food item information by processing the image of the food item captured through the imaging device.

Based on a selection of a meal completed from the user, the controller may be configured to determine a plurality of food items that is required for making the meal, and configured to control the user interface to display an AR image of each of the plurality of food items superimposed on a corresponding recommended cooking zone with the image of the cooking apparatus.

Based on receiving a list of meals, which may be made with a food item stored in a refrigerator, from a server, the controller may be configured to control the user interface to display the list of meals, and based on a user selection for any one meal in the list of meals, configured to obtain information on the food item.

Based on the captured image corresponding to an image of the recommended cooking zone, the controller may be configured to control the user interface to enlarge and display an AR image of the food item.

Based on the captured image corresponding to an image of the recommended cooking zone, the controller may be configured to control the user interface to display at least one of an amount of calories in the food item, an image before cooking the food item, an image after cooking the food item, or a recipe of the food item.

Another aspect of the present disclosure provides a cooking apparatus including a cooking chamber including a plurality of cooking zones, a plurality of heat sources configured to heat at least one cooking zone among the plurality of cooking zones, a light emitter configured to emit light to an inside of the cooking chamber, a user interface provided to receive an input from a user, and a controller configured, in response to obtaining food item information from the user, to control the light emitter to emit light to a recommended cooking zone among the plurality of cooking zones.

In response to the food item including a plurality of ingredients, the controller may be configured to control the light emitter to emit light having a different shape for each recommended cooking zone of each of the plurality of ingredients.

In response to determining that the food item is arranged in the recommended cooking zone, the controller may be configured to control at least one of the plurality of heat sources to heat the recommended cooking zone based on a recipe corresponding to the food item.

The cooking apparatus may further include an imaging device configured to image the cooking chamber, and the controller may be configured to determine a recipe of the food item based on an image of an identifier of the food item obtained through the imaging device.

In response to the food item provided in a plurality, the controller may be configured to determine a recipe for each recommended cooking zone of each of the plurality of foods items based on each recipe of the plurality of food items, and configured to control at least one of the plurality of heat sources to heat a recommended cooking zone of each of the plurality of food items based on the determined recipe.

The cooking apparatus may further include a communication circuitry configured to communicate with a server, and based on receiving information on a recipe corresponding to the food item from the server, the controller may be configured to determine a recipe corresponding to the food item.

The controller may be configured to control the user interface to output a notification in response to determining that the food item is arranged in a cooking zone other than the recommended cooking zone.

In response to determining that the food item is arranged in a cooking zone other than the recommended cooking zone, the controller may be configured to control at least one of the plurality of heat sources to heat a cooking zone in which the food item is placed, based on a recipe corresponding to the food item.

In response to obtaining the food item information, the controller may be configured to determine at least one of a recommended food item, which may be cooked in a cooking zone other than the recommended cooking zone, or a meal menu, which uses the food item as an ingredient, and configured to control the user interface to display at least one of the recommended food item or the meal menu.

Another aspect of the present disclosure provides a cooking apparatus control system including a cooking apparatus including a cooking chamber including a plurality of cooking zones, and a plurality of heat sources configured to heat at least one of the plurality of cooking zones, and a terminal device including an imaging device, and a user interface provided to display an image captured through the imaging device and provided to receive an input from a user. The terminal device is configured, in response to the captured image corresponding to an image of the cooking apparatus and in response to obtaining food item information from the user, to control the user interface to display an augmented reality (AR) image of the food item superimposed on a recommended cooking zone among the plurality of cooking zones of the cooking apparatus.

The terminal device may be configured to determine an AR image of the food item to display a recommended cooking amount of the food item.

The terminal device may be configured to determine an AR image of the food item to display a recommended arrangement form of the food item.

A terminal device and a cooking apparatus may guide an arrangement of a cooking object in the cooking apparatus that includes a plurality of heat sources to form a plurality of cooking zones having different heating characteristics. Accordingly, a user of the cooking apparatus can place the cooking object to an optimized cooking zone and thus it is possible to maximize a cooking efficiency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8D is a view illustrating a state in which the terminal device according to one embodiment of the present disclosure displays an AR image of a food item with an image of the cooking chamber as a background when the food item includes a plurality of ingredients.

FIG. 9B is a view illustrating a state in which the terminal device according to one embodiment of the present disclosure displays an AR image of a plurality of food items forming a meal with an image of the cooking chamber as a background.

FIG. 11A is a view illustrating a state in which the terminal device according to one embodiment of the present disclosure determines an AR image of a food item to display an arrangement form.

FIG. 11B is a view illustrating a state in which the terminal device according to one embodiment of the present disclosure enlarges and displays an AR image of a food item.

FIG. 25 is a flowchart illustrating a state of determining a recipe corresponding to a food item in the control method of the cooking apparatus according to one embodiment of the present disclosure.

DETAILED DESCRIPTION

Figure 1:
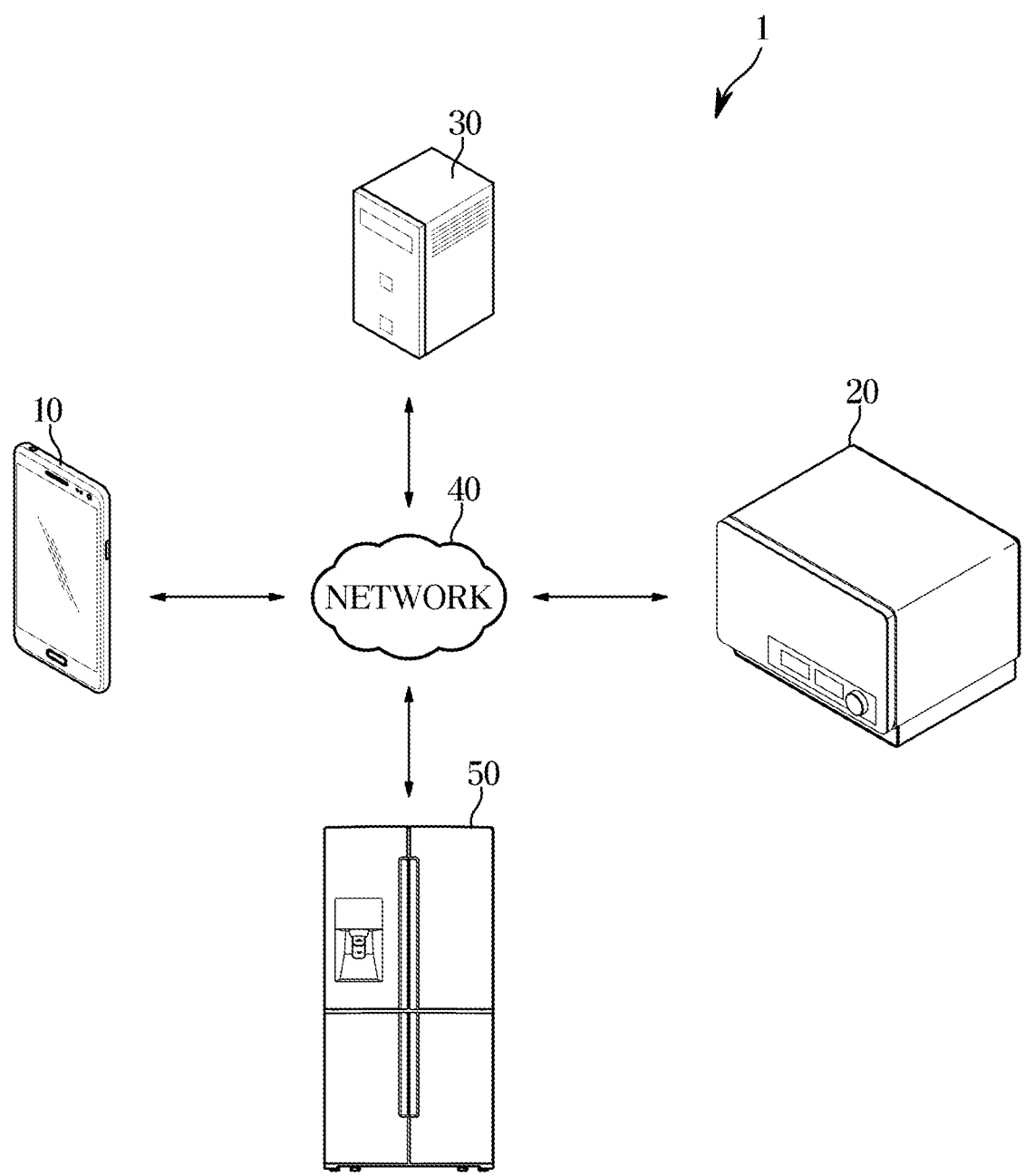
FIG. 1 is a view of a cooking apparatus control system according to one embodiment of the present disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

It will be understood that when an element is referred to as being "connected" another element, it can be directly or indirectly connected to the other element, wherein the indirect connection includes "connection via a wireless communication network".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element.

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

An identification code is used for the convenience of the description but is not intended to illustrate the order of each step. The each step may be implemented in the order different from the illustrated order unless the context clearly indicates otherwise.

Hereinafter exemplary embodiments of the present disclosure will be described in detail with reference to the accompanying drawings.

FIG. 1 is a view of a cooking apparatus control system according to one embodiment of the present disclosure.

Referring to FIG. 1, a cooking apparatus control system 1 includes a terminal device 10, a cooking apparatus 20, a server 30, a network 40, and a refrigerator 50.

The terminal device 10 according to one embodiment is an electronic device that may include an imaging device, a communication module, and a user interface provided to display an captured image and receive an input from a user, and the electronic device may transmit and receive information with the cooking apparatus 20, the server 30, and the refrigerator 50 through the network 40.

For example, the terminal device 10 may correspond to a user terminal such as a smart phone, and may communicate with the cooking apparatus 20, the server 30, and the refrigerator 50 through a known wireless communication protocol. However, the type of the terminal device 10 is not limited thereto, and may be provided as a known type of user terminal including an imaging device, a communication module, and a user interface.

The terminal device 10 according to one embodiment may receive an input for the cooking apparatus 20 from a user, and may control the cooking apparatus 20 by transmitting the user input to the cooking apparatus 20.

In addition, in response to receiving a food item corresponding to a cooking object to be cooked through the cooking apparatus 20, the terminal device 10 according to one embodiment may guide a user about an arrangement of the food item in the cooking apparatus 20.

In this case, the food item is an object to be cooked in the cooking apparatus 20, and may be an ingredient of food, a meal kit, and a home meal replacement (HMR). The food item may become a meal by being cooked by the cooking apparatus 20. That is, the meal may correspond to the result of cooking of the food item by the cooking apparatus 20.

The terminal device 10 may obtain information on a food item to be cooked by directly receiving a food item from a user, receiving a food item through an imaging device, or receiving information on a food item from the cooking apparatus 20.

Further, according to embodiments, the terminal device 10 may receive a list of food items stored in the refrigerator 50 from the server 30 or the refrigerator 50, and display the list of food items. Accordingly, the terminal device 10 may receive a user selection for at least one food item from the list and may obtain information on the food item to be cooked.

Further, according to embodiments, the terminal device 10 may receive a list of meals, which may be made with food items stored in the refrigerator 50, from the server 30. The terminal device 10 may display the list of meals to receive a user selection for a single meal in the list of meals and determine a food item that is required for the selected meal, thereby obtaining information on a food item that is to be cooked. In this case, the terminal device 10 may determine the food item required for making the meal by using pre-stored correlation information between the meal and the food item, or by receiving information on the food item required for making the meal, from the server 30.

The cooking apparatus 20 may include a cooking chamber and a plurality of heat sources, and the cooking chamber may be divided into a plurality of cooking zones having different heating characteristics depending on a location and type of each of the plurality of heat sources.

That is, the terminal device 10 may guide the user to place the food item to a recommended cooking zone having a heating characteristic suitable for cooking the food item, among the plurality of cooking zones.

Particularly, in response to imaging the cooking apparatus 20 by the imaging device, the terminal device 10 may display an image of the cooking apparatus 20 and display an augmented reality (AR) image of a food item superimposed on a recommended cooking zone among a plurality of cooking zones. In this case, Augmented Reality (AR) is a technology for showing one image by superimposing a three-dimensional virtual image on a real image, and the AR image corresponds to a three-dimensional virtual image displayed overlaid on a real image.

The terminal device 10 may pre-store arrangement information corresponding to a food item, and in response to the arrangement information not being stored, the terminal device 10 may request information on a recommended cooking zone to the cooking apparatus 20 or the server 30. The arrangement information may include information on a recommended cooking zone corresponding to a food item, and may further include information on a recommended cooking amount that may be cooked at one time and information on a recommended arrangement form.

The cooking apparatus 20 according to one embodiment may be operated based on an input inputted from a user or may be operated based on a user input received from the terminal device 10.

As described above, the cooking apparatus 20 according to one embodiment may include a plurality of heat sources, and may include a plurality of cooking zones having heating characteristics different from each other according to locations and types of the plurality of heat sources.

In order to guide the arrangement of the food item, the cooking apparatus 20 may emit light to a recommended cooking zone, corresponding to a food item, among the plurality of cooking zones according to embodiments, or transmit a message requesting for imaging of the cooking apparatus 20, to the terminal device 10.

The cooking apparatus 20 may pre-store arrangement information corresponding to the food item, and in response to the arrangement information of the food item not being stored, the cooking apparatus 20 may request information on the recommended cooking zone to the server 30.

The server 30 according to one embodiment may store arrangement information for each food item, and may update arrangement information for each food item by receiving the arrangement information on the food item from a manager.

The server 30 according to one embodiment may receive a request for arrangement information on a specific food item from the terminal device 10 or the cooking apparatus 20, and transmit the requested arrangement information for the specific food item to the terminal device 10 or the cooking apparatus 20.

In addition, based on information on the food item selected by the user through the terminal device 10, the server 30 according to one embodiment may determine a recommended meal that uses the selected food item as an ingredient, and determine other food item for making the recommended meal. Further, the server 30 may provide information on the recommended meal and information on other food item to the terminal device 10.

In addition, the server 30 according to one embodiment may determine a list of meals, which may be made with the stored food item, based on a list of food items stored in the refrigerator 50 that is received from the refrigerator 50, and provide the list of meals to the terminal device 10. The server 30 may provide information on a food item, which is required for the meal, based on information on a meal that is selected by a user through the terminal device 10, to the terminal device 10.

The network 40 according to one embodiment may include at least one of a telecommunication network, such as a computer network (for example, LAN or WAN), the Internet, or a telephone network.

The refrigerator 50 according to one embodiment may identify a food item stored in the refrigerator 50, determine a list of food items stored in the refrigerator 50, and transmit the list of food items to the terminal device 10 or the server 30.

According to embodiments, the refrigerator 50 may include an imaging device provided in a storage compartment for storing food items, and may process an image of a food item captured by the imaging device to identify the food item. For example, the refrigerator 50 may store food item image information for each type, and may identify the type of the captured food item by comparing the obtained food item image with food item image information for each type. Further, the refrigerator 50 may identify an identifier (for example, a QR code, a barcode, and an icon) attached to the food item by processing an image of the food item, so as to identify the food item. However, the image processing algorithm for identifying the food item is not limited to the above example, and the food item stored in the refrigerator 50 may be identified using a known type of image processing algorithm. Alternatively, according to embodiments, the refrigerator 50 may identify the food item by using a weight sensor provided on a shelf of the storage compartment in addition to the imaging device.

The terminal device 10, the cooking apparatus 20, the server 30 and the refrigerator 50 according to one embodiment may be connected to the network 40 wired or wirelessly to transmit/receive information to and from each other. However, the terminal device 10, the cooking apparatus 20, and the refrigerator 50 may be directly connected to each other and perform direct communication without passing through the network 40, according to embodiments.

In the above description, the cooking apparatus control system 1 has been briefly described. Hereinafter the terminal device 10 and the cooking apparatus 20 included in the cooking apparatus control system 1 will be described in detail.

First, a structure of the cooking apparatus 20 and the plurality of cooking zones formed in the cooking chamber of the cooking apparatus 20 will be described in detail.

Figure 2:
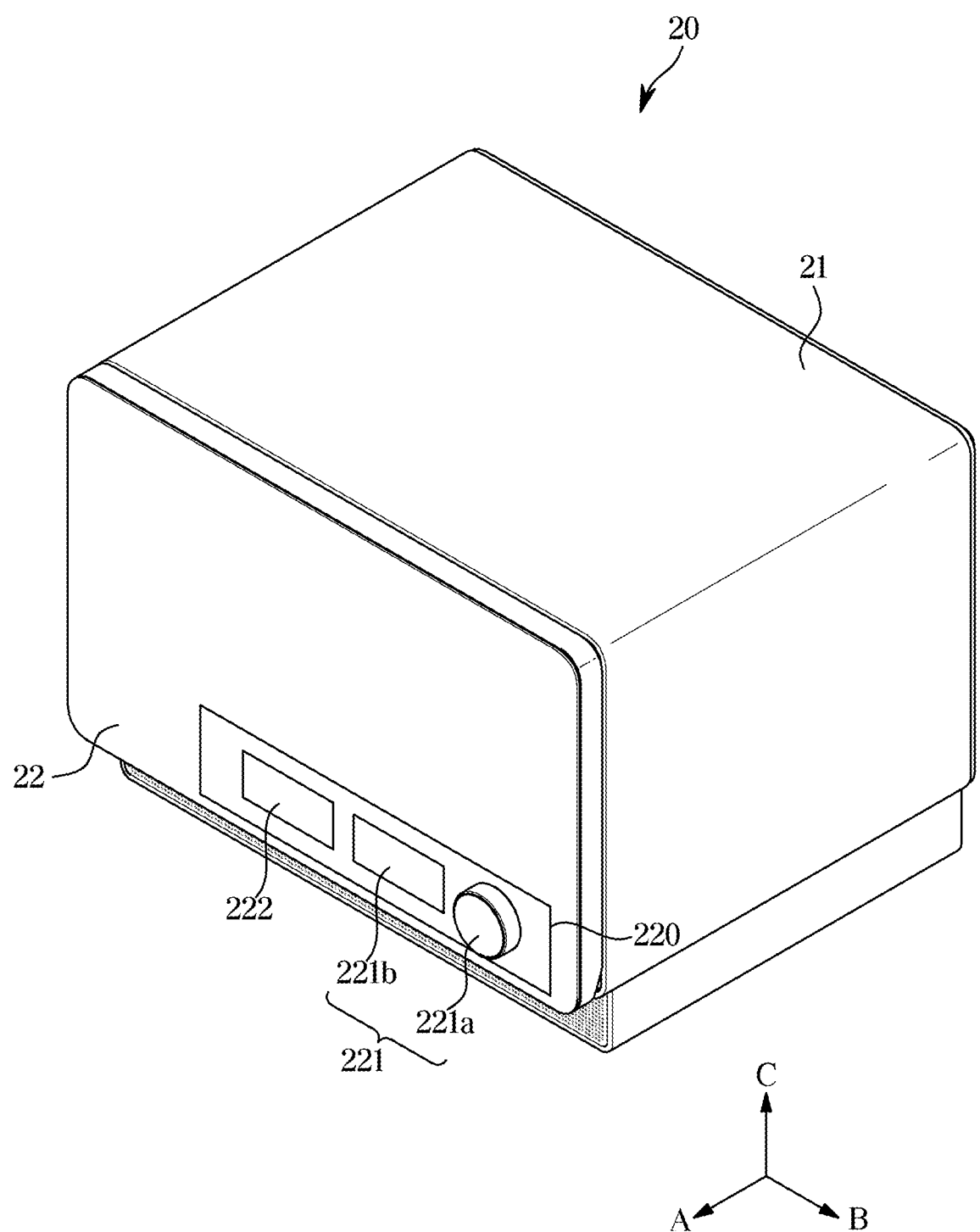
FIG. 2 is a perspective view of a cooking apparatus according to one embodiment of the present disclosure.
Figure 3:
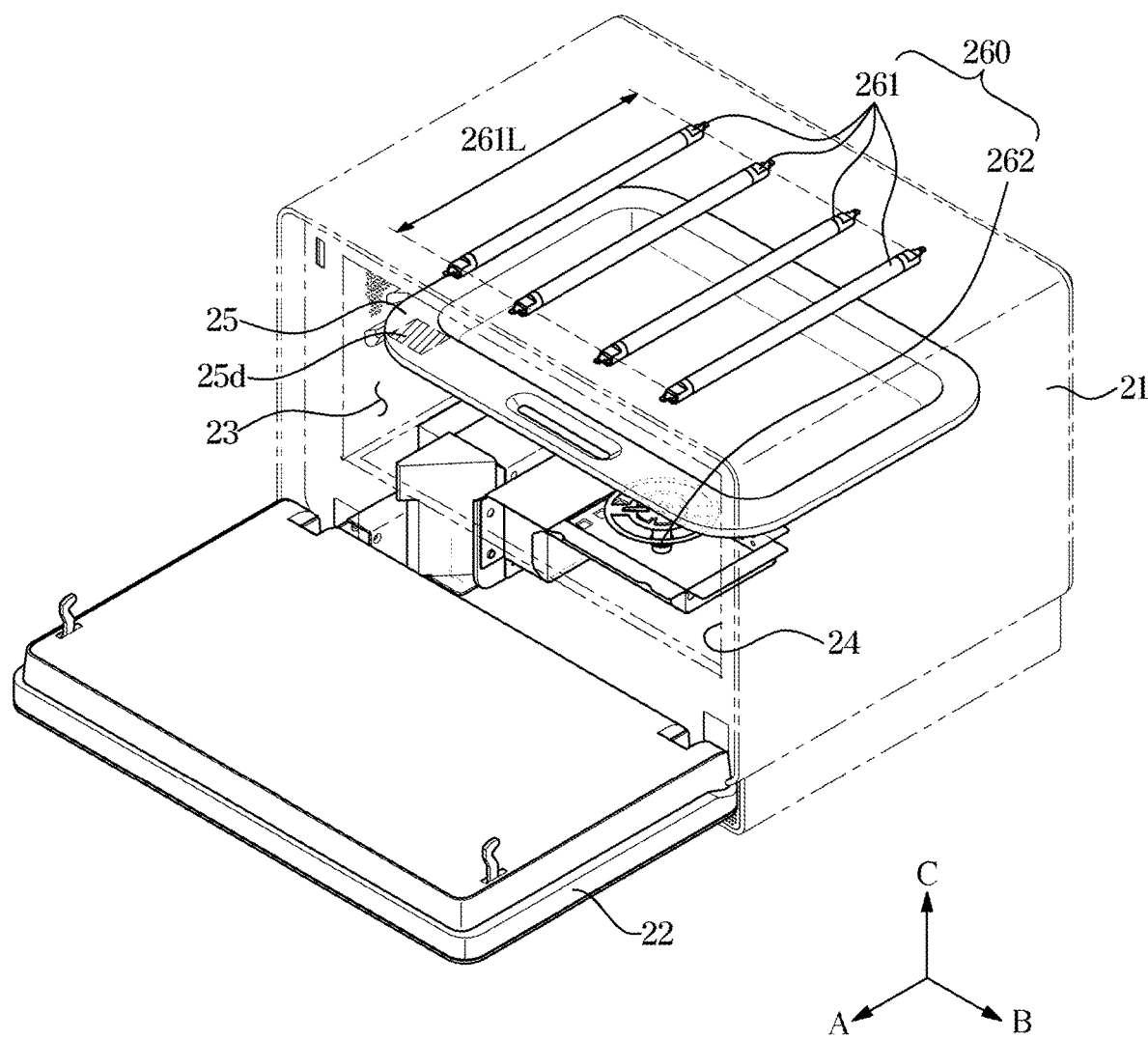
FIG. 3 is a view of a partial configuration of an inside of the cooking apparatus according to one embodiment of the present disclosure.
Figure 4:
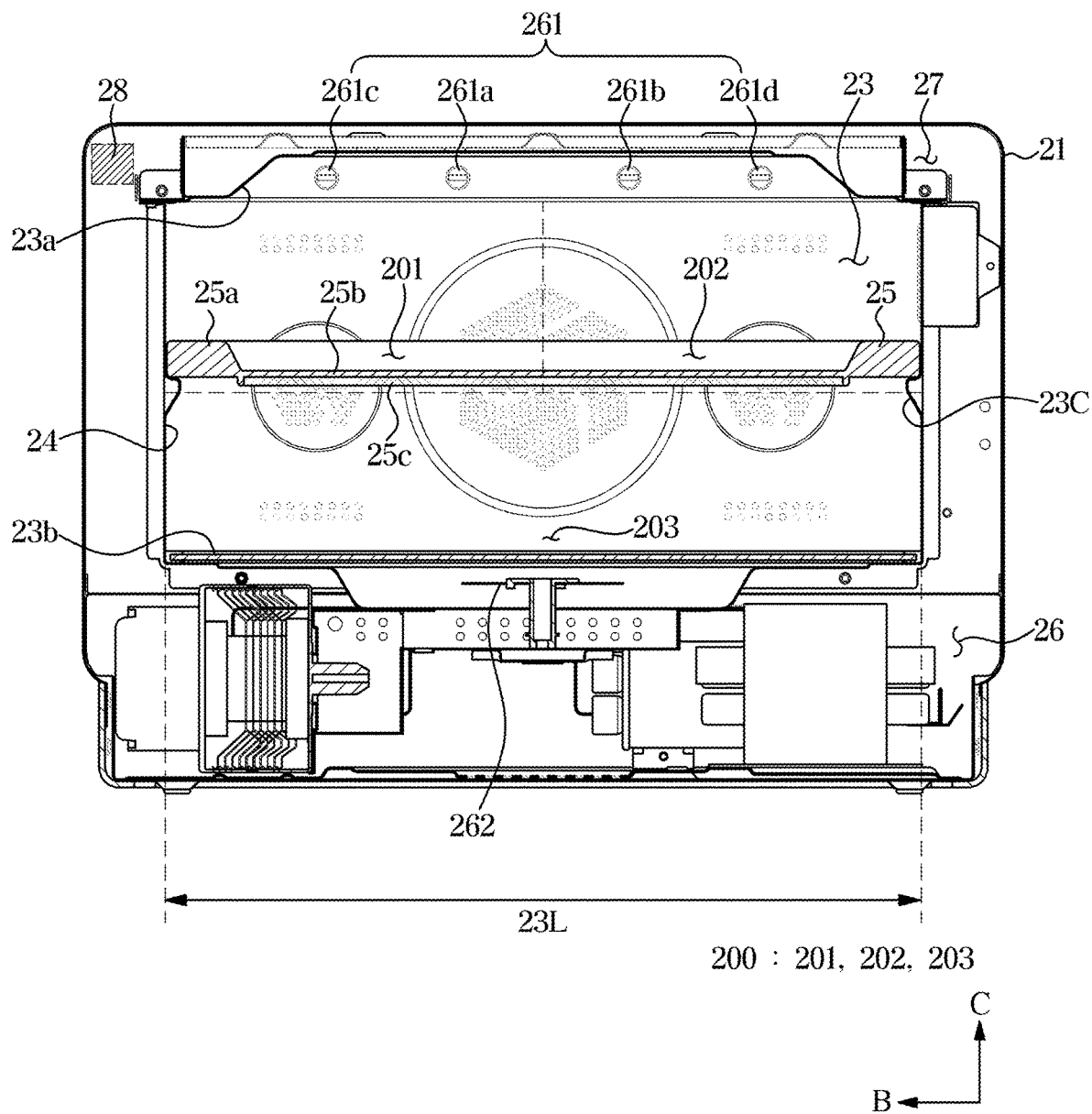
FIG. 4 is a cross-sectional view of the cooking apparatus according to one embodiment of the present disclosure.
Figure 5:
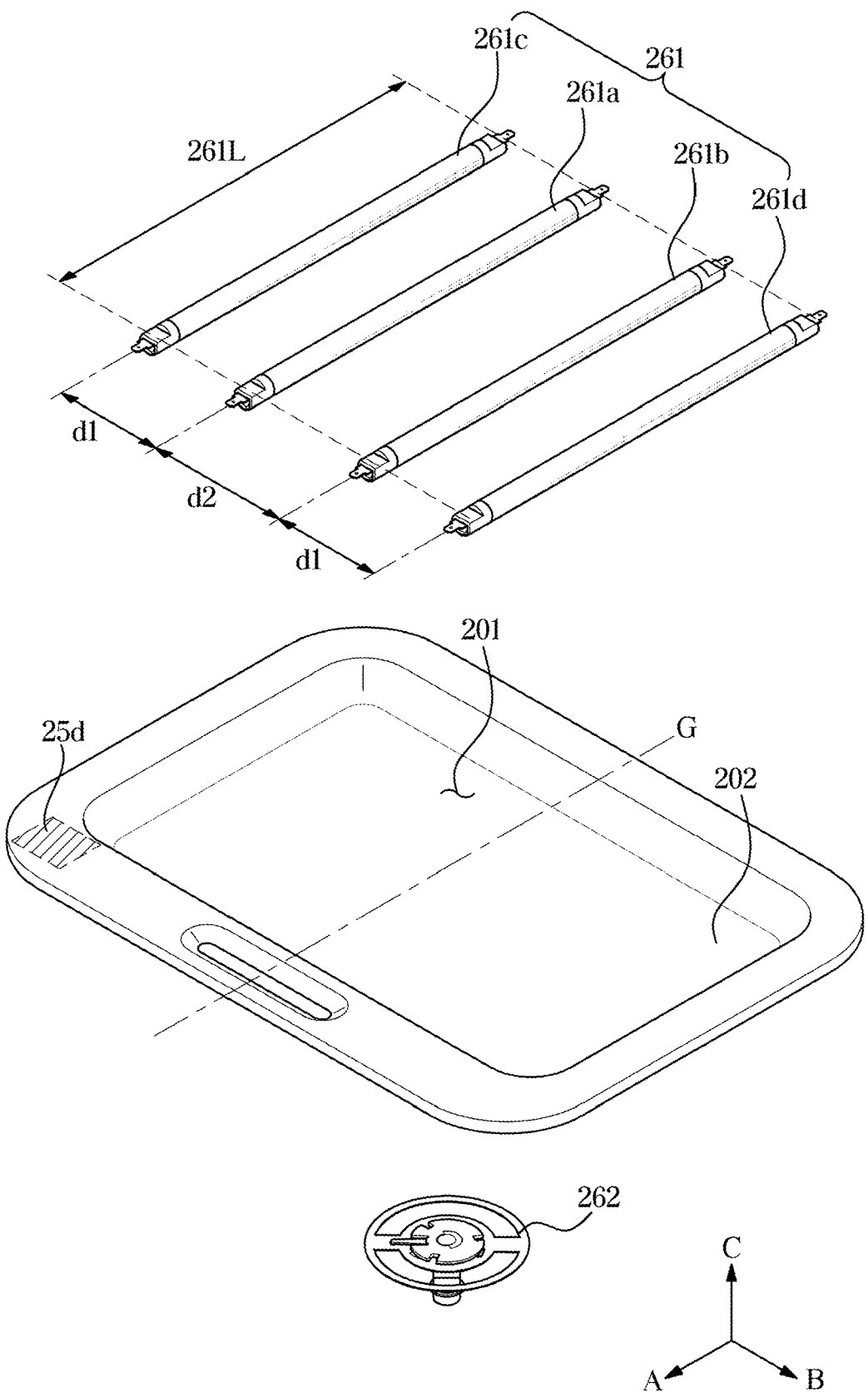
FIG. 5 is a view of a heat source and a shelf of the cooking apparatus according to one embodiment of the present disclosure.

FIG. 2 is a perspective view of the cooking apparatus 20 according to one embodiment of the present disclosure, FIG. 3 is a view of a partial configuration of an inside of the cooking apparatus 20 according to one embodiment of the present disclosure, FIG. 4 is a cross-sectional view of the cooking apparatus 20 according to one embodiment of the present disclosure, and FIG. 5 is a view of a heat source and a shelf of the cooking apparatus 20 according to one embodiment of the present disclosure.

Referring to FIG. 2, the cooking apparatus 20 includes an outer housing 21 forming an exterior and a door 22 configured to open and close an opening of the cooking chamber provided in the outer housing 21.

The door 22 according to one embodiment may be provided with a user interface 220 configured to receive an input from a user or display operation information. However, the user interface 220 may be provided on the outer housing 21 according to embodiments.

The user interface 220 according to one embodiment may include an inputter 221 configured to receive an input from a user, and a display 222 provided to display operation information. Further, the user interface 220 may further include a speaker provided to output a sound for operation information, according to embodiments.

The inputter 221 according to one embodiment may include a first inputter 221a provided in the form of a jog dial to receive a selection of a cooking temperature, a selection of a cooking time, a selection of a cooking zone, a selection of a food item, and a selection of a meal, and a second inputter 221b provided in the form of a button or an icon to receive an input of starting a cooking operation, stopping a cooking operation, and selecting a control target. However, the inputter 221 is not limited to the example, and may be provided in various types capable of receiving an input for controlling the cooking apparatus 20 from a user according to embodiments.

The display 222 according to one embodiment may display information inputted by a user, such as information on a cooking temperature, a cooking time, and a cooking zone selected by the user. In addition, the display 222 may display a notification about the arrangement of the food item, information on a recommended food item that may be cooked simultaneously with the food item, or information on a recommended meal that may be made with the food item. For this, the display 222 may be provided with a known type of display panel.

The display 222 may be provided as a touch screen according to embodiments, and in this case, the inputter 221 may be provided integrally with the display 222.

In addition, unlike that illustrated in FIG. 2, the door 22 may be formed of a transparent member to allow a user to observe the inside of the cooking chamber 23 even when the door 22 closes the cooking chamber 23 according to embodiments.

Referring to FIGS. 3 and 4, the cooking apparatus 20 may include the cooking chamber 23 arranged inside the outer housing 21 and in which a food item corresponding to a cooking object is placed, an inner housing 24 arranged inside the outer housing 21 and provided to form the cooking chamber 23, and a separation space 27 formed between the outer housing 21 and the inner housing 24.

The outer housing 21 and the inner housing 24 are provided to open in a first direction A, which is a front direction of the cooking apparatus 20. A user can place the food item to the cooking chamber 23 through the opening of the inner housing 24 formed in the first direction A.

Further, according to embodiments, on a front surface of the cooking apparatus 20, an identifier 28 (for example, a QR code, a barcode, and an icon) provided to allow the terminal device 10 to identify the cooking apparatus 20 in response to imaging the cooking apparatus 20 by the terminal device 10 may be provided. Accordingly, the terminal device 10 may identify the cooking apparatus 20 and may use the identifier 28 as a reference position for outputting a virtual reality image. The identifier 28 may be provided on a front portion of the separation space 27 to be captured upon opening the door 22, but is not limited thereto. Accordingly, the identifier 28 may be arranged in any position as long as being captured upon opening the door 22. Alternatively, the identifier 28 may be arranged in a front portion of the outer housing 21 or the door 22 so as to be captured upon closing the door 22.

The cooking apparatus 20 according to one embodiment may include the cooking chamber 23 having a rectangular parallelepiped shape that is long in a second direction B and relatively short in the first direction A. In other words, the cooking chamber 23 may have a rectangular parallelepiped shape having a long side 23L in the second direction B.

The cooking apparatus 20 may include an electric room 26 formed inside the outer housing 21 and arranged below the cooking chamber 23. Various electrical components for operating the cooking apparatus 20 may be arranged inside the electric room 26.

The cooking apparatus 20 may include the shelf 25 mounted to the cooking chamber 23 and in which a food item is placed. The shelf 25 is provided to be detachable from the cooking chamber 23. A user can place a food item to the shelf 25 coupled to the cooking chamber 23. Alternatively, after a user separates the shelf 25 from the cooking chamber 23 to position the shelf 25 to the outside of the cooking chamber 23, the user can place the food item to the shelf 25 and then couple the shelf 25 to the cooking chamber 23.

The cooking chamber 23 may include a support 23c formed on opposite sides of the cooking chamber 23 to allow the shelf 25 to be mounted between an upper surface 23a and a lower surface 23b of the cooking chamber 23.

The support 23c may be provided in plurality in a third direction C to allow the shelf 25 to be mounted at various heights. The third direction C is a direction perpendicular to the first direction A or the second direction B with respect to a vertical direction.

The shelf 25 may include a main body 25a and a cooking surface 25b on which a food item is arranged. The cooking surface 25b may be provided to face the upper surface 23a of the cooking chamber 23 in response to mounting the shelf 25. The cooking surface 25b according to one embodiment may have a rectangular shape having a long side in the second direction B and a short side in the first direction A.

According to embodiments, an identifier 25d (for example, a QR code, barcode, and icon) may be provided on the front surface of the cooking apparatus 20 to allow the terminal device 10 to identify the shelf 25 in response to imaging the shelf 25 by the terminal device 10. Accordingly, the terminal device 10 may identify the shelf 25 and use the identifier 25d as a reference position for outputting a virtual reality image. The identifier 25d may be provided on a surface of the main body 25a in the same direction as the cooking surface 25b to be captured in response to imaging the cooking surface 25b.

The cooking apparatus 20 may include a heat source 260 configured to supply heat to the inside of the cooking chamber 23 to cook a food item by using heat. The heat source 260 may heat a food item arranged in the cooking chamber 23. For example, the heat source 260 may heat a food item positioned on the shelf 25 and a food item positioned on the lower surface 23b of the cooking chamber 23.

The cooking apparatus 20 may include a plurality of heat sources 260, and each of the plurality of heat sources 260 is provided at different positions with respect to the cooking chamber 23 according to embodiments. Accordingly, an amount of radiated heat may vary for different positions in the cooking chamber 23. In addition, each of the plurality of heat sources 260 may be provided in different types (for example, heaters, and magnetrons) according to embodiments, and thus the type of heating applied to different positions in the cooking chamber 23 may vary.

The cooking apparatus 20 may include the plurality of heat sources 260 in which at least one of installation positions or types is different, and thus it is possible to form a plurality of cooking zones having heating characteristics different from each other in the cooking chamber 23.

For example, the plurality of heat sources 260 may include a plurality of heaters 261: 261a, 261b, 261c, and 261d arranged on the upper surface 23a of the cooking chamber 23 and a magnetron 262 arranged below the lower surface 23b of the cooking chamber 23. Hereinafter for convenience of explanation, it will be described that the plurality of heat sources 260 includes the plurality of heaters 261 and the magnetron 262 as an example, but the positions and types of the plurality of heat sources 260 are not limited thereto. For example, the heat source of the lower surface 23b of the cooking chamber 23 may be provided as a heater instead of a magnetron according to embodiments.

The plurality of heaters 261 according to one embodiment generate heat based on power supplied from a power supply device (not shown), thereby supplying heat to the food item placed in the cooking chamber 23. The heater 261 may include a sheath heater, a planar heating heater, and a halogen lamp heater, but the type of the heater 261 is not limited to the above example.

The magnetron 262 according to one embodiment may oscillate a high frequency into the cooking chamber 23. The high frequency generated by the magnetron 262 may repeatedly change the molecular arrangement of moisture contained in the food item, and thus the food item may be heated by frictional heat between the moisture molecules.

According to embodiments, the magnetron 262 may be arranged in the electric room 26. The magnetron 262 may supply heat to a food item positioned on the lower surface 23b of the cooking chamber 23 by oscillating a high frequency from the electric room 26 toward the lower surface 23b of the cooking chamber 23. The high frequency may pass through the lower surface 23b and then be radiated to the shelf 25, thereby supplying heat to a food item positioned on the shelf 25.

According to embodiments, the shelf 25 may further include a heat generator 25c to allow heat to be efficiently transferred to a lower portion of a food item arranged on the shelf 25.

The heat generator 25c may be arranged on the opposite side of the cooking surface 25b in the main body 25a of the shelf 25. The heat generator 25c may be provided to face the lower surface 23b of the cooking chamber 23 in response to mounting the shelf 25 to the cooking chamber 23.

The heat generator 25c may generate heat by absorbing the high frequency generated from the magnetron 262. The heat generated by the heat generator 25c may be transferred to the cooking surface 25b through the main body 25a of the shelf 25. That is, while the heat generated by the heat generator 25c is conducted to the cooking surface 25b, the heat may be supplied to the lower portion of the food item positioned on the cooking surface 25b of the shelf 25. The heat generator 25c may be formed of a ferrite material to absorb a high frequency. However, the present disclosure is not limited thereto, and a material capable of generating heat by a high frequency may be mixed with ceramic to form the heat generator 25c.

Accordingly, even if a user does not turn over the food item in the middle of a cooking process, the heat may be supplied to the food item in the vertical direction, and thus the cooking may proceed efficiently.

According to embodiments, the heat generator 25c may be formed of a heating material such that at least one of a heating type or a heating amount varies for each position of the shelf 25. Accordingly, the heating characteristics may vary depending on the position of the shelf 25. For example, the heat generator 25c may include a first heat generator positioned to correspond to the left half of the shelf 25 and formed of a heating material having superior heat generating performance according to high frequencies, and a second heat generator positioned to correspond to the right half of the shelf 25 and formed of a heating material having a relatively low heat generating performance according to high frequencies.

As described above, the cooking apparatus 20 may include the plurality of heat sources 260 that differ in at least one of a heat source installation location or a heat source type, and the cooking apparatus 20 may control the amount of heat output from the plurality of heat sources 260 so as to form the plurality of cooking zones having different heating characteristics from each other, in the cooking chamber 23.

For example, the plurality of cooking zones formed in the cooking chamber 23 may be defined as a first cooking zone 201 and a second cooking zone 202 formed on the shelf 25, and a third cooking zone 203 formed on the lower surface 23b of the cooking chamber 23. However, the plurality of cooking zones is not limited to the above example, and may vary depending on the installation location of the heat source 260, the type of the heat source 260, the configuration of the heat generator 25c, or the number of shelves 25. Hereinafter for convenience of description, it will be described that the plurality of cooking zones 200 includes the first cooking zone 201 and the second cooking zone 202 formed on the shelf 25, and the third cooking zone 203 formed on the lower surface 23b of the cooking chamber 23.

Particularly, there is a situation in which a plurality of food items having different cooking temperatures is simultaneously put into the cooking chamber 23 to cook. That is, different food items may be arranged on each of the cooking zones 201 and 202 on the shelf 25 and the lower surface 23b of the cooking chamber 23.

In this case, the cooking apparatus 20 may set different temperatures of heat generated by the plurality of heaters 261: 261a, 261b, 261c, and 261d. That is, the cooking apparatus 20 may adjust the output of the plurality of heaters 261: 261a, 261b, 261c, and 261d, independently of each other. Further, the cooking apparatus 20 may independently adjust the output of the magnetron 262. Accordingly, the cooking apparatus 20 may transfer a different heat energy to the plurality of food items arranged in the cooking zones 201 and 202 of the shelf 25 and the third cooking zone 203 of the lower surface 23b of the cooking chamber 23, respectively.

In response to the plurality of heaters 261 being arranged on the upper surface 23a of the cooking chamber 23, the plurality of food items may be arranged at positions corresponding to the positions of the plurality of heaters 261. For example, the cooking surface 25b of the shelf 25 may be divided into the first cooking zone 201 and the second cooking zone 202. The first cooking zone 201 and the second cooking zone 202 of the shelf 25 may be heated to different temperatures. The plurality of food items may be located in each of the cooking zones 201 and 202 of the shelf 25. Accordingly, a different thermal energy may be provided to each of the plurality of food items.

According to embodiments, the plurality of heaters 261 and the cooking zones 201 and 202 of the shelf 25 may be formed to face each other with respect to the third direction C. Different heat generated by each of the plurality of heaters 261 may be directly transferred to the first cooking zone 201 and the second cooking zone 202 of the shelf 25.

Accordingly, even when a plurality of food items having different cooking temperatures is simultaneously put into the cooking chamber, each of the food items may be cooked at different temperatures. In other words, in response to a food item being arranged in each of the first cooking zone 201, the second cooking zone 202, and the third cooking zone 203, each food item may be cooked at a different temperature. Alternatively, the food item arranged in each of the first cooking zone 201, the second cooking zone 202, and the third cooking zone 203 may be cooked at the same temperature.

The cooking apparatus 20 according to one embodiment includes the plurality of heaters 261: 261a, 261b, 261c, and 261d having a long axis 261L extending in the first direction A. Each of the heaters 261a, 261b, 261c, and 261d may be spaced apart from each other in the second direction B corresponding to the long side 23L of the cooking chamber 23. On the cooking surface 25b of the shelf 25, the plurality of cooking zones 201 and 202 receiving heat of different temperatures may be partitioned along the second direction B.

As the plurality of heaters 261a, 261b, 261c, and 261d is spaced apart in the second direction B, and the cooking zones 201 and 202 of the shelf 25 are partitioned along the second direction B, a width of each cooking zone may be increased, and the temperature difference between the cooking zones may be increased. In addition, because it is not necessary to place the plurality of food items deeply on the rear surface of the cooking chamber 23 upon placing the plurality of food items, it is easy to observe the food items arranged on the shelf 25.

Alternatively, according to embodiments, the plurality of heaters 261a, 261b, 261c, and 261d may be spaced apart from each other in the first direction A, and the cooking zones 201 and 202 of the shelf 25 may be partitioned along the first direction A.

Hereinafter the plurality of heaters 261a, 261b, 261c, and 261d according to one embodiment and the plurality of cooking zones 201 and 202 partitioned on the shelf 25 will be described in detail.

Referring to FIG. 5, each of the plurality of heaters 261a, 261b, 261c, and 261d according to one embodiment may have the long axis 261L extending in the first direction A, and the plurality of heaters 261a, 261b, 261c, and 261d may be spaced apart from each other in the second direction B corresponding to the long side 23L of the cooking chamber 23. A separation distance between the plurality of heaters 261a, 261b, 261c, and 261d according to one embodiment may be a first separation distance d1 and/or a second separation distance d2.

For example, the first heater 261a and the third heater 261c may be arranged to have the first separation distance d1 on the first cooking zone 201, and the second heater 261b and the fourth heater 261d may be arranged to have the first separation distance d1 on the second cooking zone 202. The first heater 261a and the second heater 261b may be arranged to have the second separation distance d2. The second separation distance d2 may be greater than the first separation distance d1. This is to provide a temperature difference between the first cooking zone 201 and the second cooking zone 202. Alternatively, according to embodiments, the first separation distance d1 and the second separation distance d2 may be the same.

In the above description, it has been described that the plurality of heaters 261 includes the first heater 261a, the second heater 261b, the third heater 261c, and the fourth heater 261d, but the present disclosure is not limited thereto. The plurality of heaters 261 may be composed of the first heater 261a and the second heater 261b, or may be composed of four or more heaters according to embodiments.

With respect to the second direction B, the first heater 261a may be arranged on one side of the cooking apparatus 20, and the second heater 261b may be arranged on the opposite side of the first heater 261a. Particularly, the first heater 261a may be arranged on one side and the second heater 261b may be arranged on the opposite side with respect to a center line G of the cooking surface 25b. The third heater 261c may be arranged adjacent to the first heater 261a, and the fourth heater 261d may be arranged adjacent to the second heater 261b.

The first heater 261a and the third heater 261c may generate heat at the same temperature. The second heater 261b and the fourth heater 261d may generate heat at the same temperature. The first heater 261a and the second heater 261b may generate heat of different temperatures. Similarly, the third heater 261c and the fourth heater 261d may generate heat of different temperatures. That is, the heating temperature on the left side and the heating temperature on the right side with respect to the center line G may be different from each other.

For example, the cooking apparatus 20 may set a heating temperature of the first heater 261a higher than the heating temperature of the second heater 261b. In this case, the first heater 261a and the second heater 261b may be independently controlled based on a set temperature. The first heater 261a, the second heater 261b, the third heater 261c, and the fourth heater 261d may be independently and/or selectively controlled.

Meanwhile, although the heating temperature of each of the plurality of heaters 261a, 261b, 261c, and 261d is set to be the same, a driving method of each heater may be controlled differently. For example, during an entire cooking time, the cooking apparatus 20 may continuously drive the first heater 261a and the third heater 261c, and but repeatedly turn on/off the second heater 261b and the fourth heater 261d. Accordingly, a thermal energy provided by the first and third heaters 261a and 261c may be greater than a thermal energy provided by the second and fourth heaters 261b and 261d.

By differently controlling the installation position, heating temperature, or driving method of each of the plurality of heaters 261, the cooking surface 25b of the shelf 25 may be divided into the first cooking zone 201 and the second cooking zone 202. The first cooking zone 201 may be formed on the left side of the center line G and the second cooking zone 202 may be formed on the right side of the center line G. Although the two cooking zones 200 of the shelf 25 are illustrated, three or more cooking zones 200 may be formed by changing the installation position, heating temperature, or driving method of each of the plurality of heaters 261.

The heater 261 may provide heat to at least one of the first cooking zone 201 or the second cooking zone 202 of the shelf 25. The first heater 261a and the third heater 261c may be arranged at positions corresponding to the first cooking zone 201 with respect to the third direction C. The second heater 261b and the fourth heater 261d may be arranged at positions corresponding to the second cooking zone 202 with respect to the third direction C.

As described above, in response to heat, which is generated by the first and third heaters 261a and 261c and the second and fourth heaters 261b and 261d, being different from each other, the thermal energy transferred to the first and second cooking zones 201 and 202 may be different. That is, heat generated by the first heater 261a and the third heater 261c may be transferred from the upper surface 23a to the first cooking zone 201. Heat generated by the second heater 261b and the fourth heater 261d may be transferred from the upper surface 23a to the second cooking zone 202.

In addition, heat conducted from the heat generator 25c may be transferred to the first cooking zone 201 and the second cooking zone 202. The heat generator 25c may be heated by a high frequency generated from the magnetron 262 arranged on the lower surface 23b of the cooking chamber 23. Heat generated by the heat generator 25c may be conducted to the cooking surface 25b. As described above, according to embodiments, the heat generator 25c may be formed of a heating material such that at least one of a heating type or a heating amount varies for each position of the shelf 25. For example, the heat generator 25c may include a first heat generator positioned to correspond to the first cooking zone 201 and formed of a heating material having superior heat generating performance according to high frequencies, and a second heat generator positioned to correspond to the second cooking zone 202 and formed of a heating material having a relatively low heat generating performance according to high frequencies. As described above, the cooking zone 200 formed on the shelf 25 may be formed by changing the configuration of the heat generator 25c in addition to the plurality of heaters 261.

The heat generated by the first and third heaters 261a and 261c and the heat generated by the second and fourth heaters 261b and 261d are different from each other and the heat transferred to the first cooking zone 201 and the second cooking zone 202 is different from each other. Therefore, food items having different cooking temperatures may be arranged in the first cooking zone 201 and the second cooking zone 202, respectively, and cooked at the same time.

As described above, the cooking apparatus 20 may include the plurality of heat sources 260 that differ in at least one of a heat source installation location or a heat source type, and the cooking apparatus 20 may control the amount of heat output from the plurality of heat sources 260 so as to form the plurality of cooking zones having different heating characteristics from each other, in the cooking chamber 23.

In this case, each of the different types of food item may have unique heating characteristics, such as varying specific heat according to constituent materials forming the food item. Further, different types of food item may have different optimum cooking temperatures, to be cooked, from each other.

Accordingly, a cooking efficiency may increase as each of the different types of food item is cooked in a cooking zone, which provides an optimal thermal energy to the food item, among the plurality of cooking zones 200 of the cooking chamber 23.

However, a user may feel inconvenient to always check which cooking zone among the plurality of cooking zones 200 of the cooking chamber 23 corresponds to the optimal cooking zone corresponding to the corresponding food.

Accordingly, in response to a food item being input, the terminal device 10 and the cooking apparatus 20 according to one embodiment more intuitively guide an optimal cooking zone for each input food item. Therefore, the user can easily recognize the optimal cooking zone for each food item and thus it possible to increase the cooking efficiency of the food item.

Hereinafter one embodiment in which the terminal device 10 and the cooking apparatus 20 guide the arrangement of food item in consideration of the plurality of cooking zones 200 having different heating characteristics will be described in detail.

Figure 6:
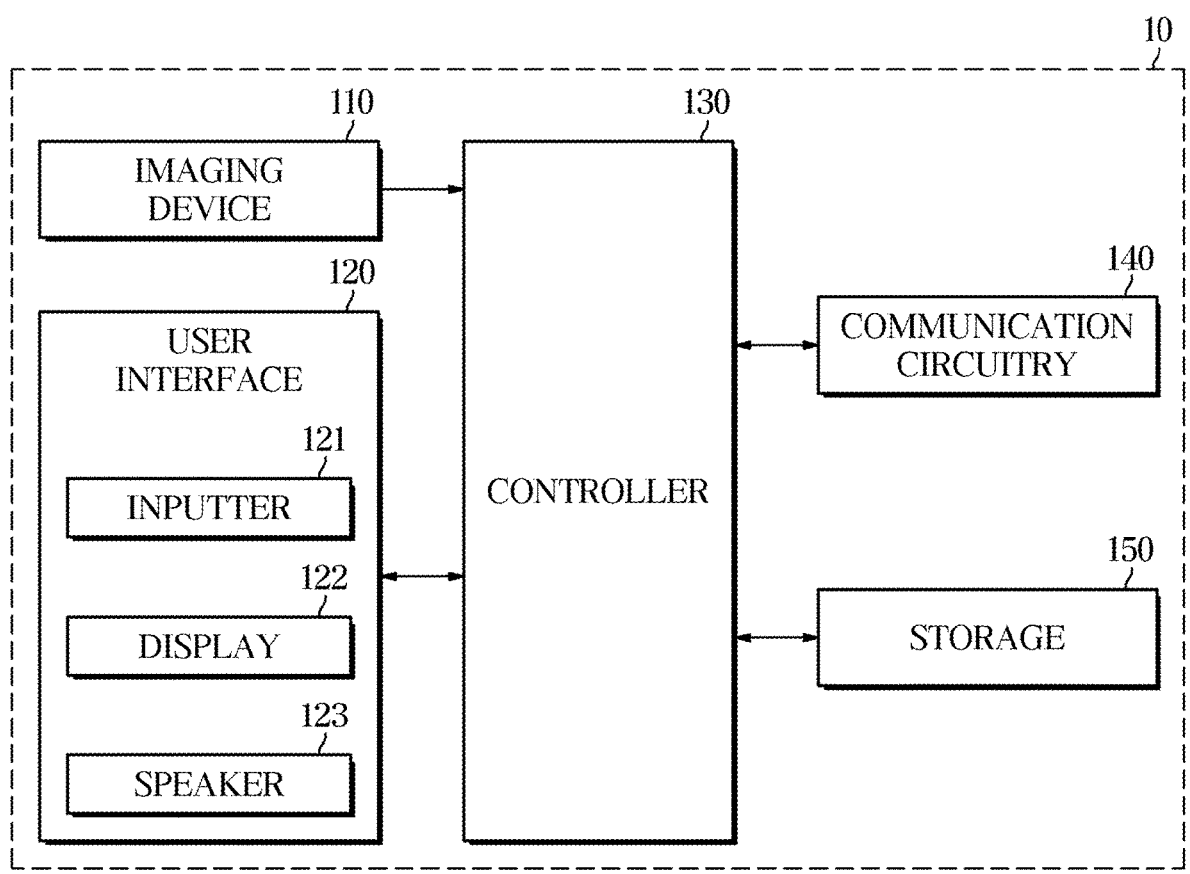
FIG. 6 is a diagram of a terminal device according to one embodiment of the present disclosure.

FIG. 6 is a diagram of the terminal device 10 according to one embodiment of the present disclosure.

Referring to FIG. 6, the terminal device 10 according to one embodiment includes the imaging device 110, the user interface 120 provided to display an image captured through the imaging device 110 and configured to receive an input from a user, a controller 130 configured, in response to obtaining food item information, to control the user interface 120 to display an AR image of the food item superimposed on the image of the cooking apparatus 20, a communication circuitry 140 configured to communicate with an external device, and a storage 150 configured to store various information required for control.

However, each component of the terminal device 10 illustrated in FIG. 6 may be omitted according to embodiments, and a component not shown may be added as necessary.

The imaging device 110 according to one embodiment may be provided in the main body of the terminal device 10, and configured to obtain image data for the external area by imaging the external area of the terminal device 10. For this, the imaging device 110 may include a known type of imaging sensor. For example, the imaging device 110 may include a camera, and a video capturing device.

As described later, image data obtained through the imaging device 110 may be displayed on the display 122 of the user interface 120 under the control of the controller 130.

A user can place the terminal device 10 to in front of the cooking apparatus 20 to allow the imaging device 110 to obtain image data for the cooking apparatus 20, and the image of the cooking apparatus 20 may be displayed on the display 122.

According to embodiments, the imaging device 110 may be located on a rear surface of one surface of the main body on which the display 122 is located.

The user interface 120 according to one embodiment may include the inputter 121 configured to receive an input from a user, the display 122 provided to display image data obtained through the imaging device 110, and a speaker 123 configured to output a sound.

The inputter 121 according to one embodiment may receive information about a food item to be cooked from a user. According to embodiments, the inputter 121 may receive a selection of a meal completed from a user. Further, the inputter 121 may receive a setting value necessary for controlling the cooking apparatus 20 according to embodiments.

For this, the inputter 121 may be provided as a known type of input device, or according to embodiments, may be provided as a touch screen integrally configured with the display 122.

The display 122 according to one embodiment may display image data obtained through the imaging device 110. Particularly, the display 122 may display an image of the cooking apparatus 20 obtained through the imaging device 110. In this case, the image of the cooking apparatus 20 may correspond to an image of the cooking chamber 23 or an image of the shelf 25 separated from the cooking chamber 23.

For this, the display 122 may be provided as a display panel for displaying image data, and the type of the display panel is not limited thereto.

The display 122 may display the AR image of the food item superimposed on the image of the cooking apparatus 20 based on the control of the controller 130 according to embodiments. This will be described in detail again later.

Further, according to embodiments, the display 122 may display various notifications based on the control of the controller 130. For example, the display 122 may display a notification in the form of a message. However, the type of notification is not limited thereto, and may be provided in various types such as icons.

The speaker 123 according to one embodiment may output various sound notifications based on the control of the controller 130. For this, the speaker 123 may be configured as a known type of a speaker device.

The controller 130 according to one embodiment may obtain information on a food item to be cooked from a user. Particularly, by directly receiving a food item from a user or by processing an image of the food item obtained through the imaging device 110 or by receiving information on a food item from the cooking apparatus 20, the controller 130 may obtain information on the food item to be cooked.

Further, according to embodiments, the controller 130 may receive a list of food items stored in the refrigerator 50 from the server 30 or the refrigerator 50, and display the list of food items. Accordingly, the controller 130 may receive a user selection for at least one food item in the list so as to obtain information on the food item to be cooked.

Further, according to embodiments, the controller 130 may receive a list of meals, which may be made with food items stored in the refrigerator 50, from the server 30. The controller 130 may display the list of meals to receive a user selection for at least one meal in the list of meals and determine a food item that is required for the selected meal, thereby obtaining information on the food item to be cooked. In this case, the terminal device 10 may determine the food item required for making the meal by using pre-stored correlation information between the meal and the food item, or by receiving information on the food item required for making the meal, from the server 30.

In response to an image, which is obtained by the imaging device 110, corresponding to an image of the cooking apparatus 20, and in response to obtaining food item information from a user, the controller 130 according to one embodiment may control the user interface 120 to display an AR image of the food item superimposed on a recommended cooking zone among the plurality of cooking zones 200.

That is, in response to obtaining food item information, to be cooked, the controller 130 may determine a recommended cooking zone corresponding to the food item, among the plurality of cooking zones 200 of the cooking apparatus 20, and the controller 130 may control the user interface 120 to display an AR image of the food item superimposed on the image of the cooking apparatus 20 so as to allow the AR image of the food item to be displayed on the recommended cooking zone.

In response to the plurality of food items, the controller 130 may control the user interface 120 to display an AR image of each of the plurality of food items superimposed on the recommended cooking zone with the image of the cooking apparatus 20. That is, in response to the food item, to be cooked, being provided in plurality, the controller 130 may determine a recommended cooking zone corresponding to each of the plurality of food items, and control the user interface 120 to display the AR image of each of the plurality of food items superimposed on the image of the cooking apparatus 20 so as to allow the AR image of each of the plurality of food items to be displayed in a corresponding recommended cooking zone.

For example, in response to the food item including a plurality of ingredients, such as a meal kit or HMR, the controller 130 may control the user interface 120 to display an AR image of each of the plurality of ingredients superimposed on a corresponding recommended cooking zone with the image of the cooking apparatus 20.

The controller 130 may configure an AR image of a food item in the form of the food item to allow a user to identify the AR image as the food item.

In addition, the controller 130 according to one embodiment may determine an AR image of the food item to display a recommended cooking amount of the food item. Particularly, the controller 130 may determine the AR image of the food item such that the AR image of the food item includes the number of the food items corresponding to the recommended cooking amount.

Further, the controller 130 according to one embodiment may determine an AR image of the food item to display the recommended arrangement form of the food item. Particularly, the controller 130 may determine a shape of the food item to correspond to the recommended arrangement form, and determine the AR image of the food item to include the determined shape of the food item.

In response to obtaining the food item information, the controller 130 may determine a recommended cooking zone, a recommended cooking amount or a recommended arrangement form for the corresponding food item by using food item arrangement information corresponding to the obtained food item information, among the arrangement information stored in the storage 150. However, in response to the arrangement information not being stored in the storage 150, the controller 130 may request the arrangement information on the food item to the server 30 and determine a recommended cooking zone, a recommended cooking amount or a recommended arrangement form for the corresponding food item, based on the arrangement information received from the server 30.

The controller 130 according to one embodiment may control the user interface 120 to display an AR image indicating each of the plurality of cooking zones of the cooking apparatus 20 superimposed on the image of the cooking apparatus 20.

In addition, the controller 130 according to one embodiment may control the user interface 120 to output a notification in response to determining that the food item is arranged in a cooking zone other than the recommended cooking zone.

In addition, in response to obtaining food item information from a user, the controller 130 according to one embodiment may determine a recommended food item that may be cooked in a cooking zone other than the recommended cooking zone, and control the user interface 120 to display an AR image of the recommended food item superimposed on a corresponding cooking zone.

In addition, in response to obtaining food item information from a user, the controller 130 according to one embodiment may determine a recommended meal that uses the food item as an ingredient, and control the user interface 120 to display the recommended meal. In this case, the controller 130 may determine other food item that is required for the recommended meal, and control the user interface 120 to display an AR image of the other food item superimposed on a corresponding cooking zone, according to embodiments.

In addition, based on a selection of a meal, which is to be completed, from a user, the controller 130 according to one embodiment may determine a plurality of food items that is required for making the meal, and control the user interface 120 to display an AR image of each of the plurality of food items superimposed on a corresponding cooking zone with the image of the cooking apparatus 20.

The controller 130 according to one embodiment may control the user interface 120 so as to enlarge and display an AR image of food item based on an image, which is captured by the imaging device 110, corresponding to an image of a recommended cooking zone.

In addition, based on the image, which is captured by the imaging device 110, corresponding to the image of the recommended cooking zone, the controller 130 according to one embodiment may control the user interface 120 to display at least one of an amount of calories in the food item, an image before cooking of the food item, an image after cooking of the food item, or a recipe of the food item.

The controller 130 may include at least one memory configured to store a program for performing the above-described operation and an operation to be described later, and at least one processor configured to execute the stored program.

The communication circuitry 140 according to one embodiment may communicate with the cooking apparatus 20 or the server 30 through wireless communication or wired communication. For this, the communication circuitry 140 may include a known type of communication module.

The communication circuitry 140 may transmit a setting value inputted by a user to the cooking apparatus 20, or may receive information on a food item from the cooking apparatus 20 according to embodiments.

Further, the communication circuitry 140 may receive arrangement information on a food item from the cooking apparatus 20 or the server 30 according to embodiments. That is, in response to the arrangement information on the food item not being stored, the communication circuitry 140 may request the arrangement information on the corresponding food item to the cooking apparatus 20 or the server 30 under the control of the controller 130.

The storage 150 according to one embodiment may be provided as a known type of storage medium to store various types of information required for control.

The storage 150 may store arrangement information for each food item. In this case, the arrangement information for each food item may include information on the correlation between the food item and the cooking zone, information on the correlation between the food item and the cooking amount of the food item, and information on the correlation between the food item and the arrangement form.

Figure 7:
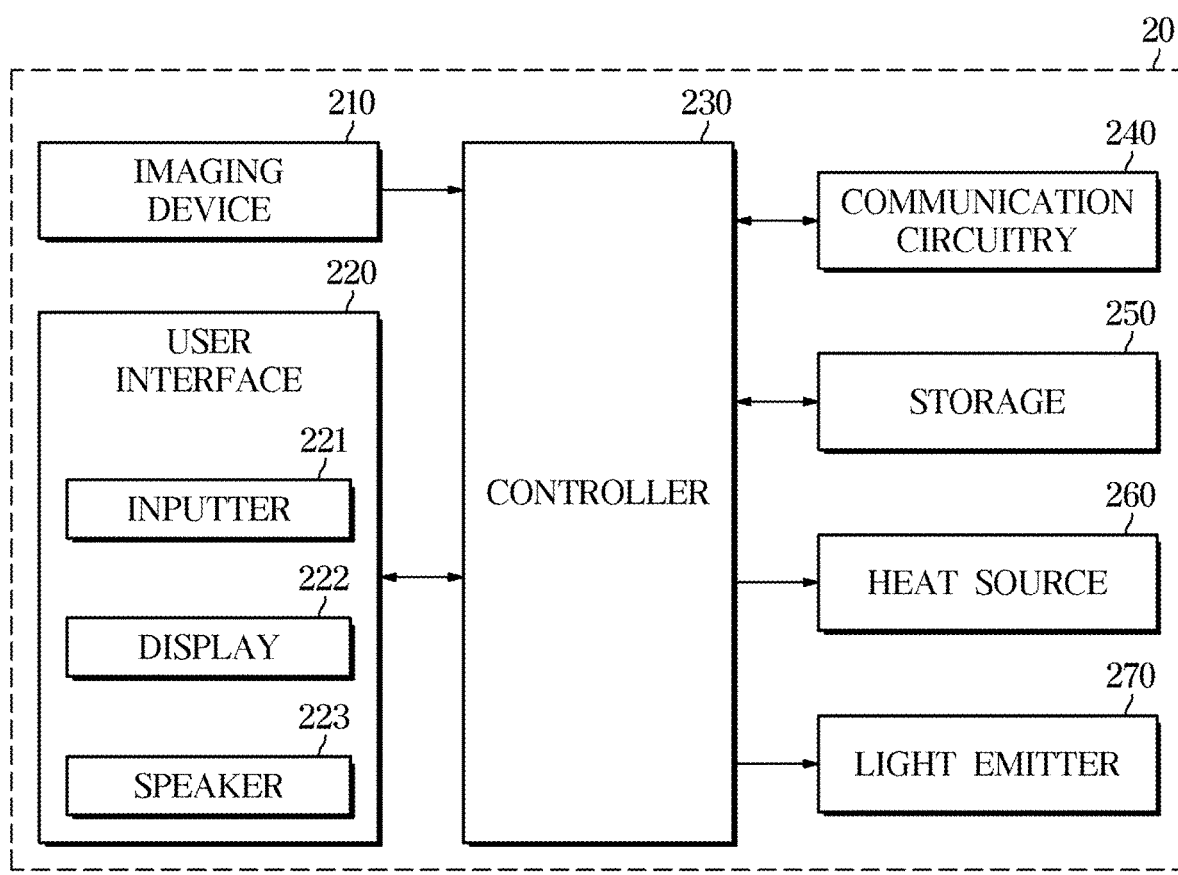
FIG. 7 is a diagram of the cooking apparatus according to one embodiment of the present disclosure.

FIG. 7 is a diagram of the cooking apparatus 20 according to one embodiment of the present disclosure.

Referring to FIG. 7, the cooking apparatus 20 according to one embodiment includes an imaging device 210 configured to image the cooking chamber 23, the user interface 220 configured to receive an input from a user and provided to display operation information, a controller 230 configured, in response to obtaining food item information, to guide a recommended cooking zone corresponding to the food item, a communication circuitry 240 configured to communicate with an external device, a storage 250 configured to store a variety of information for the control, the heat source 260 configured to radiate heat to the cooking chamber 23 and a light emitter 270 configured to emit light to the cooking chamber 23.

However, each component of the cooking apparatus 20 illustrated in FIG. 7 may be omitted according to embodiments, and a component not shown may be added as necessary.

The imaging device 210 according to one embodiment may be configured to obtain image data of the cooking chamber 23 by imaging the cooking chamber 23. For this, the imaging device 210 may be arranged on the upper surface 23a of the cooking chamber 23 and include a known type of imaging sensor. For example, the imaging device 210 may include a camera, and a video capturing device.

The user interface 220 according to one embodiment may include the inputter 221 configured to receive an input from a user, the display 222 provided to display operation information, and the speaker 223 provided to output a sound.

As illustrated in FIG. 2, the inputter 221 according to one embodiment may receive a selection of a cooking temperature, a selection of a cooking time, a selection of a cooking zone, starting a cooking operation, stopping a cooking operation, and a selection of a control target.

As illustrated in FIG. 2, the display 222 according to one embodiment may display information inputted by a user, such as information on a cooking temperature, a cooking time, and a cooking zone selected by a user. In addition, the display 222 may display a notification about the arrangement of the food item, information on a recommended food item that may be cooked simultaneously with the food item, or information on a recommended meal that may be made with the food item.

The speaker 223 according to one embodiment may output various sound notifications based on the control of the controller 130. For this, the speaker 223 may be provided as a known type a speaker device.

The controller 230 according to one embodiment may control the heat source 260 to cook a food item based on a user input inputted through the inputter 221.

Further, the controller 230 according to one embodiment may control the heat source 260 to cook a food item based on a user input received from the terminal device 10 through the communication circuitry 240.

In response to obtaining food item information, the controller 230 according to one embodiment may control the light emitter 270 to emit light to a recommended cooking zone among the plurality of cooking zones 200 of the cooking apparatus 20.

That is, in response to obtaining food item information, to be cooked, the controller 230 may determine a recommended cooking zone corresponding to the food item among the plurality of cooking zones 200 of the cooking apparatus 20, and control the light emitter 270 to emit light to the recommended cooking zone.

In response to the plurality of food items, the controller 230 may control the light emitter 270 to emit light that has a different shape for each recommended cooking zone of each of the plurality of food items. That is, in response to the plurality of food items to be cooked, the controller 230 may determine a recommended cooking zone corresponding to each of the plurality of food items, and the controller 230 may control the light emitter 270 to emit light that has a different shape for each recommended cooking zone corresponding to each of the plurality of food items.

According to embodiments, in response to obtaining the food item information, the controller 230 may transmit a notification requesting for imaging the cooking apparatus 20 through the terminal device 10, to the terminal device 10. In addition, according to embodiments, in response to obtaining the food item information, the controller 230 may control the user interface 220 to display a notification requesting for imaging the cooking apparatus 20 through the terminal device 10.

In response to the food item being arranged in the recommended cooking zone, the controller 230 according to one embodiment may control at least one of the plurality of heat sources 260 to heat the recommended cooking zone based on a recipe corresponding to the food item.

In this case, the recipe may include information on a cooking temperature and a cooking time corresponding to the food item. In other words, the recipe may include at least one of a cooking temperature, a cooking time, or an output of the heat source 260 as a cooking parameter for the operation of the heat source 260. In this case, as for the recipe, information on the recipe for each food item may be pre-stored in the storage 250. Further, the recipe to be applied to each cooking zone may be determined based on a user input. Information on a recipe for each food item may be received from the server 30 according to embodiments.

The controller 230 according to one embodiment may identify a food item based on image processing of the image of the cooking chamber 23 obtained through the imaging device 210, and may determine a recipe for the food item.

Particularly, the controller 230 may identify the food item based on an image of an identifier of the food item that is included in the image of the cooking chamber 23, and determine the recipe for the food item. In this case, the identifier of the food item may be displayed on a container of the food item, and may be provided as a QR code, a barcode, an icon, or the like. In response to the recipe, corresponding to the identified food item, being stored, the controller 230 may control the heat source 260 based on the stored recipe, and in response to the recipe, corresponding to the identified food item, not being stored, the controller 230 may request the recipe to the server 30 and then receive the recipe, thereby controlling the heat source 260.

In response to the plurality of food items, the controller 130 may identify each of the plurality of food items based on an image of an identifier of each of the plurality of food items and determine a recipe for each of the plurality of food items. In this case, the controller 230 may determine the recipe for each recommended cooking zone of the plurality of food items based on the recipe for each of the plurality of food items, and control at least one of the plurality of heat sources 260 to heat each recommended cooking zone based on the determined recipe for each recommended cooking zone.

In response to the food item being arranged in a cooking zone other than the recommended cooking zone, the controller 230 according to one embodiment may control the user interface 220 to output a notification.

In addition, in response to the food item being arranged in a cooking zone other than the recommended cooking zone, the controller 230 according to one embodiment may control at least one of the plurality of heat sources 260 to heat the cooking zone, in which the food item is arranged, based on the recipe corresponding to the food item.

In addition, in response to obtaining food item information from a user, the controller 230 according to one embodiment may determine a recommended food item that may be cooked in a cooking zone other than the recommended cooking zone, and control the user interface 220 to display the recommended food item.

In addition, in response to obtaining food item information from a user, the controller 230 according to one embodiment may determine a recommended meal that uses the food item as an ingredient, and control the user interface 220 to display the recommended meal.

The controller 230 may include at least one memory configured to store a program for performing the above-described operation and an operation to be described later, and at least one processor configured to execute the stored program.

The communication circuitry 240 according to one embodiment may communicate with the terminal device 10 or the server 30 through wireless communication or wired communication. For this, the communication circuitry 240 may include a known type of communication module.

The communication circuitry 240 may receive a user input for controlling the cooking apparatus 20 from the terminal device 10, and may request arrangement information on a food item to the server 30 and receive the arrangement information on the food item from the server 30.

The storage 250 according to one embodiment may be provided as a known type of storage medium to store various types of information required for control.

The storage 250 may store arrangement information for each food item and a recipe for each food item. In this case, the arrangement information for each food item may include information on the correlation between the food item and the cooking zone, information on the correlation between the food item and the cooking amount of the food item, and information on the correlation between the food item and the arrangement form.

The heat source 260 according to one embodiment may be provided in plurality, and configured to supply heat to the cooking chamber 23. For example, the heat source 260 may include the plurality of heaters 261a, 261b, 261c, and 261d provided on the upper surface 23a of the cooking chamber 23, and the magnetron 262 provided in the electric room 26 of the cooking chamber 23.

As illustrated in FIGS. 2 to 5, each of the plurality of heat sources 260 may form the plurality of cooking zones 200 in the cooking chamber 23 by changing at least one of the installation location or type.

The light emitter 270 according to one embodiment may be provided in the cooking chamber 23 to emit light to each of the plurality of cooking zones 200. For this, the light emitter 270 may include a light emitting device such as a light emitting diode (LED) and a laser. In this case, the light emitter 270 may include a plurality of light emitting devices provided at positions corresponding to each of the plurality of cooking zones 200 according to embodiments. In addition, according to embodiments, the light emitter 270 may emit light to each of the plurality of cooking zones 200 by mechanically adjusting an emission angle using a motor or the like. The light emitter 270 may be provided as a light emitting element array to perform phase adjustment so as to electrically adjust the emission angle. Accordingly, the light emitter 270 may emit light to each of the plurality of cooking zones 200.

In the above description, each component of the terminal device 10 and the cooking apparatus 20 has been described. Hereinafter one embodiment in which the terminal device 10 and the cooking apparatus 20 guide the arrangement of the food item in consideration of the plurality of cooking zones 200 having different heating characteristics will be described in more detail.

Figure 8A:
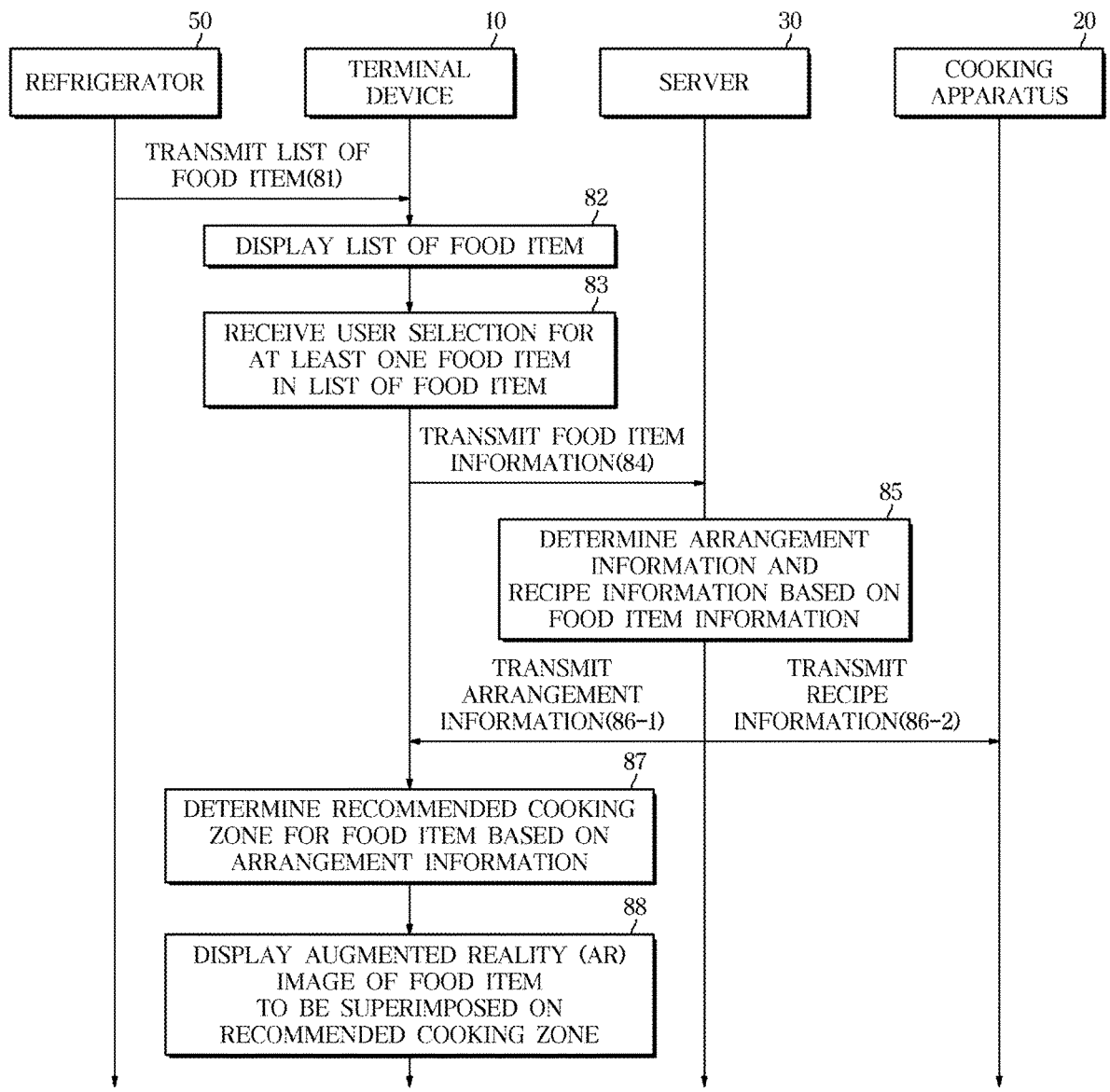
FIG. 8A is a signal flow diagram illustrating a state in which the terminal device according to one embodiment of the present disclosure obtains food item information according to a selection of a food item.
Figure 8B:
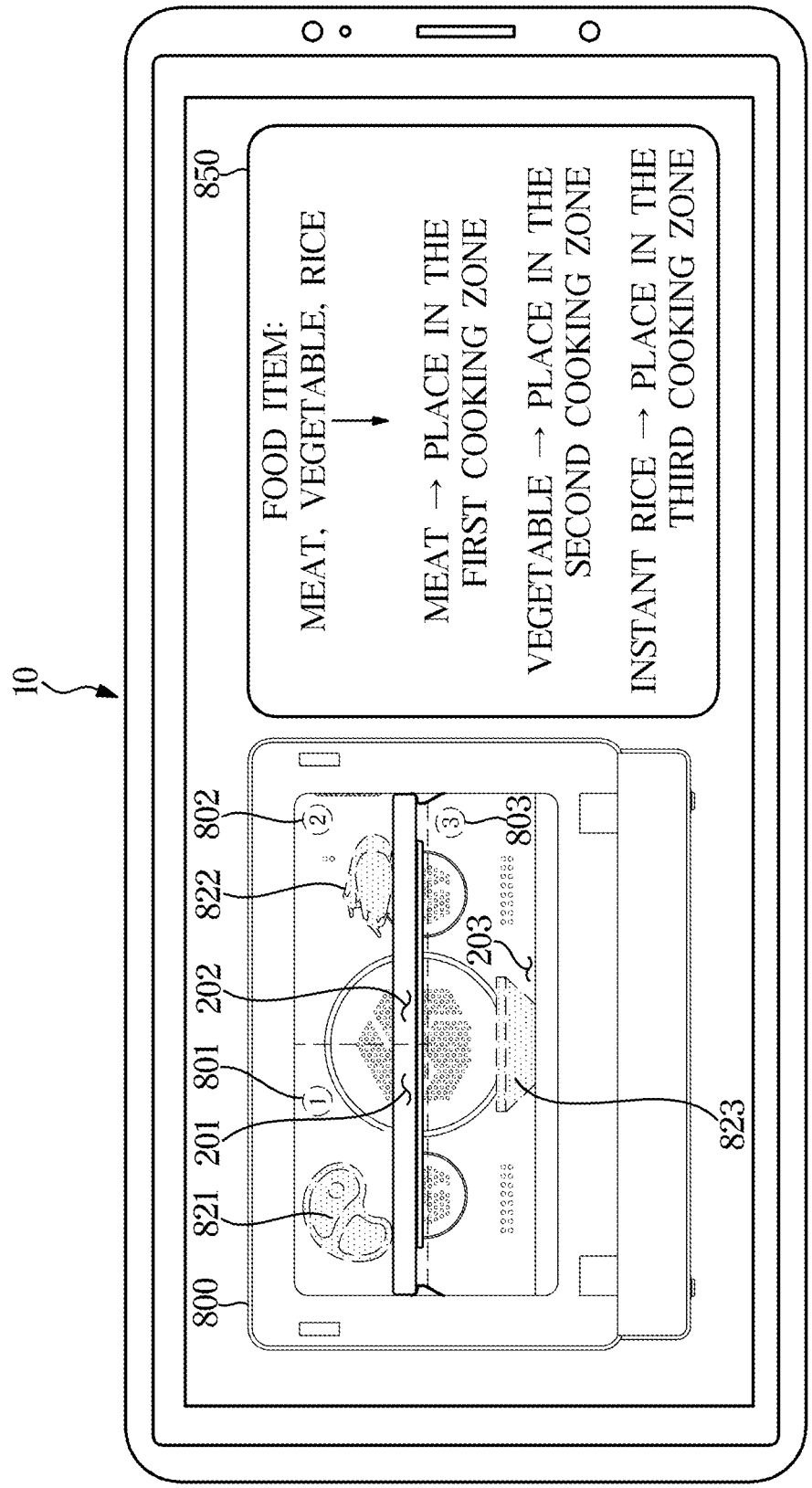
FIG. 8B is a view illustrating a state in which the terminal device according to one embodiment of the present disclosure displays an augmented reality (AR) image of a food item with an image of a cooking chamber as a background.
Figure 8C:
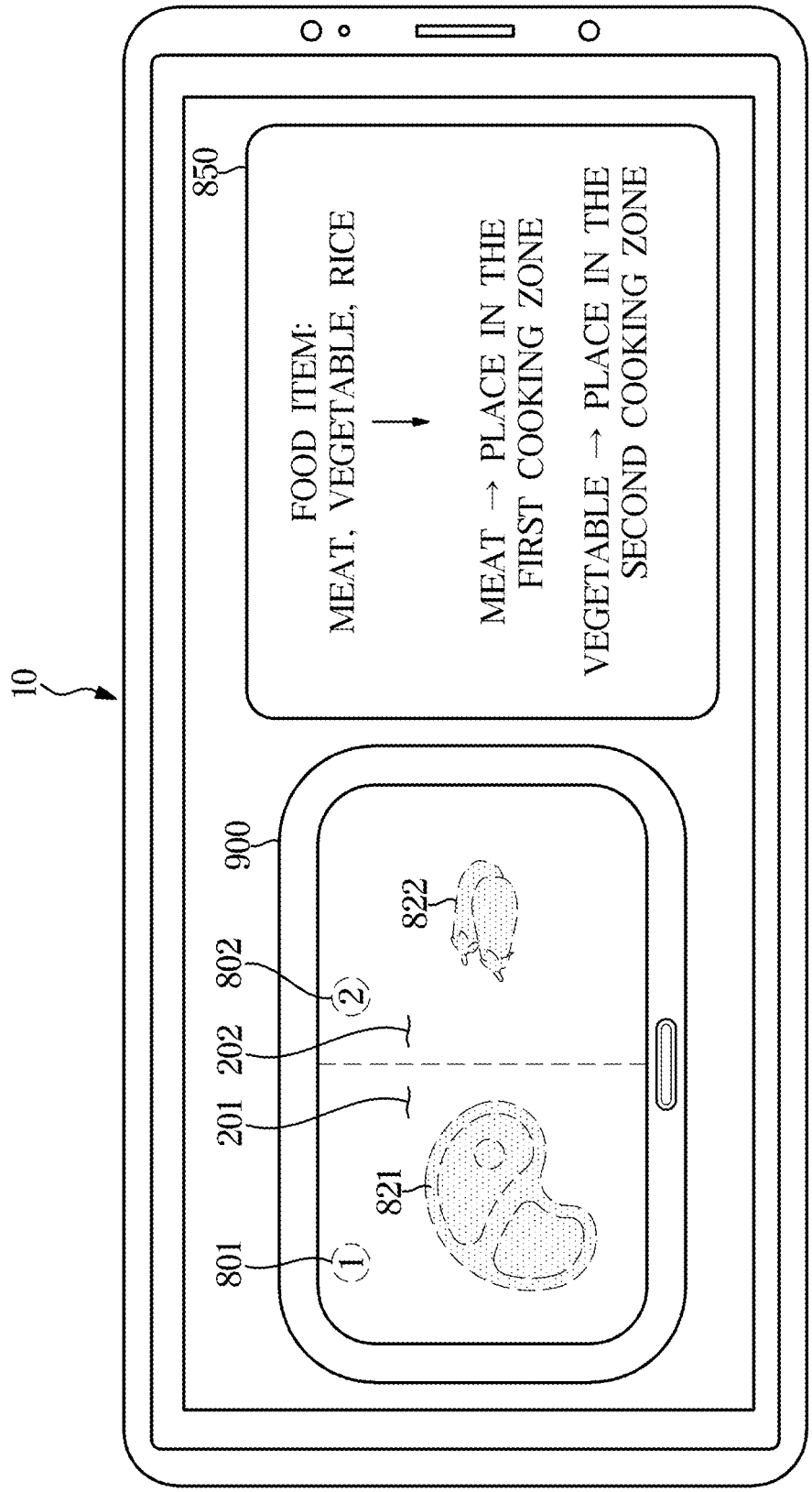
FIG. 8C is a view illustrating a state in which the terminal device according to one embodiment of the present disclosure displays an AR image of a food item with an image of the shelf as a background.

FIG. 8A is a signal flow diagram illustrating a state in which the terminal device according to one embodiment of the present disclosure obtains food item information according to a selection of a food item, FIG. 8B is a view illustrating a state in which the terminal device 10 according to one embodiment of the present disclosure displays an augmented reality (AR) image of a food item with an image of a cooking chamber 23 as a background, FIG. 8C is a view illustrating a state in which the terminal device 10 according to one embodiment of the present disclosure displays an AR image of a food item with an image of the shelf 25 as a background, and FIG. 8D is a view illustrating a state in which the terminal device according to one embodiment of the present disclosure displays an AR image of a food item with an image of the cooking chamber as a background when the food item includes a plurality of ingredients.

Referring to FIGS. 8A to 8D, in response to an image, which is captured by the imaging device 110, corresponding to an image of the cooking apparatus 20, and in response to obtaining food item information from a user, the controller 130 according to one embodiment may control the user interface 120 to display an AR image of the food item superimposed on a recommended cooking zone among the plurality of cooking zones 200.

The image of the cooking apparatus 20 may be an image of the cooking chamber 23 or an image of the shelf 25 separated from the cooking chamber 23.

Hereinafter displaying of an AR image of a food item 820 by the terminal device 10 will be described in more detail.

The refrigerator 50 according to one embodiment may transmit a list of food items stored in the storage compartment to the terminal device 10 (step 81). The terminal device 10 may obtain information on the food item by displaying the list of food items (step 82) and receiving a user selection for at least one food item from the list of food items (step 83). In this case, the list of food items may be directly transmitted from the refrigerator 50 to the terminal device 10, or may be transmitted through the server 30 according to embodiments.

However, according to embodiments, the terminal device 10 may obtain information on a food item to be cooked by directly receiving a food item inputted from a user through the inputter 121, or processing an image of the food item captured through the imaging device 110, or receiving the food item information from the cooking apparatus 20.

That is, according to embodiments, the terminal device 10 may obtain information on the food item to be cooked from the user through the inputter 121.

According to embodiments, the terminal device 10 may obtain the food item information based on image data of the food item obtained through the imaging device 110. In this case, the controller 130 may obtain the food item information by identifying what the food item is or by identifying an identifier displayed on a container of the food item through the image processing.

That is, a user inputs the food item information through the inputter 121 or images the food item through the imaging device 110. Accordingly, the user can allow the terminal device 10 to obtain the food item information.

Further, according to embodiments, the terminal device 10 may obtain the food item information by receiving the food item information from the cooking apparatus 20. The cooking apparatus 20 may obtain the food item information based on a user input through the inputter 221 or image data acquisition through the imaging device 210.

That is, a user inputs the food item information through the inputter 221 of the cooking apparatus 20 or places the food item to the cooking chamber 23. Accordingly, the user can allow the terminal device 10 to obtain the food item information.

The terminal device 10 according to one embodiment may transmit the food item information to the server 30 (step 84). The server 30 may determine arrangement information and recipe information based on the food item information (step 85), and transmit the arrangement information to the terminal device 10 (step 86-1), and transmit the recipe information to the cooking apparatus 20 (step 86-2).

In this case, the server 30 may store the correlation between the food item and the recommended cooking zone as table information, and determine the arrangement information corresponding to the food item information. Further, the server 30 may store the correlation between the food item and the recipe as table information and determine the recipe information corresponding to the food item information.

However, according to embodiments, the server 30 may determine the arrangement information and the recipe information using an artificial neural network. Particularly, the server 30 may input the food item information into the artificial neural network and obtain the arrangement information and the recipe information as output data. In this case, the artificial neural network may use cooking zone setting data according to a food item and recipe setting data according to a food item, which are received from a plurality of terminal devices or a plurality of cooking apparatus connected to the server 30, as training data. That is, because the artificial neural network is trained by using data, which is set by a user through various devices connected to the server 30, as training data, the artificial neural network may determine the arrangement information and the recipe information optimized for the food item.

According to embodiments, in response to the recipe information being stored as the table information, the server 30 may determine the recipe information, which is stored as the table information, rather than the recipe information output by the neural network, as the recipe information corresponding to the food item information, and transmit the recipe information.

Thereafter, the controller 130 may determine a recommended cooking zone of the food item based on the arrangement information (step 87), and control the user interface 120 to display an AR image of the food item superimposed on a recommended cooking zone among the plurality of cooking zones 200 of the cooking apparatus 20 (step 88). In this case, the cooking apparatus 20 may control the heat source 260 configured to heat the recommended cooking zone based on the recipe information.

That is, in response to obtaining the food item information, to be cooked, the controller 130 may determine a recommended cooking zone corresponding to the food item among the plurality of cooking zones 200 of the cooking apparatus 20, and control the user interface 120 to display the AR image of the food item 820 superimposed on the image of the cooking apparatus 20 so as to allow the AR image of the food item 820 to be displayed on the recommended cooking zone.

However, according to embodiments, the controller 130 may determine the recommended cooking zone of the food item based on the pre-stored arrangement information in the storage 150 without a request for the arrangement information to the server 30. In addition, according to embodiments, the cooking apparatus 20 may also control the heat source 260 based on the pre-stored recipe information in the storage 250 without a request for the recipe information to the server 30.

In response to the plurality of food items, the controller 130 may control the user interface 120 to display an AR image of each of the plurality of food items superimposed on the recommended cooking zone with the image of the cooking apparatus 20. That is, in response to the food item, to be cooked, being provided in plurality, the controller 130 may determine a recommended cooking zone corresponding to each of the plurality of food items, and control the user interface 120 to display the AR image of each of the plurality of food items superimposed on the image of the cooking apparatus 20 so as to allow the AR image of each of the plurality of food items to be displayed on a corresponding recommended cooking zone.

The controller 130 may configure the AR image of the food item 820 in the form of the food item to allow a user to identify the AR image as the food item.

In addition, in response to obtaining the food item information, the controller 130 may determine the recommended cooking zone of the corresponding food item by using the arrangement information of the food item corresponding to the obtained food item information among the arrangement information stored in the storage 150. However, in response to the arrangement information of the food item not being stored, the controller 130 may request the arrangement information on the food item to the server 30, and determine the recommended cooking zone of the food item based on the arrangement information received from the server 30.

For example, in response to an image, which is captured through the imaging device 110, corresponding to the cooking chamber image 800, and in response to obtaining the food item information, such as meat, vegetables, and instant rice, from a user, the terminal device 10 may determine a recommended cooking zone corresponding to each food item based on the arrangement information. Particularly, the controller 130 may determine the first cooking zone 201 as a recommended cooking zone for meat, determine the second cooking zone 202 as a recommended cooking zone for vegetables, and determine the third cooking zone 203 as a recommended cooking zone for instant rice. That is, based on the arrangement information, the controller 130 may determine the first cooking zone 201 that provides a relatively more heat energy, as the recommended cooking zone for meat, determine the second cooking zone 202 that provides a relatively less heat energy, as the recommended cooking zone for vegetables, and determine the third cooking zone 203 that provides a relatively high frequency, as the recommended cooking zone for instant rice.

Thereafter, as illustrated in FIG. 8B, the terminal device 10 may display an AR image of meat 821, an AR image of vegetables 822, and an AR image of instant rice 823 superimposed on a corresponding recommended cooking zone with the cooking chamber image 800. Particularly, the terminal device 10 may display the AR image of meat 821 superimposed on the first cooking zone 201, display the AR image of vegetables 822 superimposed on the second cooking zone 202, and display the AR image of instant rice 823 superimposed on the third cooking zone 203.

That is, by imaging the cooking chamber 23 of the cooking apparatus 20 through the imaging device 110 of the terminal device 10, a user receives the arrangement position of the food item in the cooking chamber 23 in the augmented reality (AR) manner. Accordingly, the user can more intuitively recognize the recommended cooking zones of meat, vegetables, and instant rice to be cooked, and finally, the cooking efficiency of each of meat, vegetables, and instant rice may be increased.

In addition, the controller 130 according to one embodiment may control the user interface 120 to display an AR image representing each of the plurality of cooking zones of the cooking apparatus 20 superimposed on the image of the cooking apparatus 20. As illustrated in FIG. 8B, the terminal device 10 may display a circle icon, including an identification number, representing AR images 801, 802, and 803 representing each of the plurality of cooking zones 201, 202, and 203. However, the AR image representing the cooking zone is not limited to the above example, and a type of an AR image may vary as long as a user can distinguish each cooking zone.

Particularly, the terminal device 10 may display the first AR image 801, representing the first cooking zone 201, superimposed on the first cooking zone 201, display the second AR image 802, representing the second cooking zone 202, superimposed on the second cooking zone 202, and the third AR image 803, representing the third cooking zone 203, superimposed on the third cooking zone 203. Accordingly, a user can more efficiently identify each of the plurality of cooking zones 200.

In addition, the controller 130 according to one embodiment may control the user interface 120 to further display a message 850 guiding the recommended cooking zone of each food item. For example, the terminal device 10 may further display the message 850 for placing meat to the first cooking zone 201, placing vegetables to the second cooking zone 202, and placing instant rice to the third cooking zone 203.

In addition, in response to an image, captured through the imaging device 110, corresponding to a shelf image 900, and in response to obtaining the food item information, such as meat and vegetables, from a user, the terminal device 10 may determine a recommended cooking zone corresponding to each food item based on the arrangement information. Particularly, the controller 130 may determine the first cooking zone 201 as a recommended cooking zone for meat and determine the second cooking zone 202 as a recommended cooking zone for vegetables.

Thereafter, as illustrated in FIG. 8C, the terminal device 10 may display the AR image of meat 821 and the AR image of vegetables 822 superimposed on a corresponding recommended cooking zone with the shelf image 900. Particularly, the terminal device 10 may display the AR image of meat 821 superimposed on the first cooking zone 201, and display the AR image of vegetables 822 superimposed on the second cooking zone 202.

That is, by imaging the shelf 25, which is separated from the cooking chamber 23 and located outside the cooking apparatus 20, through the imaging device 110 of the terminal device 10, a user may receive an arrangement position of the food item in the AR manner. Accordingly, the user can more intuitively recognize the recommended cooking zone of food items to be cooked, and finally, the cooking efficiency of each of food items may be increased.

Further, even when the terminal device 10 images the shelf image 900 through the imaging device 110, the terminal device 10 may further display the AR images 801 and 802 representing the plurality of cooking zones 201 and 202, and further display the message 850 guiding the recommended cooking zone of each of food item according to embodiments, as illustrated in FIG. 8C.

In response to the food item including a plurality of ingredients, the controller 130 may control the user interface 120 to display an AR image of each of the plurality of ingredients superimposed on a corresponding recommended cooking zone with the image of the cooking apparatus 20.

For example, as illustrated in FIG. 8D, in response to a food item corresponding to a steak meal kit including ingredients such as meat, vegetables, and mushrooms, the terminal device 10 may determine the first cooking zone 201 as a recommended cooking zone for meat, the second cooking zone 202 as a recommended cooking zone for vegetables, and the third cooking zone 203 as a recommended cooking zone for mushrooms.

The terminal device 10 may display an AR image of meat 821, an AR image of vegetables 822 and an AR image of mushrooms 823 to be superposed on a corresponding cooking zone with the cooking chamber image 800. Particularly, the terminal device 10 may display the AR image of meat 821 superimposed on the first cooking zone 201, display the AR image of vegetables 822 superimposed on the second cooking zone 202, and the AR image of mushrooms 823 superimposed on the third cooking zone 203.

As mentioned above, in response to a selection of a food item (for example, a meal kit and HMR) including a plurality of ingredients, by a user, the AR image of each of the plurality of ingredients may be displayed superimposed on the corresponding cooking zone. Accordingly, the user can more intuitively recognize the cooking zone and it is possible to efficiently cook the plurality of ingredients of the food item, at one time.

Hereinafter a state, in which the image captured through the imaging device 110 is the cooking chamber image 800, will be described as an example, but the described technical feature may be applied to a state in which an image captured through the imaging device 110 is the shelf image 900.

Figure 9A:
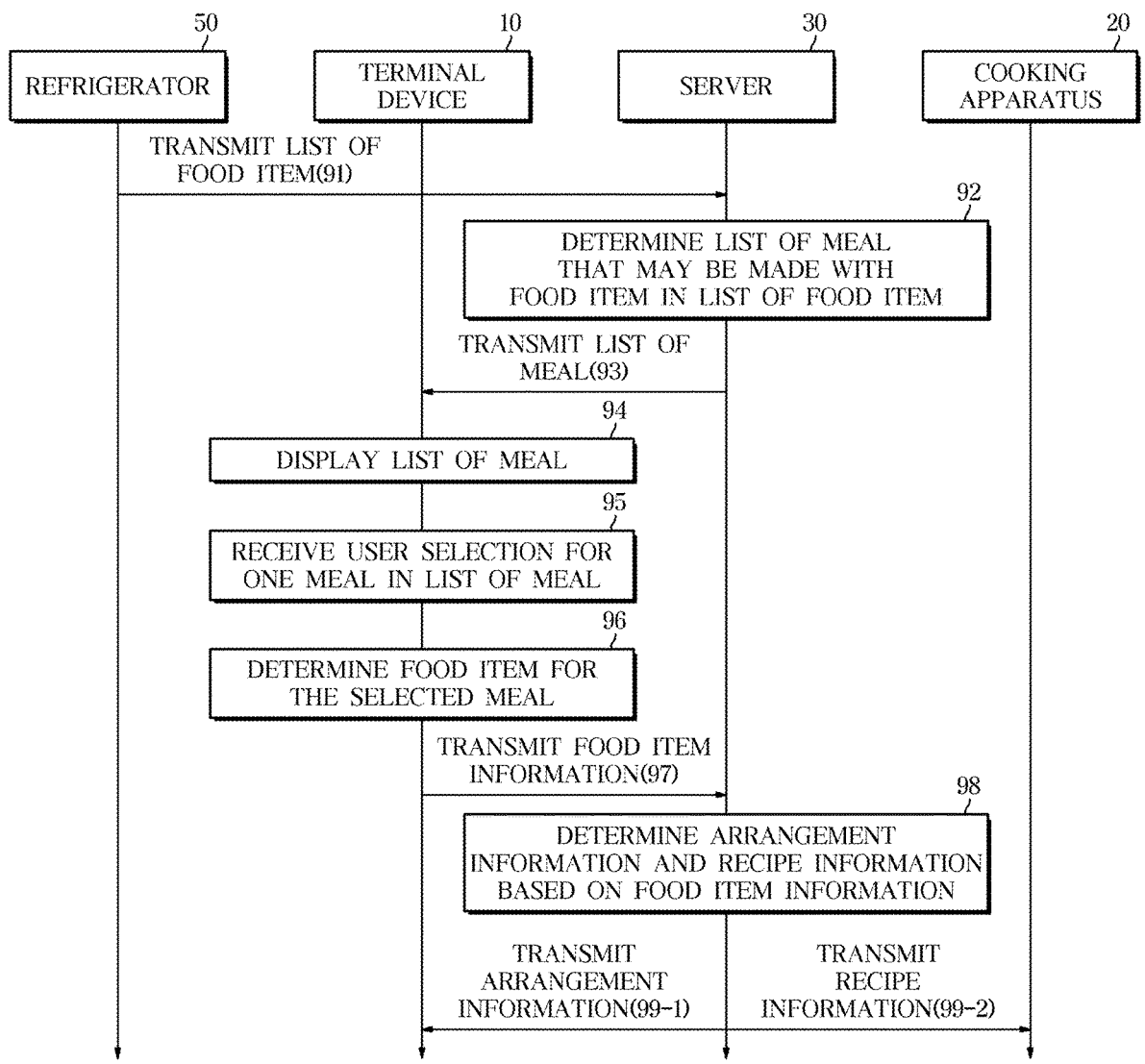
FIG. 9A is a signal flow diagram illustrating a state in which the terminal device according to one embodiment of the present disclosure obtains food item information according to a selection of a meal.

FIG. 9A is a signal flow diagram illustrating a state in which the terminal device according to one embodiment of the present disclosure obtains food item information according to a selection of a meal, and FIG. 9B is a view illustrating a state in which the terminal device according to one embodiment of the present disclosure displays an AR image of a plurality of food items forming a meal with an image of the cooking chamber as a background.

Referring to FIG. 9A, the refrigerator 50 according to one embodiment may transmit a list of food items stored in the storage compartment to the server 30 (step 91). The server 30 may determine a list of meals that are made with the food items in the list (step 92). In this case, the server 30 may determine the list of meals based on table information indicating the correlation between the food item and the meal, or may determine the list of meals using an artificial neural network. Particularly, the server 30 may input the list of food items into the artificial neural network and obtain the list of meals, as output data. In this case, the artificial neural network may use setting meal data, which is according to the food item and received from a plurality of terminal devices or a plurality of cooking apparatus connected to the server 30, as training data. That is, because the artificial neural network is trained by using data, which is set by a user through various devices connected to the server 30, as training data, the artificial neural network may determine the list of meals that are made with the food item.

Thereafter, the server 30 may transmit the list of meals to the terminal device 10 (step 93). The terminal device 10 may display the list of meals (step 94), receive a user selection for a meal in the list of meals (step 95), and determine a food item for the selected meal (step 96), thereby obtaining information on the food item. In this case, the terminal device 10 may determine the food item required to make the meal using table information indicating the correlation between the food item and the meal, and according embodiments, the terminal device 10 may receive information on the food item that is required to make the meal, from the server 30.

However, according to embodiments, the terminal device 10 may directly receive a meal from a user through the inputter 121, and may obtain the food item information by determining the food item required to make the selected meal.

The terminal device 10 according to one embodiment may transmit the food item information to the server 30 (step 97). The server 30 may determine arrangement information and recipe information based on the food item information (step 98), and transmit the arrangement information to the terminal device 10 (step 99-1), and transmit the recipe information to the cooking apparatus 20 (step 99-2).

In this case, the server 30 may store the correlation between the food item and the recommended cooking zone as table information, and determine the arrangement information corresponding to the food item information. Further, the server 30 may store the correlation between the food item and the recipe as table information and determine the recipe information corresponding to the food item information.

However, according to embodiments, the server 30 may determine the arrangement information and the recipe information using an artificial neural network. Particularly, the server 30 may input the food item information into the artificial neural network and obtain the arrangement information and the recipe information as output data. In this case, the artificial neural network may use cooking zone setting data according to the food item and recipe setting data according to the food item, which are received from a plurality of terminal devices or a plurality of cooking apparatus connected to the server 30, as training data. That is, because the artificial neural network is trained by using data, which is set by a user through various devices connected to the server 30, as training data, the artificial neural network may determine the arrangement information and the recipe information optimized for the food item.

Thereafter, the controller 130 may determine a recommended cooking zone of the food item based on the arrangement information, and control the user interface 120 to display an AR image of the food item superimposed on a recommended cooking zone among the plurality of cooking zones 200 of the cooking apparatus 20 (88). In this case, the cooking apparatus 20 may control the heat source 260 to heat the recommended cooking zone based on the recipe information.

That is, in response to obtaining the food item information, to be cooked, the controller 130 may determine a recommended cooking zone corresponding to the food item among the plurality of cooking zones 200 of the cooking apparatus 20, and control the user interface 120 to display the AR image of the food item 820 superimposed on the image of the cooking apparatus 20 so as to allow the AR image of the food item 820 to be displayed on the recommended cooking zone.

However, according to embodiments, the controller 130 may determine the recommended cooking zone of the food item based on the pre-stored arrangement information in the storage 150 without a request for the arrangement information to the server 30. In addition, according to embodiments, the cooking apparatus 20 may also control the heat source 260 based on the pre-stored recipe information in the storage 250 without a request for the recipe information to the server 30.

For example, as illustrated in FIG. 9B, in response to the meal selected by a user, corresponding to a steak, the terminal device 10 may determine meat, vegetables, and mushrooms as food items for the steak, and display an AR image of each of the food items superimposed on a corresponding recommended cooking zone with the image of the cooking apparatus 20. That is, based on the arrangement information, the terminal device 10 may determine the first cooking zone 201 as a recommended cooking zone for meat, the second cooking zone 202 as a recommended cooking zone for vegetables, and the third cooking zone 203 as a recommended cooking zone for mushrooms.

The terminal device 10 may display an AR image of meat 821, an AR image of vegetables 822 and an AR image of mushrooms 823 to be superposed on a corresponding cooking zone with the cooking chamber image 800. Particularly, the terminal device 10 may display the AR image of meat 821 superimposed on the first cooking zone 201, display the AR image of vegetables 822 superimposed on the second cooking zone 202, and the AR image of mushrooms 823 superimposed on the third cooking zone 203.

As mentioned above, the terminal device 10 may receive the list of meals, which are made with the stored food item, from the server 30. In response to a selection of a meal to be made, the terminal device 10 may display an AR image of each of the food items, which are required to make the meal, superimposed on the recommended cooking zone. Therefore, a user can more intuitively recognize the cooking zone and efficiently cook the plurality of food items at once, thereby easily making the meal.

Figure 10:
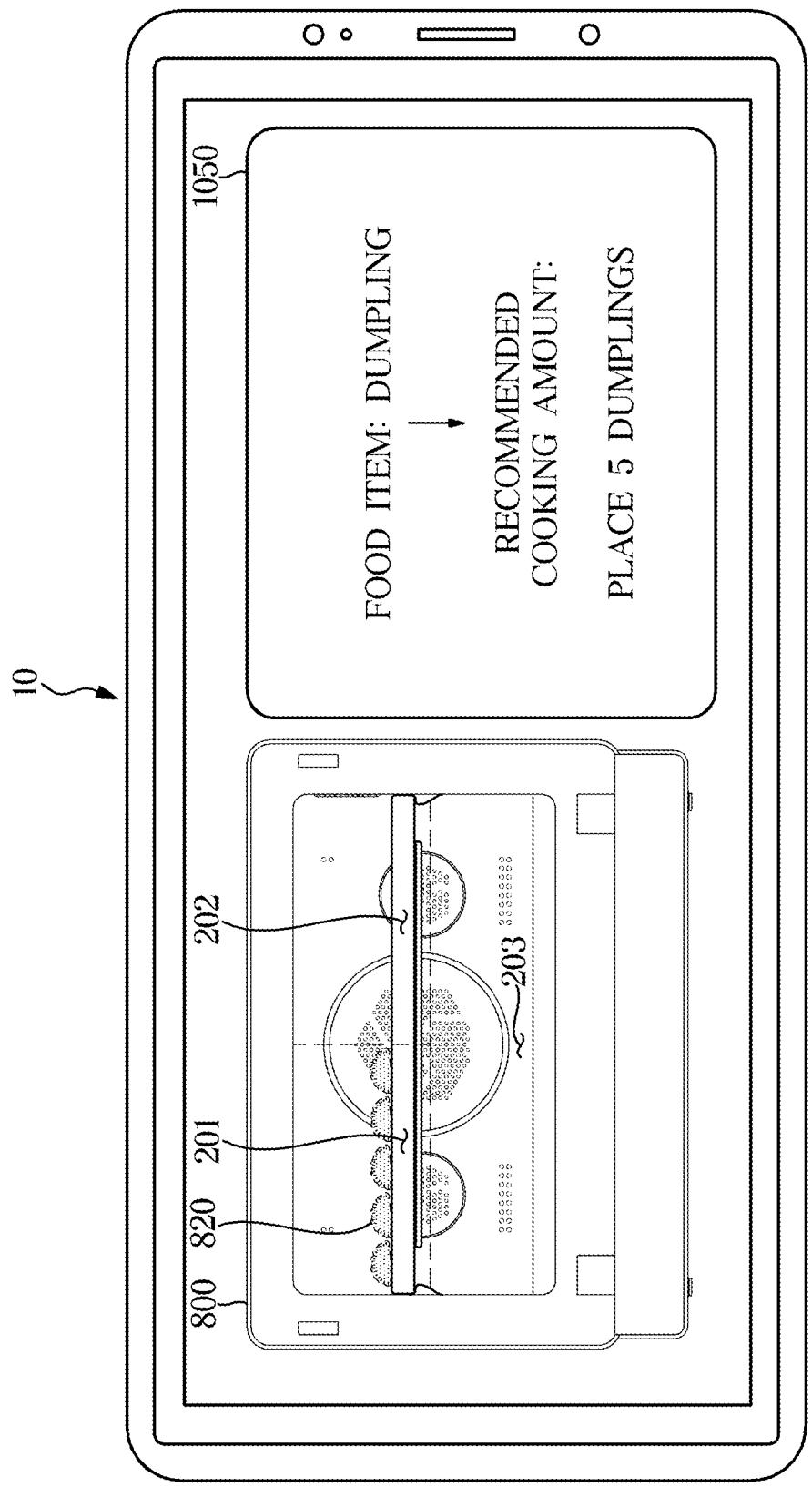
FIG. 10 is a view illustrating a state in which the terminal device according to one embodiment of the present disclosure determines an AR image of a food item to display a cooking amount.

FIG. 10 is a view illustrating a state in which the terminal device 10 according to one embodiment of the present disclosure determines an AR image of a food item 820 to display a cooking amount.

Referring to FIG. 10, the controller 130 according to one embodiment may determine an AR image of food item 820 to display a recommended cooking amount of the food item. Particularly, the controller 130 may determine the AR image of the food item 820 to include the number or quantity of the food item corresponding to the recommended cooking amount.

In this case, the recommended cooking amount is a recommended cooking amount based on a single operation of the cooking apparatus 20, and may be determined in consideration of the specific heat of each food item and a total amount of thermal energy provided by the cooking apparatus 20.

For example, as illustrated in FIG. 10, in response to obtaining food item information, such as dumplings, from a user, the terminal device 10 may determine a recommended cooking amount of dumplings as five pieces based on the arrangement information, and determine an AR image, including five dumplings corresponding to the recommended cooking amount, and display the AR image on a recommended cooking zone.

In this case, the terminal device 10 may use information on the correlation between the food item and the recommended cooking amount among the arrangement information stored in the storage 150, and in response to the recommended cooking amount of the corresponding food item not being stored, the terminal device 10 may transmit a request for the corresponding information to the server 30.

Further, according to embodiments, the controller 130 may control the user interface 120 to further display a message 1050 guiding the recommended cooking amount. For example, as illustrated in FIG. 10, the terminal device 10 may further display the message 1050 guiding to arrange five dumplings.

That is, in response to the instant food, such as a meal kit or HMR, corresponding to the food item to be cooked, the terminal device 10 may intuitively inform a user of a recommended amount of food item to be cooked at once, through the AR image. In other words, the user can image the cooking apparatus 20 through the imaging device 110 of the terminal device 10 so as to receive an AR image indicating the amount of food item to be cooked once. Accordingly, the user can intuitively recognize the recommended amount of food item and finally, the cooking efficiency of the food item may be increased.

FIG. 11A is a view illustrating a state in which the terminal device 10 according to one embodiment of the present disclosure determines an AR image of a food item 820 to display an arrangement form, and FIG. 11B is a view illustrating a state in which the terminal device 10 according to one embodiment of the present disclosure enlarges and displays an AR image of a food item.

Referring to FIG. 11A, the controller 130 according to one embodiment may determine an AR image of a food item to display a recommended arrangement form of the food item. Particularly, the controller 130 may determine a shape of the food item to correspond to the recommended arrangement form, and determine the AR image of the food item to include the determined shape of the food item.

For example, as illustrated in FIG. 11A, in response to obtaining food item information, such as a fish, from a user, the terminal device 10 may determine a shape, in which a head of the fish faces a wall of the cooking chamber, as a recommended arrangement form of the fish based on the arrangement information, and determine the shape, in which the head faces the wall of the cooking chamber, as an AR image of the fish 820. That is, the terminal device 10 may determine the shape, in which the head faces the wall of the cooking chamber, as the AR image of the fish 820 so as to allow a body of the fish to be arranged at a center of the cooking chamber 23 in which a thermal energy is transmitted more efficiently. The terminal device 10 may display the determined AR image of the fish 820 superimposed on the cooking chamber image 800.

As another example, in response to obtaining food item information, such as a dumpling, from a user, the terminal device 10 may determine a shape, in which a flat bottom surface of the dumpling faces the bottom of the cooking zone, as the arrangement form, and determine the shape, in which the flat bottom surface faces the bottom of the cooking zone, as an AR image of the dumpling 820.

In this case, the terminal device 10 may use information on the correlation between the food item and the recommended arrangement form among the arrangement information stored in the storage 150, and in response to the recommended arrangement form of the corresponding food item not being stored, the terminal device 10 may transmit a request for the corresponding information to the server 30, and receive the corresponding information.

Further, according to embodiments, the controller 130 may control the user interface 120 to further display a message 1110 guiding the recommended arrangement form. For example, as illustrated in FIG. 11A, the terminal device 10 may further display the message 1110 guiding to arrange the head of the fish to face the wall of the cooking chamber 23.

As mentioned above, the terminal device 10 may determine the arrangement form with a high cooking efficiency, as the AR image 820 of the food item and display the determined AR image 820 superimposed on the cooking chamber image 800. Accordingly, a user can more intuitively recognize the recommended arrangement form of the food item, and finally, the cooking efficiency of the food item may be increased.

In addition, the terminal device 10 may control the user interface 120 to enlarge and display the AR image 820 of the food item based on the image, captured by the imaging device 110, corresponding to an image of the recommended cooking zone.

For example, in response to the first cooking zone 201, which corresponds to the recommended cooking zone of the fish, being captured through the terminal device 10 by a user, the terminal device 10 may display an image of the first cooking zone 201, as illustrated in FIG. 11B. In this case, the terminal device 10 may control the user interface 120 to display the AR image of the fish 820, which is in the image that is captured through the imaging device 110, to be enlarged in comparison with an image of an entire cooking zone.

That is, in response to a specific cooking zone being captured through the imaging device 110 by a user, the terminal device 10 may enlarge and display the AR image of the food item corresponding to the specific cooking zone. Accordingly, the user can more clearly recognize what food item is to be located in the corresponding cooking zone.

Further, according to embodiments, in response to a specific cooking zone being captured by a user, the terminal device 10 may further display a message 1130 indicating detailed information on a food item corresponding to the specific cooking zone. That is, the terminal device 10 may display detailed information on the food item corresponding to the recommended cooking zone based on the image, which is captured by the imaging device 110, corresponding to an image of the recommended cooking zone.

For example, in response to the first cooking zone 201 being captured by a user, the terminal device 10 may further display a message 1130 indicating the detailed information of the fish corresponding to the first cooking zone 201, as illustrated in FIG. 11B. In this case, the message 1130 indicating the detailed information of the food item may include at least one of calories of the food item, an image before cooking the food item, an image after cooking the food item, and a recipe of the food item.

As mentioned above, in response to obtaining the food item information, the terminal device 10 may provide an optimal arrangement position for cooking the food item among the plurality of cooking zones of the cooking apparatus 20, as an AR image of the food item, and further provide the cooking amount of the food item or the arrangement form of the food item, as an AR image. According to embodiments, on the display 222, the cooking apparatus 20 may display an AR image of the food item 820 superimposed on the image of the cooking chamber 23 obtained through the imaging device 210.

Hereinafter one embodiment, in which information, for increasing a cooking efficiency in relation to cooking of a food item, is provided to a user, will be described in detail.

Figure 12:
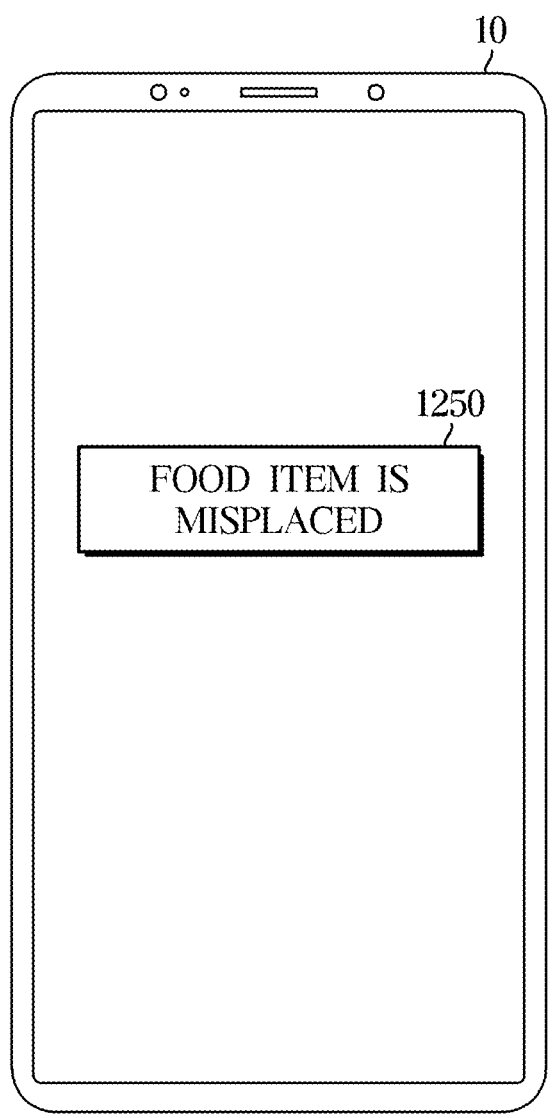
FIG. 12 is a view illustrating a state in which the terminal device according to one embodiment of the present disclosure outputs a notification regarding the arrangement of food item.
Figure 13:
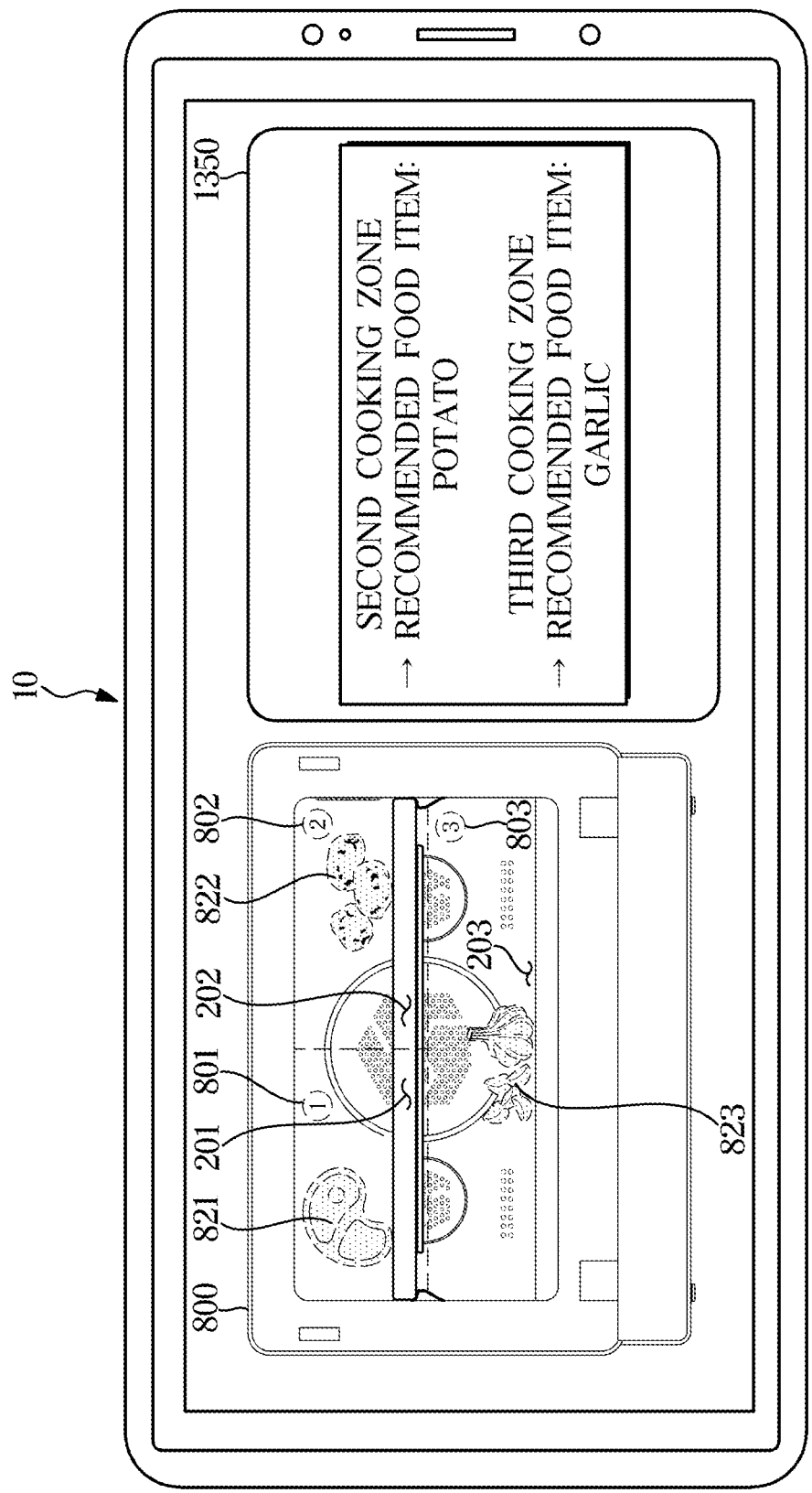
FIG. 13 is a view illustrating a state in which the terminal device according to one embodiment of the present disclosure displays a recommended food item that may be cooked simultaneously with the food item.
Figure 14A:
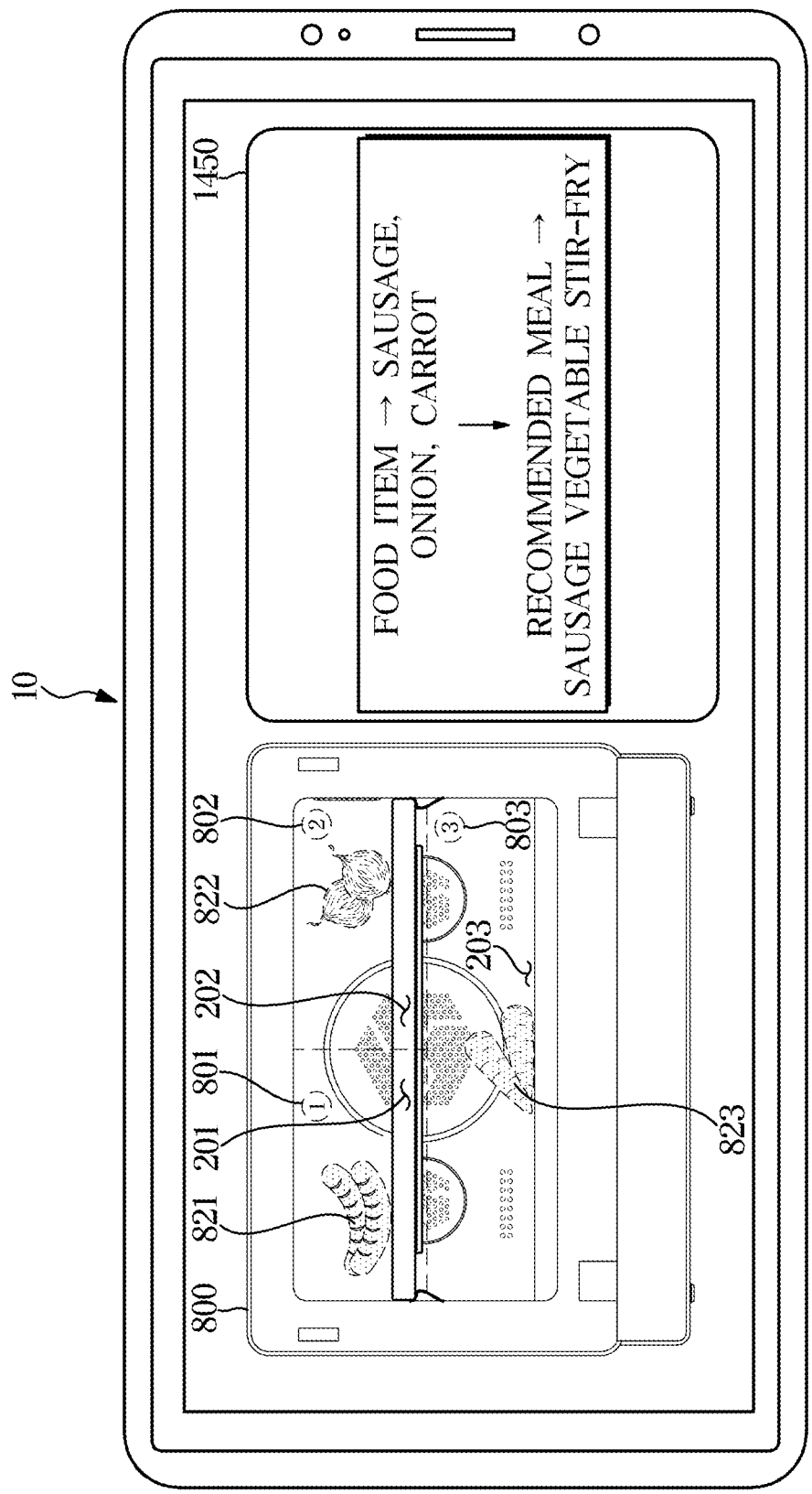
FIGS. 14A and 14B are views illustrating a state in which the terminal device according to one embodiment of the present disclosure displays a recommended meal using the food item.
Figure 14B:
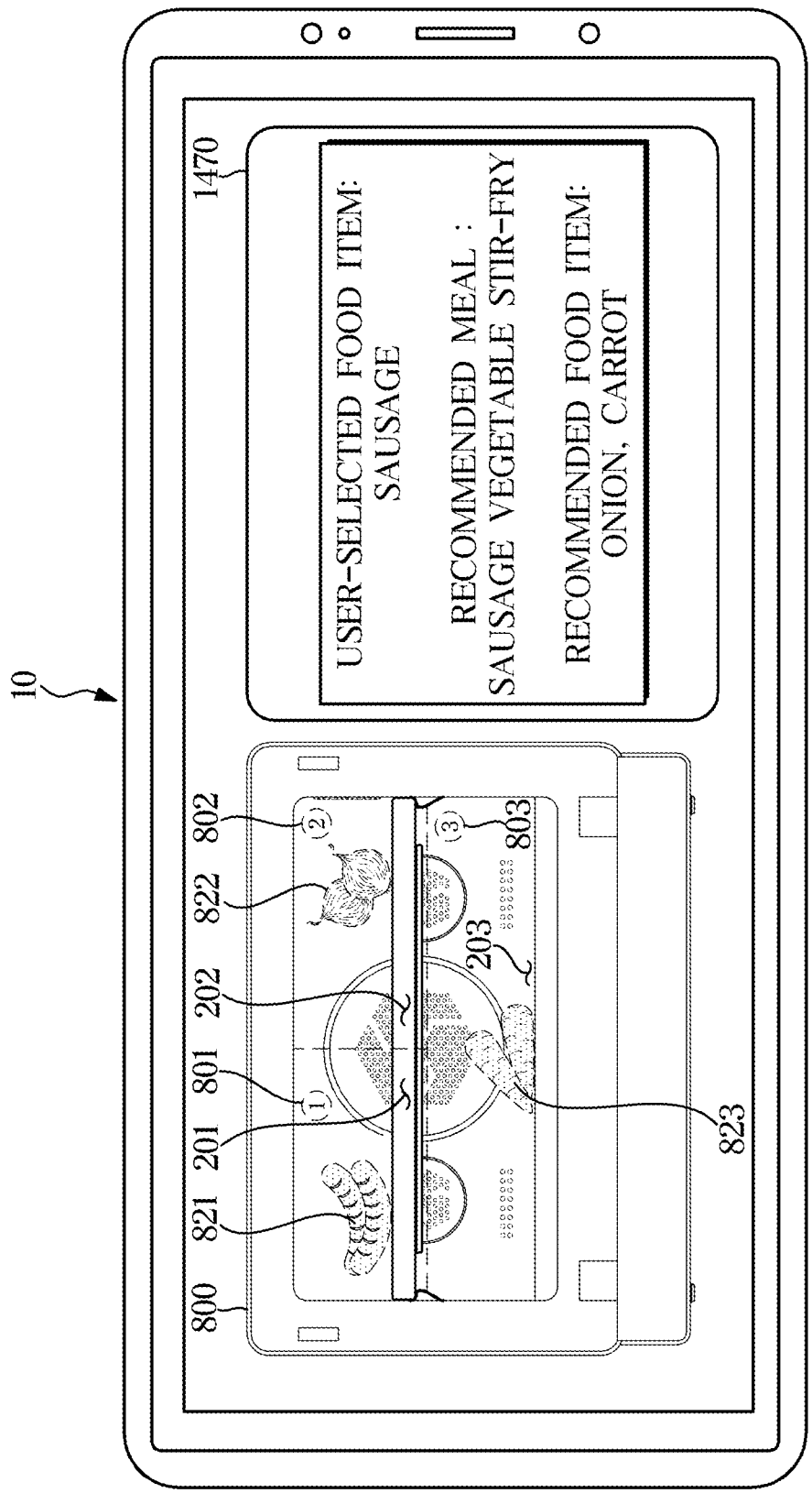

FIG. 12 is a view illustrating a state in which the terminal device 10 according to one embodiment of the present disclosure outputs a notification regarding the arrangement of food item, FIG. 13 is a view illustrating a state in which the terminal device 10 according to one embodiment of the present disclosure displays a recommended food item that may be cooked simultaneously with the food item, and FIGS. 14A and 14B are views illustrating a state in which the terminal device 10 according to one embodiment of the present disclosure displays a recommended meal using the food item.

Referring to FIG. 12, the controller 130 according to one embodiment may control the user interface 120 to output a notification in response to a food item being arranged in a cooking zone other than the recommended cooking zone.

According to embodiments, the controller 130 may determine whether the food item is arranged in the recommended cooking zone or not, based on the image processing on the cooking chamber image 800 obtained by the imaging device 110.

Further, according to embodiments, the controller 130 may receive information, indicating whether the food item is arranged in the recommended cooking zone, from the cooking apparatus 20 and determine whether the food item is arranged in the recommended cooking zone. In this case, the cooking apparatus 20 may obtain information indicating whether the food item is arranged in the recommended cooking zone, based on the processing of the image of the cooking chamber 23 obtained from the imaging device 210.

According to embodiments, the terminal device 10 may obtain the cooking chamber image 800 obtained from the imaging device 210 of the cooking apparatus 20 and process the cooking chamber image 800, thereby determining whether the food item is arranged in the recommended cooking zone.

In response to the food item being arranged in a cooking zone other than the recommended cooking zone, the terminal device 10 according to one embodiment may output a notification informing that the food item is misplaced.

For example, as illustrated in FIG. 12, the terminal device 10 may control the display 122 to display a message 1250 informing that the food item is misplaced. However, the type of notification may include an icon in addition to the message, and the type of notification may vary as long as the type of notification may notify that the food item is misplaced.

Further, according to embodiments, the terminal device 10 may control the speaker 123 to output a sound notification indicating that the food item is misplaced.

Accordingly, a user may intuitively recognize that the food item is not placed in the recommended cooking zone, and by placing the food item to the recommended cooking zone, the cooking efficiency of the food item may be increased.

In this case, in response to the food item being arranged in the recommended cooking zone, the cooking apparatus 20 may control at least one heat source 260 corresponding to the recommended cooking zone to heat the recommended cooking zone based on the recipe for the food item.

In the same manner as the terminal device 10, the cooking apparatus 20 may also control the user interface 220 to output a notification in response to the food item not being arranged in the recommended cooking zone.

According to embodiments, in response to the food item being arranged in a cooking zone other than the recommended cooking zone, the cooking apparatus 20 control at least one of the plurality of heat sources 260 to heat the cooking zone, in which the food item is placed, based on the recipe corresponding to the food item.

Referring to FIG. 13, in response to obtaining food item information from a user, the controller 130 according to one embodiment may determine a recommended food item that may be cooked in a cooking zone other than a recommended cooking zone, and control the user interface 120 to display the recommended food item.

Particularly, the controller 130 may obtain the food item information and determine a recommended cooking zone for the obtained food item. In response to a cooking zone being present other than the recommended cooking zone among the plurality of cooking zones, the controller 130 may determine a recommended food item that may be cooked simultaneously with the obtained food item in the cooking zone other than the recommended cooking zone, and control the user interface 120 to display the recommended food item.

In this case, according to embodiments, the recommended food item may be a food highly related to the food item to be cooked, and information on the relation between the food item and the recommended food item may be stored in the storage 150. For example, the recommended food item may be a food that is often cooked simultaneously with the food item or a food that is often added simultaneously with the food item to one meal menu. The information on the relation between the food item and the recommended food item may be set by a user through the inputter 121 or updated based on information received from the server 30.

For example, in response to obtaining food item information, such as meat, from a user, the terminal device 10 may determine the first cooking zone 201 as a recommended cooking zone for meat. In this case, as illustrated in FIG. 13, the terminal device 10 may determine a potato and a garlic as a recommended food item that is placed in each of the second cooking zone 202 and the third cooking zone 203 excluding the first cooking zone 201 among the plurality of cooking zones 200, and display a message 1350 indicating that the recommended food item (potato) in the second cooking zone 202 and the recommended food item (garlic) in the third cooking zone 203 on the display 122. Further, the terminal device 10 may control the speaker 123 to output a voice guiding the recommended food item.

Further, according to embodiments, the terminal device 10 may control the user interface 120 to display the AR image of the recommended food item superimposed on the corresponding cooking zone with the image of the cooking apparatus 20. That is, as illustrated in FIG. 13, the terminal device 10 may display an AR image of meat 821 superimposed on the first cooking zone 201, an AR image of potato 822 superimposed on the second cooking zone 202, and an AR image of garlic 823 superimposed on the third cooking zone 203.

Accordingly, a user can intuitively recognize the food item that may be simultaneously cooked with the food item to be cooked, and by cooking the food item and the recommended food item at the same time, it is possible to reduce the cooking time while improving the completeness of the meal.

In the same manner as the terminal device 10, the cooking apparatus 20 may determine a recommended food item and control the user interface 220 to output the recommended food item.

Referring to FIGS. 14A and 14B, in response to obtaining food item information from a user, the controller 130 according to one embodiment may determine a recommended meal that uses the food item as an ingredient, and control the user interface 120 to display the recommended meal.

Particularly, according to embodiments, the controller 130 may determine a recommended meal corresponding to the food item based on pre-stored information on the correlation between the food item and the recommended meal. Further, according to embodiments, the controller 130 may determine the recommended meal corresponding to the food item based on the information on the correlation between the food item and the recommended meal received from the server 30. In this case, the server 30 may determine the recommended meal based on the table information indicating the correlation between the food item and the meal or determine the recommended meal using an artificial neural network. Particularly, the server 30 may input the food item information into the artificial neural network and obtain the recommended meal as output data. In this case, the artificial neural network may use setting meal data, which is according to the food item and received from a plurality of terminal devices or a plurality of cooking apparatus connected to the server 30, as training data. That is, because the artificial neural network is trained by using data, which is set by a user through various devices connected to the server 30, as training data, the artificial neural network may determine the recommended meal that is made with the food item.

Thereafter, the controller 130 may control the user interface 120 to output the determined recommended meal. That is, the controller 130 may control the display 122 to display the determined recommended meal, and may control the speaker 123 to output the determined recommended meal by voice.

For example, as illustrated in FIG. 14A, in response to obtaining food item information, such as sausage, onion, and carrot, the terminal device 10 may determine a sausage vegetable stir-fry as the recommended meal, and display a message 1450 indicating that the sausage vegetable stir-fry is the recommended meal, on the display 122.

Further, based on the arrangement information, the terminal device 10 may display an AR image of each of the plurality of food items superimposed on a corresponding recommended cooking zone with the image of the cooking apparatus 20. That is, the terminal device 10 may determine the first cooking zone 201 as a recommended cooking zone for sausage, the second cooking zone 202 as a recommended cooking zone for onions, and the third cooking zone 203 as a recommended cooking zone for carrots.

Thereafter, the terminal device 10 may display an AR image of sausage 821, an AR image of onion 822, and an AR image of carrot 823 superimposed on each corresponding cooking zone with the cooking chamber image 800. Particularly, the terminal device 10 may display the AR image of sausage 821 superimposed on the first cooking zone 201, the AR image of onion 822 superimposed on the second cooking zone 202, and the AR image of carrot 823 superimposed on the third cooking zone 203.

In addition, in response to obtaining the food item information, the terminal device 10 may determine other food item that is required for the recommended meal while determining the recommended meal that is made with the food item, and the terminal device 10 may display an AR image of other food item superimposed on a corresponding cooking zone with the image of the cooking apparatus 20.

For example, as illustrated in FIG. 14B, in response to a food item, which is selected by a user, corresponding to a sausage, the terminal device 10 may determine a sausage vegetable stir-fry as a recommended meal, and determine an onion and a carrot as the recommended food item that is required for making the sausage vegetable stir-fry.

The terminal device 10 may display a message 1470 including a user-selected food item, a recommended meal, and a recommended food item required for the recommended meal, and may display an AR image of each of the user-selected food item and the recommended food item superimposed on a corresponding cooking zone with the image of the cooking apparatus 20.

That is, the terminal device 10 may display the AR image of sausage 821, the AR image of onion 822, and the AR image of carrot 823 superimposed on each corresponding cooking zone with the cooking chamber image 800. Particularly, the terminal device 10 may display the AR image of sausage 821 superimposed on the first cooking zone 201, the AR image of onion 822 superimposed on the second cooking zone 202, and the AR image of carrot 823 superimposed on the third cooking zone 203.

In this case, the terminal device 10 may determine a food item required for the meal based on the table information indicating the correlation between the food item and the meal or according to embodiments, may receive information on the food item required for the meal, from the server 30.

The server 30 may determine the food item required for making the meal, based on the table information indicating the correlation between the food item and the meal or determine the food item required for making the meal using an artificial neural network. Particularly, the server 30 may input the meal information into the artificial neural network and obtain information on the food item required for the meal, as output data. In this case, the artificial neural network may use setting meal data according to the food item, which is received from a plurality of terminal devices or a plurality of cooking apparatus connected to the server 30, as training data. That is, because the artificial neural network is trained by using data, which is set by a user through various devices connected to the server 30, as training data, the artificial neural network may determine the information on the food item required for making the meal.

Accordingly, a user can intuitively recognize a menu that may be completed with the food item to be cooked, and can experience a fresh menu by being provided with a more diverse menu.

In the same manner as the terminal device 10, the cooking apparatus 20 may determine the recommended meal and control the user interface 220 to output the recommended meal.

Hereinafter one embodiment of the cooking apparatus 20 for guiding an arrangement position of a food item will be described.

Figure 15:
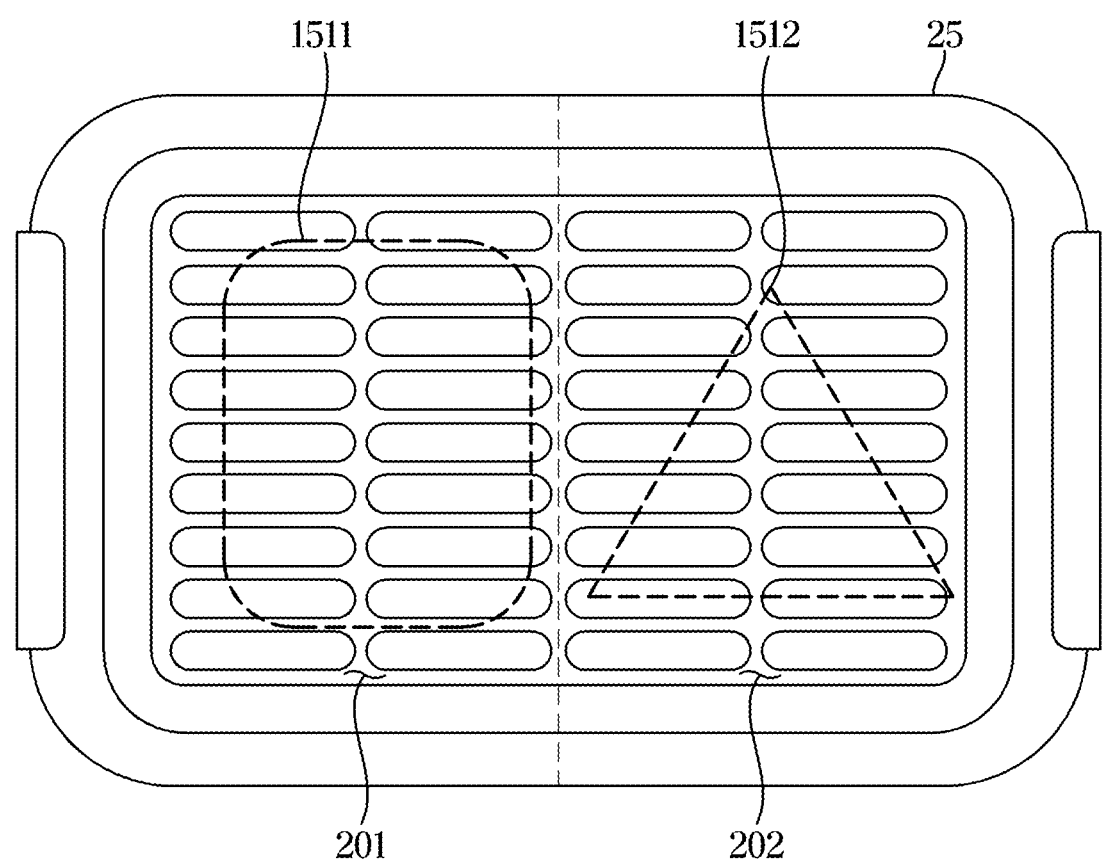
FIG. 15 is a view illustrating a state in which the cooking apparatus according to one embodiment of the present disclosure displays an arrangement position of a food item.

FIG. 15 is a view illustrating a state in which the cooking apparatus 20 according to one embodiment of the present disclosure displays an arrangement position of a food item.

Referring to FIG. 15, in response to obtaining the food item information, the controller 230 according to one embodiment may control the light emitter 270 to emit light to a recommended cooking zone among the plurality of cooking zones 200 of the cooking apparatus 20.

According to embodiments, the controller 230 may obtain the food item information based on a user input inputted through the inputter 221, and according to embodiments, the controller 230 may obtain the food item information by receiving the food item information from the terminal device 10.

Further, according to embodiments, the controller 230 may process the image of the cooking chamber 23 obtained through the imaging device 210 so as to identify a food item located in the cooking chamber 23, and to obtain information on the food item.

in response to obtaining the food item information, to be cooked, the controller 230 may determine a recommended cooking zone corresponding to the food item among the plurality of cooking zones 200 based on the arrangement information, and control the light emitter 270 to emit light to the recommended cooking zone.

A shape of light that is emitted to the cooking zone may be provided in a shape provided to identify the cooking zone, such as a figure of a predetermined shape or a number indicating the number of the cooking zone, according to embodiments.

The controller 230 may determine the recommended cooking zone corresponding to the food item based on the arrangement information stored in the storage 250 or the controller 230 may determine the recommended cooking zone corresponding to the food item based on the arrangement information received from the server 30.

As mentioned above, by displaying the recommended cooking zone of the food item through light emission, the cooking apparatus 20 may guide a user to more intuitively arrange the food item.

In addition, in response to the food item being provided in plurality, the controller 230 may control the light emitter 270 to emit light having a different shape for each recommended cooking zone of each of the plurality of food items. That is, in response to the plurality of food items to be cooked, the controller 230 may determine a recommended cooking zone corresponding to each of the plurality of food items, and control the light emitter 270 to emit light having a different shape for each recommended cooking zone corresponding to each of the plurality of food items.

For example, as illustrated in FIG. 15, in response to the each of the first cooking zone 201 and the second cooking zone 202 being determined as a recommended cooking zone for different food items, the cooking apparatus 20 may control the light emitter 270 to emit light 1511 in a rectangular shape to the first cooking zone 201 and to emit light 1512 in a triangular shape to the second cooking zone 202.

According to embodiments, the controller 230 may control the light emitter 270 to emit light in a shape of a food item corresponding to each recommended cooking zone.

Accordingly, a user can intuitively recognize the plurality of recommended cooking zones, and the user can place a food item to the plurality of recommended cooking zones, thereby increasing the cooking efficiency.

According to embodiments, in response to obtaining the food item information, the controller 230 may transmit a notification requesting for imaging the cooking apparatus 20 by the terminal device 10, to the terminal device 10. According to embodiments, in response to obtaining the food item information, the controller 230 may control the user interface 220 to display a notification requesting for imaging the cooking apparatus 20 by the terminal device 10.

Accordingly, a user can receive an AR image of the food item by imaging the cooking apparatus 20 through the terminal device 10, and place the food item to the recommended cooking zone, thereby increasing the cooking efficiency.

Figure 16:
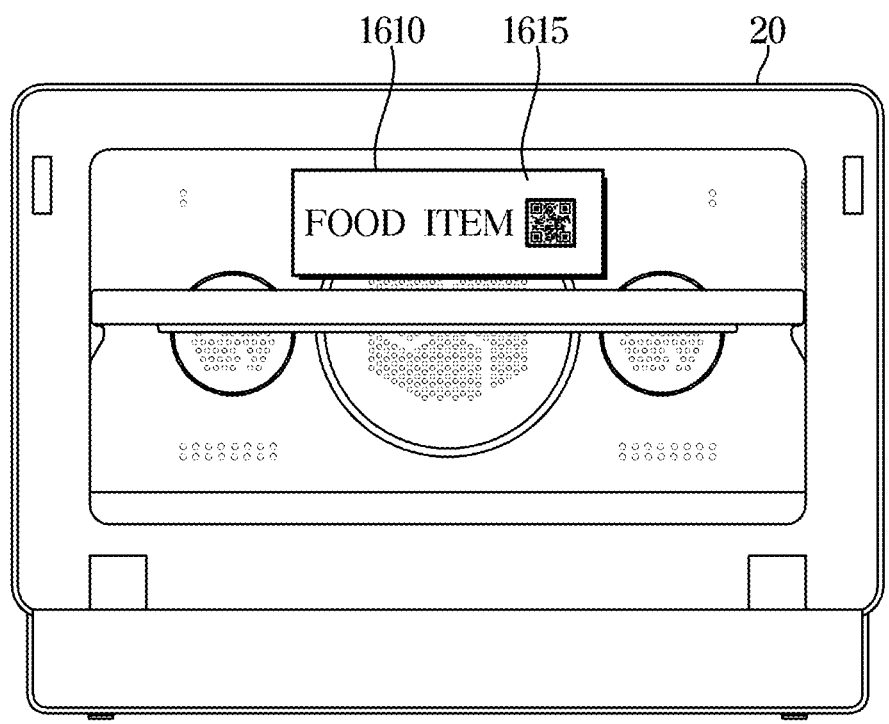
FIG. 16 is a view illustrating a state in which the cooking apparatus according to one embodiment of the present disclosure determines a recipe through an identifier of a food item.
Figure 17:
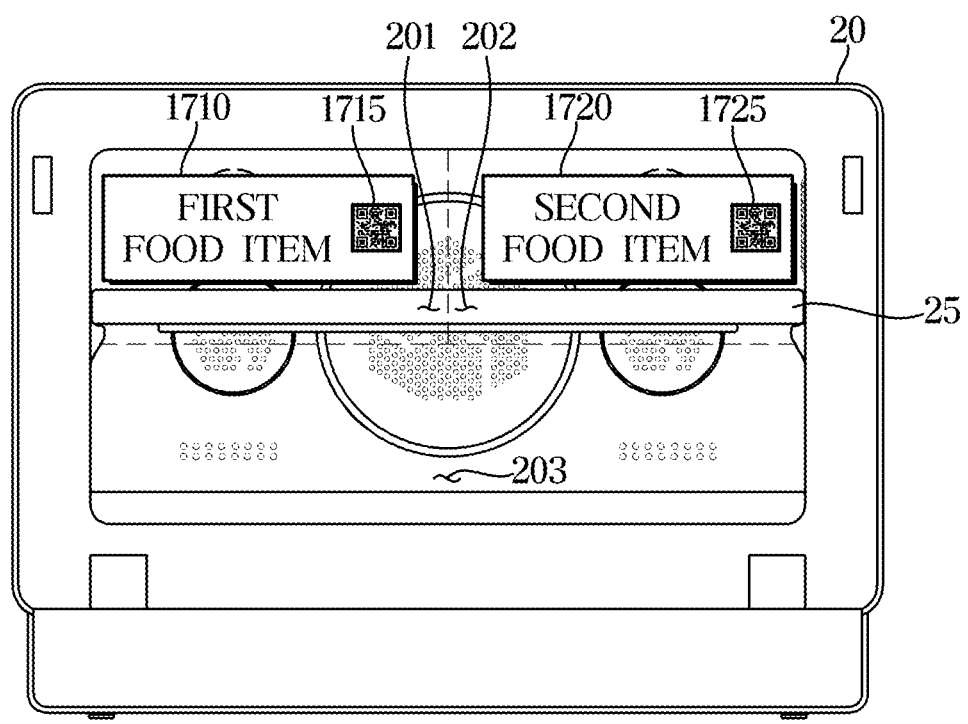
FIG. 17 is a view illustrating a state in which the cooking apparatus according to one embodiment of the present disclosure determines a recipe for a plurality of food items.

FIG. 16 is a view illustrating a state in which the cooking apparatus 20 according to one embodiment of the present disclosure determines a recipe through an identifier of a food item, and FIG. 17 is a view illustrating a state in which the cooking apparatus 20 according to one embodiment of the present disclosure determines a recipe for a plurality of food items.

Referring to FIG. 16, in response to a food item 1610 being arranged in a recommended cooking zone, the controller 230 according to one embodiment may control at least one of the plurality of heat sources 260 to heat the recommended cooking zone based on a recipe corresponding to the food item 1610.

In this case, the recipe may include information on a cooking temperature and a cooking time corresponding to the food item. In other words, the recipe may include at least one of a cooking temperature, a cooking time, or an output of the heat source 260 as a cooking parameter for the operation of the heat source 260. In this case, as for the recipe, information on the recipe for each food item may be pre-stored in the storage 250. Further, the recipe to be applied to each cooking zone may be determined based on a user input.

The controller 230 according to one embodiment may identify the food item 1610 based on the image processing of the image of the cooking chamber 23 obtained through the imaging device 210, and may determine a recipe for the food item 1610.

Particularly, the controller 230 may identify the food item 1610 based on an image of an identifier 1615 of the food item 1610 that is included in the image of the cooking chamber 23 and determine the recipe for the food item 1610. In this case, the identifier 1615 of the food item 1610 may be displayed on a container of the food item 1610, and may be provided as a QR code, a barcode, an icon, or the like. In response to the recipe, corresponding to the identified food item 1610, being stored, the controller 230 may control the heat source 260 based on the stored recipe or the controller 230 may control the heat source 260 by receiving the recipe, corresponding to the identified food item 1610, from the server 30.

Referring to FIG. 17, in response to a plurality of food items, the controller 230 according to one embodiment may identify each of the plurality of food items 1710 and 1720 based on an image of an identifier 1715 and 1725 of each of the plurality of food items 1710 and 1720 and determine a recipe for each of the plurality of food items 1710 and 1720.

In this case, the controller 230 may determine the recipe for each recommended cooking zone of the plurality of food items 1710 and 1720 based on the recipe for each of the plurality of food items 1710 and 1720.

For example, the controller 230 may change at least one of a cooking time or a cooking temperature included in each of a first recipe of the first food item 1710 and a second recipe of the second food item 1720, and determine the changed first recipe as a recipe of the first cooking zone 201 corresponding a recommended cooking zone of the first food item 1710, and determine the changed second recipe as a recipe of the second cooking zone 202 corresponding a recommended cooking zone of the second food item 1720.

The change of the first recipe may be performed according to the second recipe that is selected about other cooking zone, and the storage 250 may store at least one of program, algorithm or application configured to perform change or modification of a recipe that is performed in response to the plurality of food items.

Thereafter, the controller 230 may control at least one of the plurality of heat sources 260 to heat each recommended cooking zone based on the determined recipe for each recommended cooking zone.

Hereinafter one embodiment of a control method of the terminal device 10 and the cooking apparatus 20 according to an aspect will be described. The terminal device 10 and the cooking apparatus 20 according to the above-described embodiment may be used for the control method of the terminal device 10 and the cooking apparatus 20. Accordingly, the contents described above with reference to FIGS. 1 to 17 may be equally applied to the control method of the terminal device 10 and the cooking apparatus 20.

Figure 18:
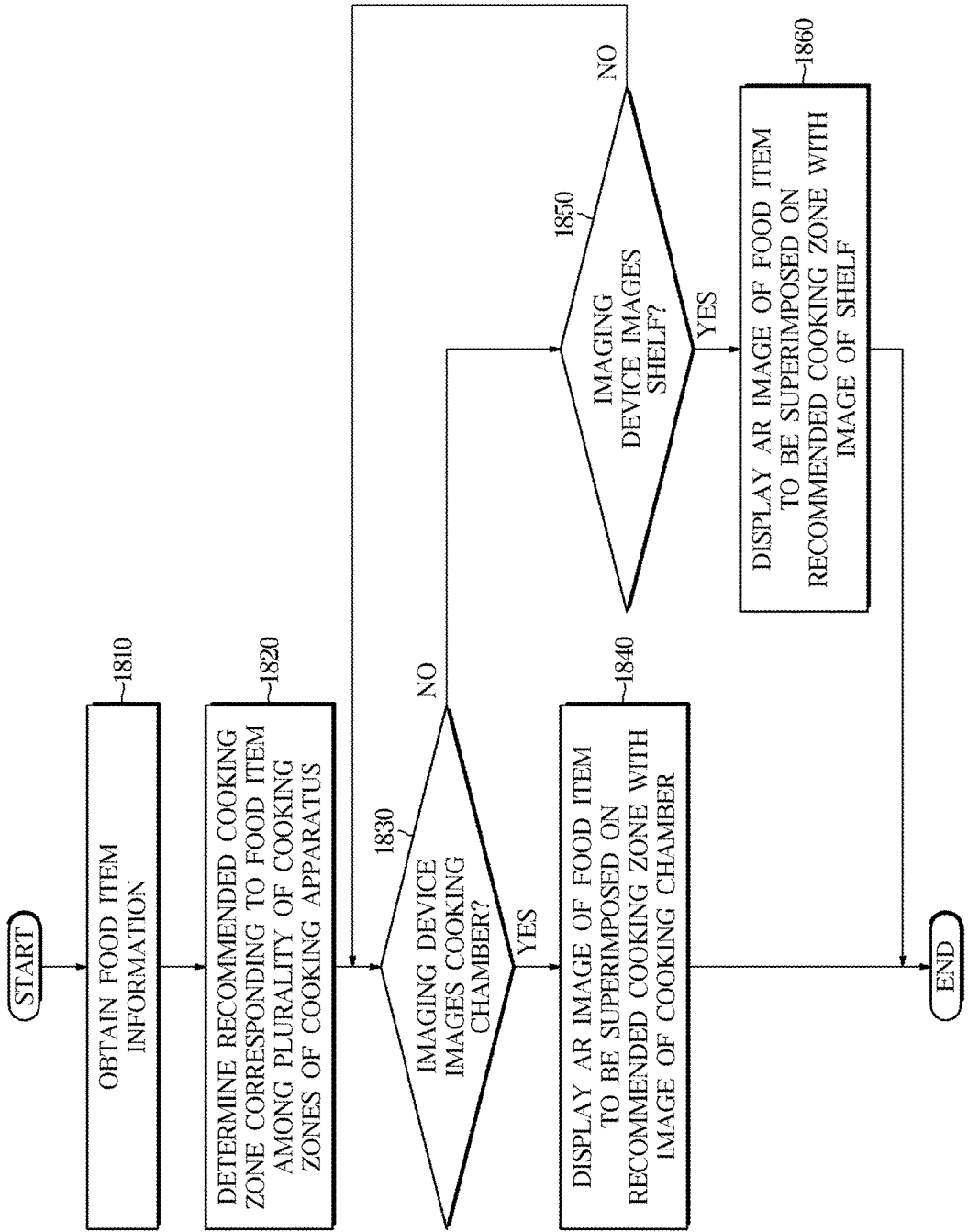
FIG. 18 is a flowchart illustrating a state of displaying an AR image of a food item in a control method of the terminal device according to one embodiment of the present disclosure.

FIG. 18 is a flowchart illustrating a state of displaying an AR image of a food item in a control method of the terminal device 10 according to one embodiment of the present disclosure.

Referring to FIG. 18, the terminal device 10 according to one embodiment may obtain information on a food item (step 1810).

According to embodiments, the terminal device 10 may obtain information on the food item, to be cooked, from a user through the inputter 121.

Further, according to embodiments, the terminal device 10 may obtain the food item information based on image data of the food item obtained through the imaging device 110. In this case, the controller 130 may obtain the food item information by identifying what the food item is or by identifying an identifier displayed on a container of the food item through the image processing.

That is, a user inputs the food item information through the inputter 121 or images the food item through the imaging device 110 to allow the terminal device 10 to obtain the food item information.

According to embodiments, the terminal device 10 may obtain the food item information by receiving the food item information from the cooking apparatus 20. The cooking apparatus 20 may obtain the food item information based on a user input through the inputter 221 or image data acquisition through the imaging device 210.

That is, a user inputs the food item information through the inputter 221 of the cooking apparatus 20 or places the food item to the cooking chamber 23. Accordingly, the user can allow the terminal device 10 to obtain the food item information.

Further, according to embodiments, the controller 130 may receive a list of food items stored in the refrigerator 50 from the server 30 or the refrigerator 50, and display the list of food items. Accordingly, the controller 130 may receive a user selection for at least one food item in the list of food items, thereby obtaining information on the food item to be cooked.

Further, according to embodiments, the controller 130 may receive a list of meals, which may be made with food items stored in the refrigerator 50, from the server 30. The controller 130 may display the list of meals to receive a user selection for a single meal in the list and determine a food item that is required for the selected meal, thereby obtaining information of the food item to be cooked. In this case, the terminal device 10 may determine the food item required for the meal by using the pre-stored correlation information between the meal and the food item, or by receiving the information on the food item required for making the meal, from the server 30.

The terminal device 10 according to one embodiment may determine a recommended cooking zone corresponding to the food item among the plurality of cooking zones of the cooking apparatus 20 (step 1820).

That is, in response to obtaining the food item information, the controller 130 may determine the recommended cooking zone of the corresponding food item by using the arrangement information of the food item corresponding to the obtained food item information among the arrangement information stored in the storage 150. However, in response to the arrangement information of the food item not being stored, the controller 130 may request the arrangement information on the food item to the server 30, and determine the recommended cooking zone of the food item based on the arrangement information received from the server 30.

In response to the cooking chamber 23 being captured by the imaging device 110 (yes in step 1830), the terminal device 10 according to one embodiment may display an AR image of a food item superimposed on a recommended cooking zone with the image of the cooking chamber 23 (step 1840).

In addition, in response to the shelf 25 being captured by the imaging device 110 (yes in step 1850), the terminal device 10 according to one embodiment may display an AR image of a food item superimposed on a recommended cooking zone with the image of the shelf 25 (step 1860).

That is, in response to obtaining the food item information, to be cooked, the controller 130 may determine a recommended cooking zone corresponding to the food item, among the plurality of cooking zones 200 of the cooking apparatus 20, and the controller 130 may control the user interface 120 to display an AR image of the food item 820 superimposed on the image of the cooking apparatus 20 so as to allow the AR image of the food item 820 to be displayed on the recommended cooking zone.

In response to the plurality of food items, the controller 130 may control the user interface 120 to display an AR image of each of the plurality of food items superimposed on the recommended cooking zone with the image of the cooking apparatus 20. That is, in response to the food item, to be cooked, being provided in plurality, the controller 130 may determine a recommended cooking zone corresponding to each of the plurality of food items, and control the user interface 120 to display the AR image of each of the plurality of food items superimposed on the image of the cooking apparatus 20 so as to allow the AR image of each of the plurality of food items to be displayed in a corresponding recommended cooking zone.

For example, in response to the food item including a plurality of ingredients, such as a meal kit or HMR, the controller 130 may control the user interface 120 to display an AR image of each of the plurality of ingredients superimposed on a corresponding recommended cooking zone with the image of the cooking apparatus 20.

In this case, the controller 130 may configure an AR image of a food item in the form of the food item so as to allow a user to identify the AR image as the food item.

That is, by imaging the cooking apparatus 20 through the imaging device 110 of the terminal device 10, a user receives an arrangement position of the food item in the plurality of cooking zones, in the AR manner. Accordingly, the user can more intuitively recognize the recommended cooking zones of the food item to be cooked, and finally, the cooking efficiency of each of food items may be increased.

Figure 19:
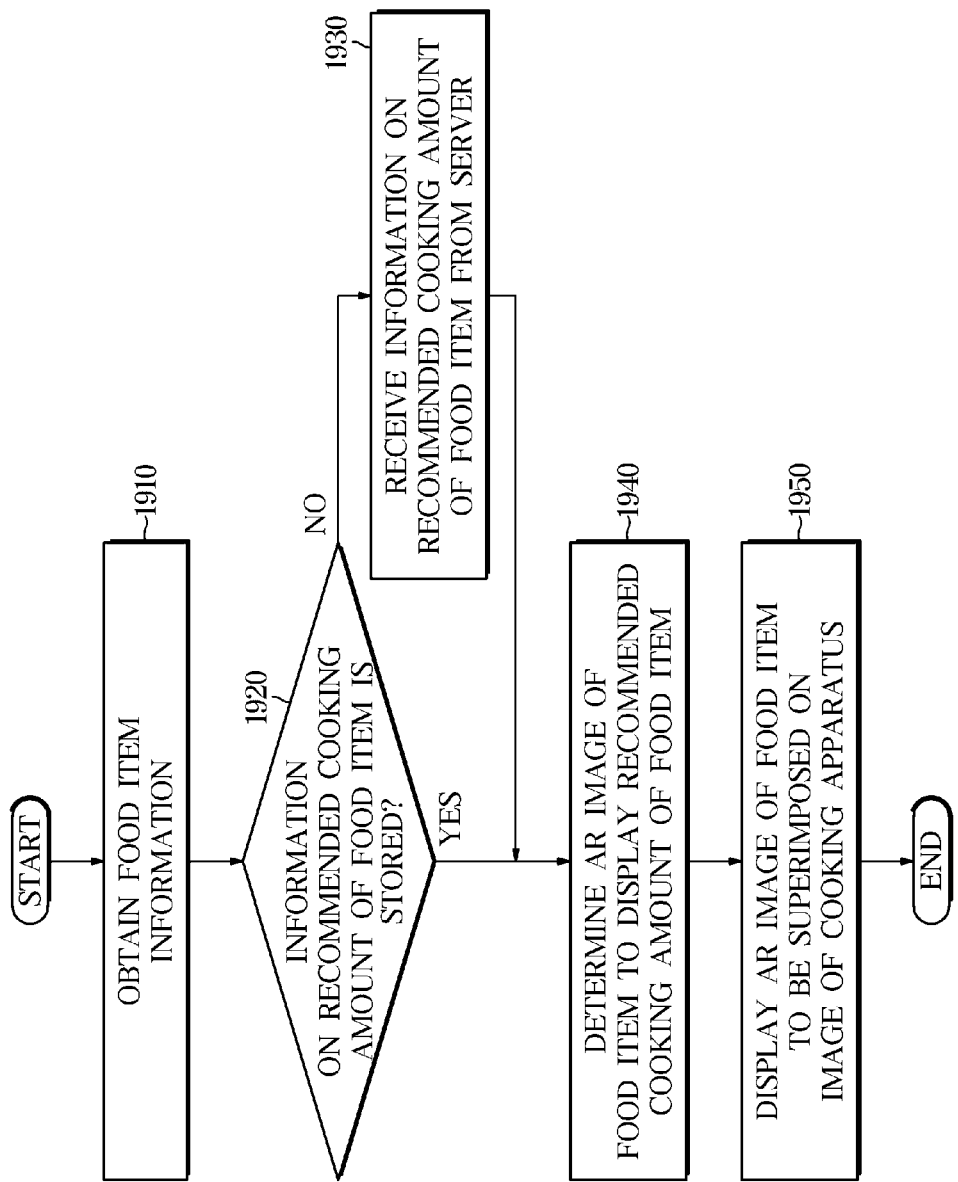
FIG. 19 is a flowchart illustrating a state of determining an AR image of a food item to display a recommended cooking amount in the control method of the terminal device according to one embodiment of the present disclosure.

FIG. 19 is a flowchart illustrating a state of determining an AR image of a food item to display a recommended cooking amount in the control method of the terminal device 10 according to one embodiment of the present disclosure.

Referring to FIG. 19, the terminal device 10 according to one embodiment may obtain information on a food item (step 1910), and in response to information on a recommended cooking amount of the food item being stored (yes in step 1920), the terminal device 10 may determine an AR image of the food item to display the recommended cooking amount of the food item (step 1940).

In response to information on the recommended cooking amount of the food item not being stored (no in step 1920), the terminal device 10 according to one embodiment may receive information on the recommended cooking amount of the food item from the server 30 (step 1930), and determine an AR image of the food item to display the recommended cooking amount of food item based on the received information (step 1940).

Particularly, the controller 130 may use information on the correlation between the food item and the recommended cooking amount among the arrangement information stored in the storage 150. Alternatively, in response to information on the recommended cooking amount on the corresponding food item not being stored, the controller 130 may request the corresponding information to the server 30 and receive the corresponding information from the server 30. Thereafter, the controller 130 may determine the AR image of the food item 820 to include the number or quantity of the food item corresponding to the recommended cooking amount, based on the information on the recommended cooking amount of the food item.

In this case, the recommended cooking amount is a recommended cooking amount based on a single operation of the cooking apparatus 20, and may be determined in consideration of the specific heat of each food item and a total amount of thermal energy provided by the cooking apparatus 20.

The terminal device 10 according to one embodiment may display the AR image of the food item superimposed on the image of the cooking apparatus 20 (step 1950).

That is, in response to the instant food, such as a meal kit or HMR, corresponding to the food item to be cooked, the terminal device 10 may intuitively inform a user of a recommended amount of food item to be cooked at one time through the AR image. In other words, because the user receives the AR image indicating the amount of food item to be cooked at one time, by imaging the cooking apparatus 20 through the imaging device 110 of the terminal device 10, the user can intuitively recognize the recommended amount of food item and finally, the cooking efficiency of the food item may be increased.

Figure 20:
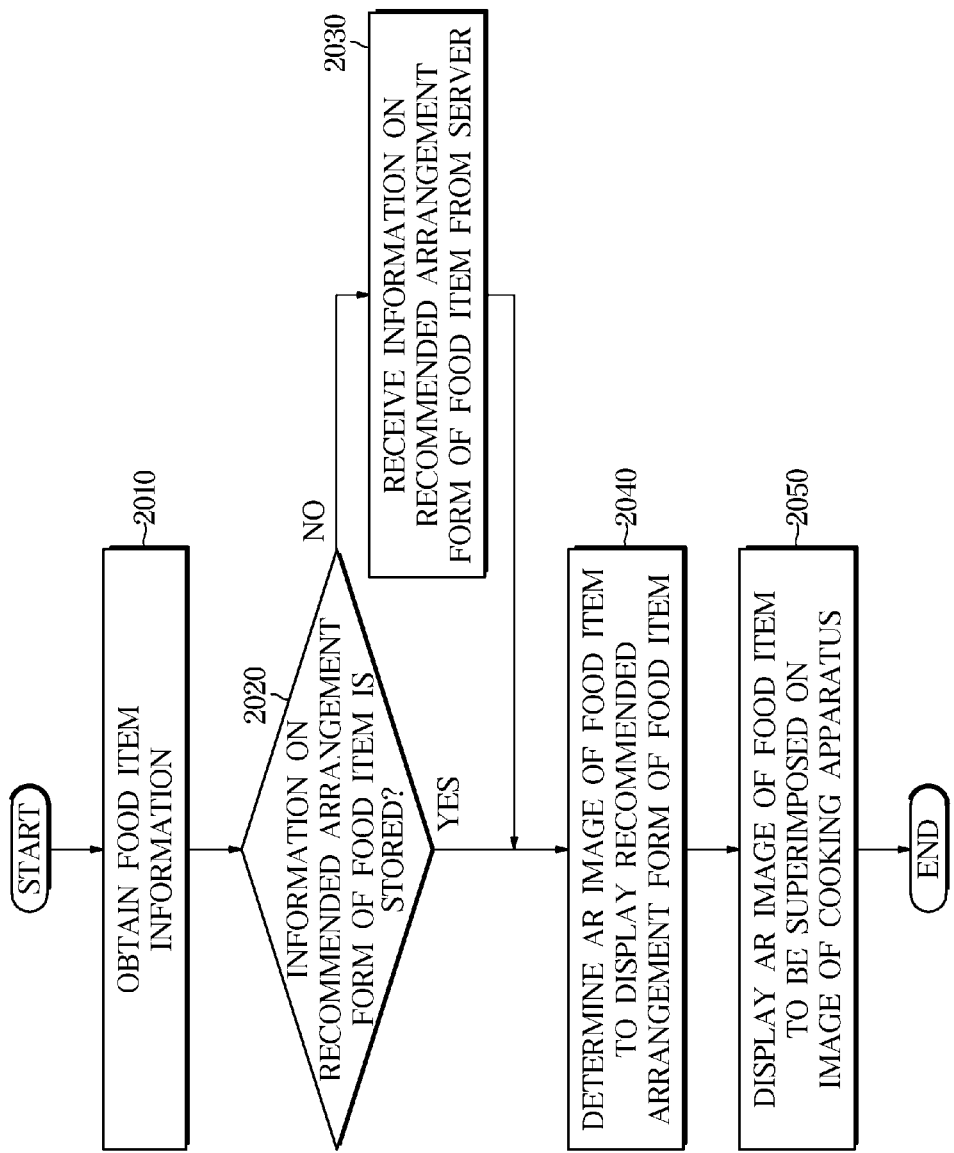
FIG. 20 is a flowchart illustrating a state of determining an AR image of a food item to display a recommended arrangement in the control method of the terminal device according to one embodiment of the present disclosure.

FIG. 20 is a flowchart illustrating a state of determining an AR image of a food item to display a recommended arrangement in the control method of the terminal device 10 according to one embodiment of the present disclosure.

Referring to FIG. 20, the terminal device 10 according to one embodiment may obtain information on a food item (step 2010), and in response to information on a recommended arrangement form of a food item being stored (yes in step 2020), the terminal device 10 may determine an AR image of the food item to display the recommended arrangement form of the food item (step 2040).

In addition, in response to information on the recommended arrangement form of the food item not being stored (no in step 2020), the terminal device 10 may receive the information on the recommended arrangement form of the food item from the server 30 (step 2030), and determine an AR image of the food item to display the recommended arrangement form of the food item based on the received information (step 2040).

That is, the controller 130 may determine the AR image of the food item to display the recommended arrangement form of the food item. Particularly, the controller 130 may determine the shape of the food item to correspond to the recommended arrangement form, and determine the AR image of the food item to include the determined shape of the food item. In this case, the controller 130 may use information on the correlation between the food item and the recommended arrangement form among the arrangement information stored in the storage 150, and in response to the recommended arrangement form information on the corresponding food item the food not being stored, the controller 130 may request the corresponding information to the server 30 and receive the corresponding information from the server 30.

The terminal device 10 according to one embodiment may display the AR image of the food item superimposed on the image of the cooking apparatus 20 (step 2050).

As mentioned above, the terminal device 10 may determine the AR image of the food item 820 in the arrangement form with the high cooking efficiency, and by displaying the determined AR image 820 superimposed on the cooking chamber image 800, a user can more intuitively recognize the recommended arrangement form of the food item. Accordingly, the user can place the food item to a form with the high cooking efficiency, and finally, the cooking efficiency of the food item may be increased.

Figure 21:
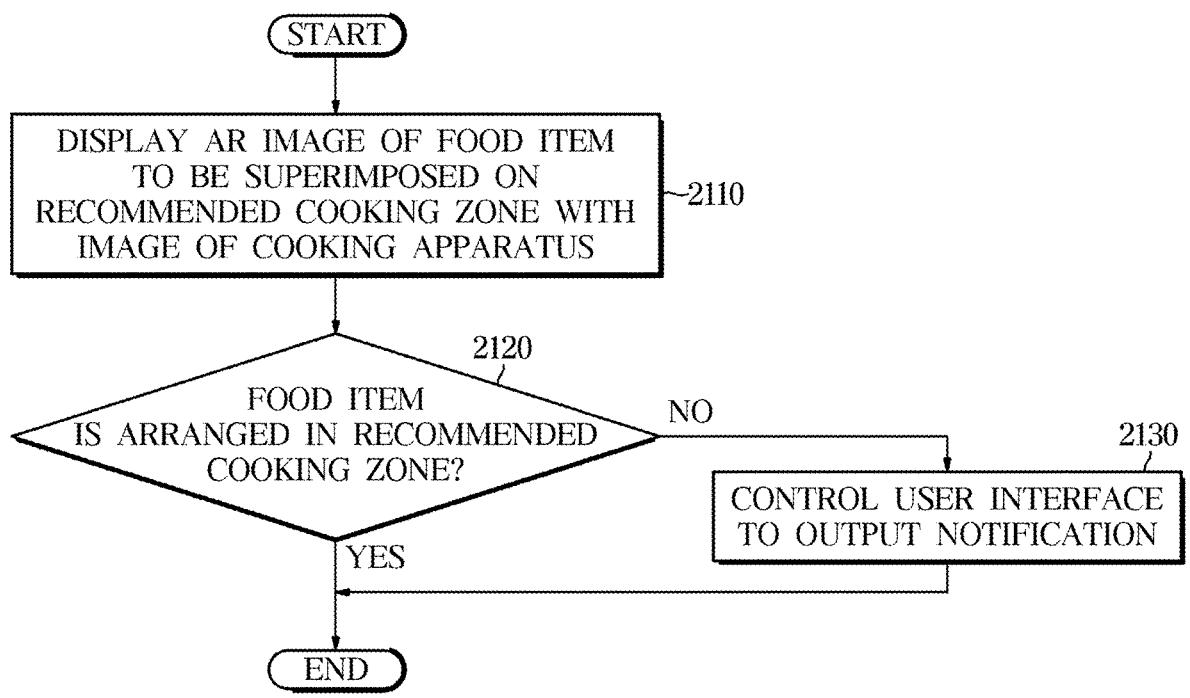
FIG. 21 is a flowchart illustrating a state of outputting a notification in the control method of the terminal device according to one embodiment of the present disclosure.

FIG. 21 is a flowchart illustrating a state of outputting a notification in the control method of the terminal device 10 according to one embodiment of the present disclosure.

Referring to FIG. 21, the terminal device 10 according to one embodiment may display an AR image of food item superimposed on a recommended cooking zone with the image of the cooking apparatus 20 (step 2110).

In response to determining that the food item not is arranged in the recommended cooking zone (no in step 2120), the terminal device 10 according to one embodiment may control the user interface 120 to output a notification (step 2130).

In response to determining that the food item is arranged in a cooking zone other than the recommended cooking zone, the controller 130 may control the user interface 120 to output a notification.

According to embodiments, the controller 130 may determine whether the food item is arranged in the recommended cooking zone, through the image processing on the cooking chamber image 800 obtained through the imaging device 110.

Further, according to embodiments, the controller 130 may receive information, indicating whether the food item is arranged in the recommended cooking zone, from the cooking apparatus 20 and determine whether the food item is arranged in the recommended cooking zone. In this case, the cooking apparatus 20 may obtain information indicating whether the food item is arranged in the recommended cooking zone, based on the processing of the image of the cooking chamber 23 obtained from the imaging device 210.

According to embodiments, the terminal device 10 may obtain the cooking chamber image 800 obtained from the imaging device 210 of the cooking apparatus 20 and process the cooking chamber image 800, thereby determining whether the food item is arranged in the recommended cooking zone.

Accordingly, a user may intuitively recognize that the food item is not placed in the recommended cooking zone, and by placing the food item to the recommended cooking zone, the cooking efficiency of the food item may be increased.

In this case, in response to determining the food item is arranged in the recommended cooking zone, the cooking apparatus 20 may control at least one heat source 260 corresponding to the recommended cooking zone to heat the recommended cooking zone based on the recipe for the food item.

Figure 22:
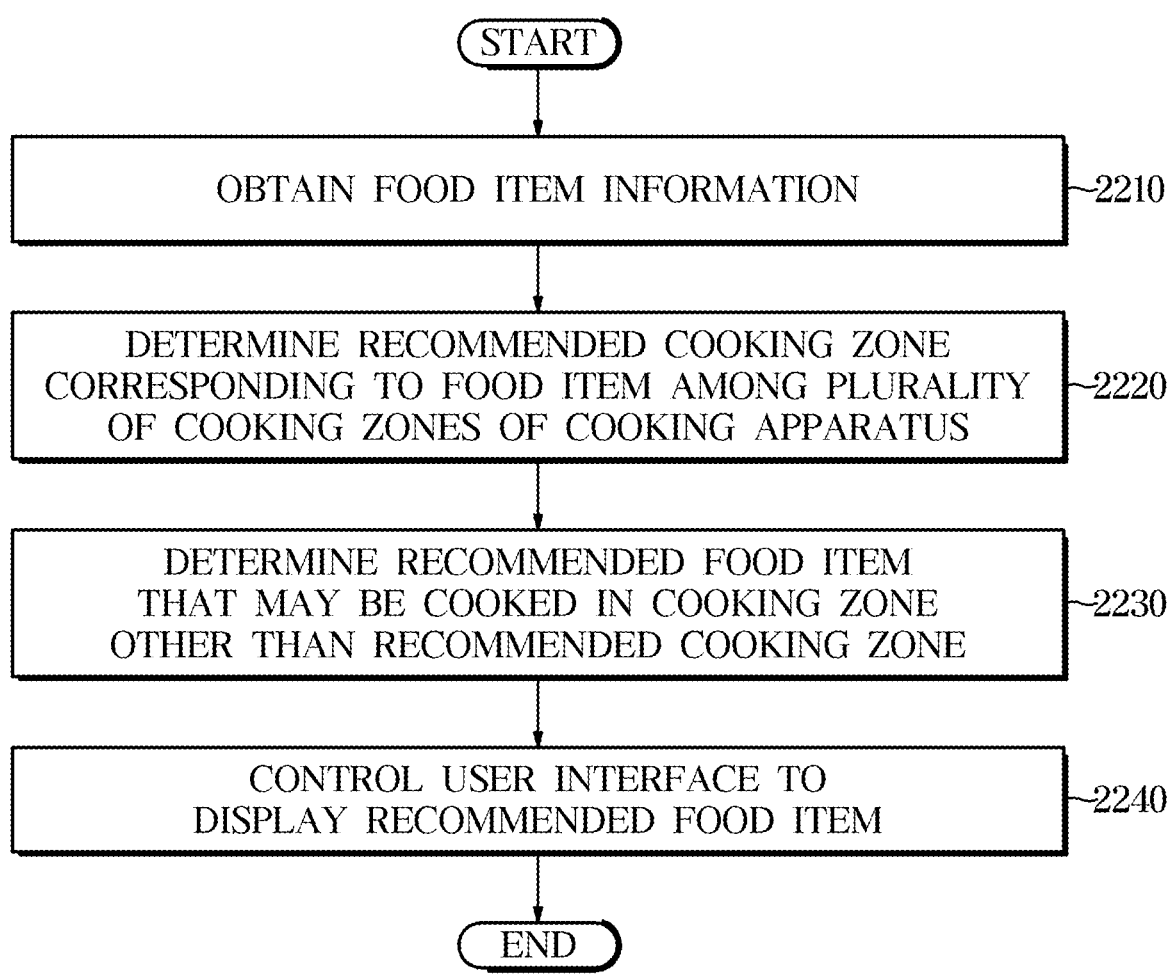
FIG. 22 is a flowchart illustrating a state of outputting a recommended food item in the control method of the terminal device according to one embodiment of the present disclosure.

FIG. 22 is a flowchart illustrating a state of outputting a recommended food item in the control method of the terminal device 10 according to one embodiment of the present disclosure.

Referring to FIG. 22, the terminal device 10 according to one embodiment may obtain information on a food item (2210), and determine a recommended cooking zone corresponding to the food item among the plurality of cooking zones of the cooking apparatus 20 (2220).

The terminal device 10 according to one embodiment may determine a recommended food item that may be cooked in a cooking zone other than the recommended cooking zone (2230), and may control the user interface 120 to display the recommended food item (2240).

Particularly, the controller 130 may obtain the food item information and determine a recommended cooking zone for the obtained food item. In response to a cooking zone being present other than the recommended cooking zone among the plurality of cooking zones, the controller 130 may determine a recommended food item that may be cooked simultaneously with the obtained food item in the cooking zone other than the recommended cooking zone, and control the user interface 120 to display the recommended food item.

According to embodiments, the controller 130 may control the user interface 120 to display the AR image of the recommended food item superimposed on the corresponding cooking zone.

In this case, according to embodiments, the recommended food item may be a food highly related to the food item to be cooked, and information on the relation between the food item and the recommended food item may be stored in the storage 150. For example, the recommended food item may be a food that is often cooked simultaneously with the food item or a food that is often added simultaneously with the food item to one meal menu. The information on the relation between the food item and the recommended food item may be set by the user through the inputter 121 or updated based on information received from the server 30.

Accordingly, a user can intuitively recognize a food that may be simultaneously cooked with the food item to be cooked, and by cooking the food item and the recommended food item at the same time, it is possible to reduce the cooking time while improving the completeness of the meal.

Figure 23:
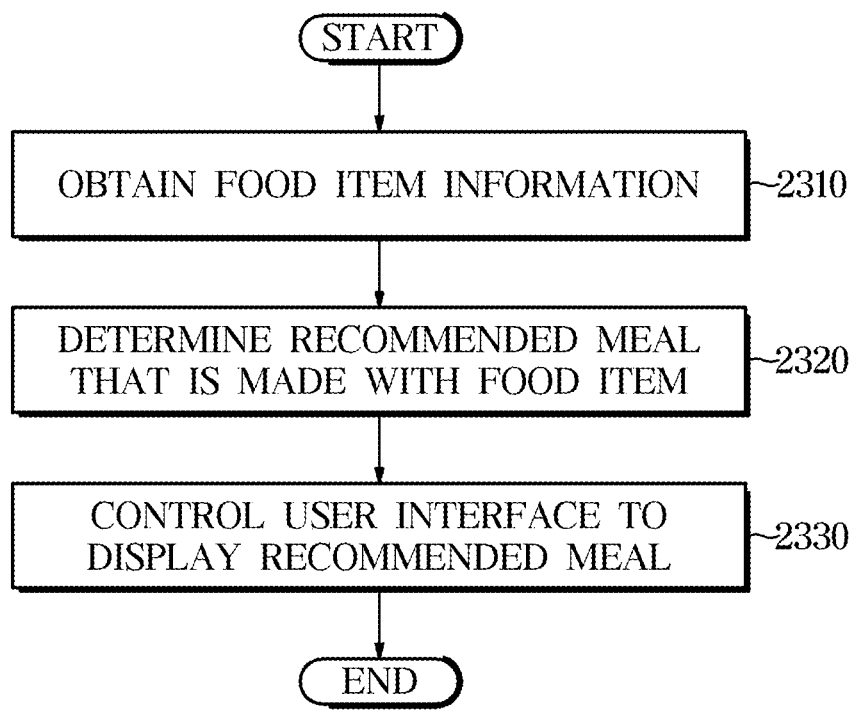
FIG. 23 is a flowchart illustrating a state of outputting a recommended meal in the control method of the terminal device according to one embodiment of the present disclosure.

FIG. 23 is a flowchart illustrating a state of outputting a recommended meal in the control method of the terminal device 10 according to one embodiment of the present disclosure.

Referring to FIG. 23, the terminal device 10 according to one embodiment may obtain information on a food item (2310), determine a recommended meal that uses the food item as an ingredient (2320), and control the user interface 120 to display the recommended meal (2330).

Particularly, according to embodiments, the controller 130 may determine a recommended meal corresponding to the food item based on the pre-stored information on the correlation between the food item and the recommended meal. Further according to embodiments, the controller 130 may determine the recommended meal corresponding to the food item based on the information on the correlation between the food item and the recommended meal received from the server 30.

Thereafter, the controller 130 may control the user interface 120 to output the determined recommended meal. That is, the controller 130 may control the display 122 to display the determined recommended meal, and may control the speaker 123 to output the determined recommended meal by voice.

In addition, according to embodiments, the controller 130 may determine other food item that is required for making the recommended meal and the controller 130 may display an AR image of other food item superimposed on a corresponding cooking zone.

Accordingly, a user can intuitively recognize a menu that may be completed with the food item to be cooked, and can experience a fresh menu by being provided with a more diverse menu.

Figure 24:
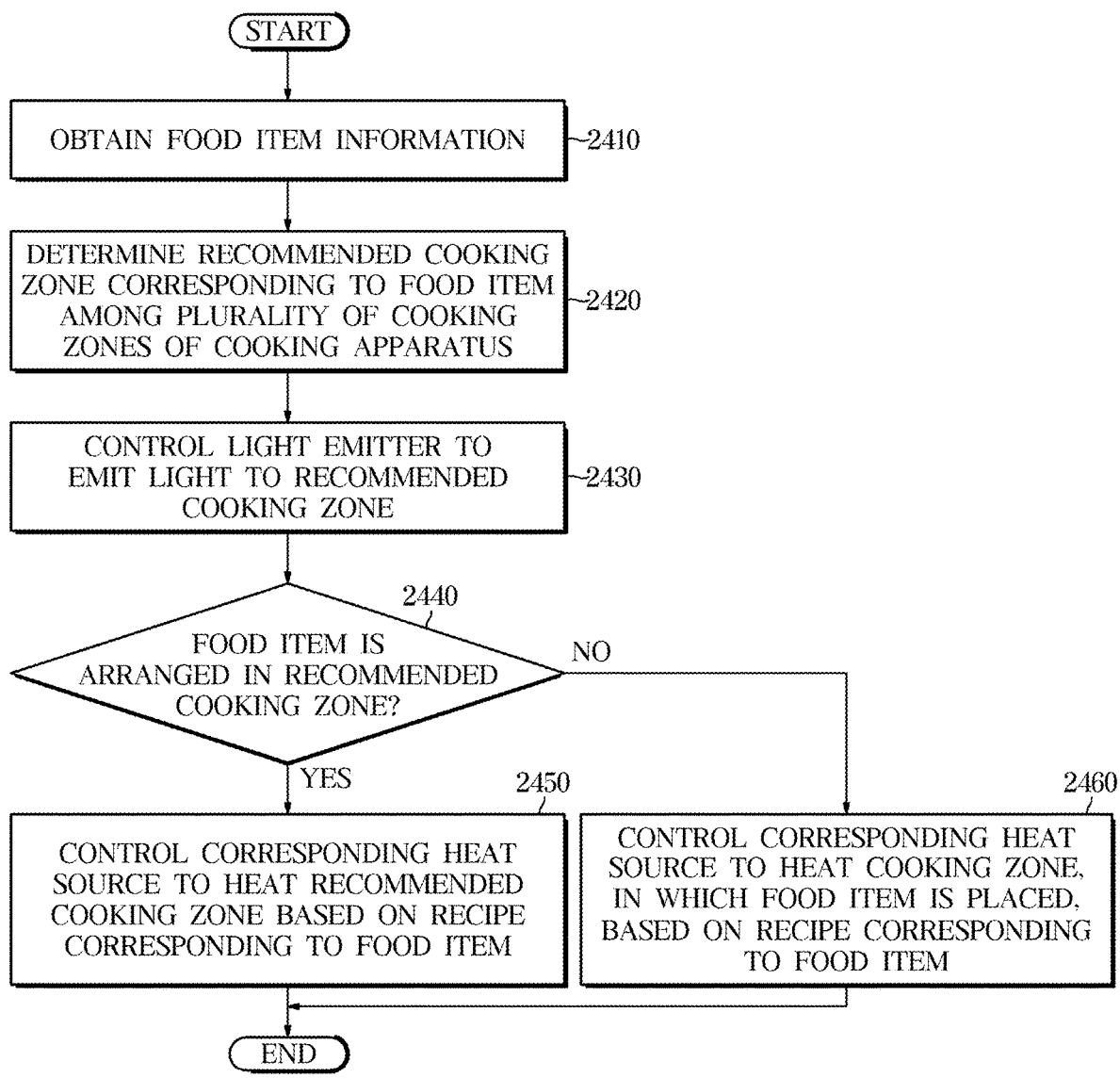
FIG. 24 is a flowchart illustrating a state of guiding an arrangement of a food item in a control method of the cooking apparatus according to one embodiment of the present disclosure.

FIG. 24 is a flowchart illustrating a state of guiding an arrangement of a food item in a control method of the cooking apparatus 20 according to one embodiment of the present disclosure.

Referring to FIG. 24, the cooking apparatus 20 according to one embodiment may obtain information on a food item (2410), and determine a recommended cooking zone corresponding to the food item among the plurality of cooking zones of the cooking apparatus 20 (2420), and control the light emitter 270 to emit light to the recommended cooking zone (2430).

A shape of light that is emitted to the cooking zone may be provided in a shape provided to identify the cooking zone, such as a figure of a predetermined shape or a number indicating the number of the cooking zone, according to embodiments.

The controller 230 may determine a recommended cooking zone corresponding to the food item based on the arrangement information stored in the storage 250 or the controller 230 may determine a recommended cooking zone corresponding to the food item based on the arrangement information received from the server 30.

As mentioned above, by displaying the recommended cooking zone of the food item through light emission, the cooking apparatus 20 may guide a user to more intuitively arrange the food item.

In addition, in response to the plurality of food items, the controller 230 may control the light emitter 270 to emit light having a different shape for each recommended cooking zone of each of the plurality of food items. That is, in response to the plurality of food items, the controller 230 may determine a recommended cooking zone corresponding to each of the plurality of food items, and control the light emitter 270 to emit light having a different shape for each recommended cooking zone corresponding to each of the plurality of food items.

Accordingly, a user can intuitively recognize the plurality of recommended cooking zones, and the user can place a food item to the plurality of recommended cooking zones, thereby increasing the cooking efficiency.

In response to determining that the food item is arranged in the recommended cooking zone (yes in 2440), the cooking apparatus 20 according to one embodiment may control the corresponding heat source 260 to heat the recommended cooking zone based on a recipe corresponding to the food item (2450).

In response to determining that the food item is not arranged in the recommended cooking zone (no in 2440), the cooking apparatus 20 according to one embodiment may control the corresponding heat source 260 to heat a cooking zone, in which the food item is placed, based on a recipe corresponding to the food item (2460).

FIG. 25 is a flowchart illustrating a state of determining a recipe corresponding to a food item in the control method of the cooking apparatus 20 according to one embodiment of the present disclosure.

Referring to FIG. 25, the cooking apparatus 20 according to one embodiment may obtain an image of an identifier of a food item through the imaging device 210 (2510), and the cooking apparatus 20 may receive a recipe of the food item from the server 30 based on the image of the identifier of the food item (2520).

In response to the plurality of food items (yes in 2530), the cooking apparatus 20 according to one embodiment may determine a recipe for each cooking zone corresponding to each of the plurality of food items based on the recipes of each of the plurality of food items (2540), and control the heat source 260 to heat a cooking zone corresponding to each of the plurality of food items based on the determined recipe (2550).

In addition, in response to a single food item (no in 2530), the cooking apparatus 20 according to one embodiment may control the heat source 260 to heat a cooking zone corresponding to the food item based on the received recipe.

Particularly, the controller 230 may identify the food item 1610 based on an image of an identifier 1615 of the food item 1610 that is included in the image of the cooking chamber 23 and determine the recipe for the food item 1610. In this case, the identifier 1615 of the food item 1610 may be displayed on a container of the food item 1610, and may be provided as a QR code, a barcode, an icon, or the like. In response to the recipe, corresponding to the identified food item 1610, being stored, the controller 230 may control the heat source 260 based on the stored recipe or the controller 230 may control the heat source 260 by receiving the recipe, corresponding to the identified food item 1610, from the server 30.

In this case, the recipe may include information on a cooking temperature and a cooking time corresponding to the food item. In other words, the recipe may include at least one of a cooking temperature, a cooking time, or an output of the heat source 260 as a cooking parameter for the operation of the heat source 260. In this case, as for the recipe, information on the recipe for each food item may be pre-stored in the storage 250. Further, the recipe to be applied to each cooking zone may be determined based on a user input or the recipe may be received from the server 30.

In response to a plurality of food items, the controller 230 according to one embodiment may identify each of the plurality of food items 1710 and 1720 based on an image of an identifier 1715 and 1725 of each of the plurality of food items 1710 and 1720, and determine a recipe for each of the plurality of food items 1710 and 1720.

In this case, the controller 230 may determine the recipe for each recommended cooking zone of the plurality of food items 1710 and 1720 based on the recipe for each of the plurality of food items 1710 and 1720.

Thereafter, the controller 230 may control at least one of the plurality of heat sources 260 to heat each recommended cooking zone based on the determined recipe for each recommended cooking zone.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-read able recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk a flash memory, and an optical data storage device.

While the present disclosure has been particularly described with reference to exemplary embodiments, it should be understood by those of skilled in the art that various changes in form and details may be made without departing from the spirit and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A terminal device comprising:
an imaging device configured to obtain an image of a cooking apparatus;
a user interface configured to display the obtained image of the cooking apparatus and receive an input from a user; and
a processor configured to:
obtain food item information from the user through the user interface;
based on the obtained food item information, determine a recommended cooking zone corresponding to a food item among a plurality of cooking zones of the cooking apparatus and a recommended arrangement form of the food item including a direction which the food item faces to;
determine an augmented reality (AR) image of the food item to display the determined recommended arrangement form of the food item; and
control the user interface to display the determined AR image of the food item superimposed on the obtained image of the cooking apparatus on the recommended cooking zone.

2. The terminal device of claim 1, wherein the processor is configured to, in response to determining that the food item comprises a plurality of ingredients, control the user interface to display an AR image of each of the plurality of ingredients superimposed on the obtained image of the cooking apparatus on the recommended cooking zone corresponding to the each of the plurality of ingredients.

3. The terminal device of claim 1, wherein the processor is configured to:
determine a recommended cooking amount of the food item based on the obtained food item information; and
determine the AR image of the food item to display the determined recommended cooking amount of the food item.

4. The terminal device of claim 1, wherein the processor is configured to control the user interface to display an AR image representing each of the plurality of cooking zones superimposed on the image of the cooking apparatus.

5. The terminal device of claim 1, wherein the image of the cooking apparatus is an image of a cooking chamber or an image of a shelf mounted to the cooking chamber.

6. The terminal device of claim 1, wherein the processor is configured to control the user interface to output a notification in response to determining that the food item is arranged in a cooking zone other than the recommended cooking zone.

7. The terminal device of claim 1, wherein the processor is configured to:
   determine a recommended food item that may be cooked in a cooking zone other than the recommended cooking zone based on the obtained food item information; and
   control the user interface to display an AR image of the recommended food item superimposed on the image of the cooking apparatus on the cooking zone other than the recommended cooking zone.

8. The terminal device of claim 1, wherein the processor is configured to:
   based on the obtained food item information, determine a recommended meal that uses the food item as an ingredient;
   determine another food item that is required for making the recommended meal; and
   control the user interface to display an AR image of the determined other food item superimposed on the image of the cooking apparatus on the determined recommended cooking zone.

9. The terminal device of claim 1, wherein the processor is configured to:
   based on receiving a list of food items stored in a refrigerator, control the user interface to display the list of food items; and
   based on a user selection for at least one food item in the list of food items, to obtain information on the food item.

10. The terminal device of claim 1, wherein the processor is configured to obtain the food item information by processing the image of the food item captured through the imaging device.

11. The terminal device of claim 1, wherein the processor is configured to:
    based on a selection of a meal to be completed from the user, determine a plurality of food items that is required for making the meal; and
    control the user interface to display an AR image of each of the plurality of food items superimposed on the obtained image of the cooking apparatus on the recommended cooking zone corresponding to the each of the determined plurality of food items.

12. The terminal device of claim 11, wherein the processor is configured to:
    based on receiving a list of meals, which may be made with a food item stored in a refrigerator, from a server, control the user interface to display the list of meals; and
    based on a user selection for any one meal in the list of meals, obtain information on the food item.

13. The terminal device of claim 1, wherein the processor is configured to control the user interface to enlarge and display an AR image of the food item based on the obtained image corresponding to an image of the recommended cooking zone.

14. A cooking apparatus control system comprising:
    a cooking apparatus including a cooking chamber including a plurality of cooking zones, and a plurality of heat sources configured to heat at least one of the plurality of cooking zones; and
    a terminal device including an imaging device configured to obtain an image of the cooking apparatus, a user interface configured to display the obtained image of the cooking apparatus and receive an input from a user, and a processor,
    wherein the processor is configured to:
    obtain food item information from the user through the user interface;
    based on the obtained food item information, determine a recommended cooking zone corresponding to a food item among the plurality of cooking zones of the cooking apparatus and a recommended arrangement form of the food item including a direction which the food item faces to;
    determine an augmented reality (AR) image of the food item to display the determined recommended arrangement form of the food item; and
    control the user interface to display the determined AR image of the food item superimposed on the obtained image of the cooking apparatus on the recommended cooking zone.

15. The cooking apparatus control system of claim 14, wherein the processor is configured to, in response to determining that the food item comprises a plurality of ingredients, control the user interface to display an AR image of each of the plurality of ingredients superimposed on the obtained image of the cooking apparatus on the recommended cooking zone corresponding to the each of the plurality of ingredients.

16. The cooking apparatus control system of claim 14, wherein the processor is configured to:
    determine a recommended cooking amount of the food item based on the obtained food item information; and
    determine the AR image of the food item to display the determined recommended cooking amount of the food item.

17. The cooking apparatus control system of claim 14, wherein the processor is configured to control the user interface to display an AR image representing each of the plurality of cooking zones superimposed on the image of the cooking apparatus.

18. The cooking apparatus control system of claim 14, wherein the image of the cooking apparatus is an image of the cooking chamber or an image of a shelf mounted to the cooking chamber.

* * * * *